United States Patent
Fukushige et al.

(10) Patent No.: US 7,629,051 B2
(45) Date of Patent: Dec. 8, 2009

(54) OPTICAL FILM CONTAINING FLUORINATED PHOTOPOLYMERIZATION INITIATOR, ANTIREFLECTIVE FILM, POLARIZING PLATE AND IMAGE DISPLAY UNIT INCLUDING SAME

(75) Inventors: Yuuichi Fukushige, Minami-Ashigara (JP); Hiroyuki Yoneyama, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 474 days.

(21) Appl. No.: 11/444,330

(22) Filed: Jun. 1, 2006

(65) Prior Publication Data

US 2006/0274423 A1 Dec. 7, 2006

(30) Foreign Application Priority Data

Jun. 1, 2005 (JP) ............................. 2005-161569

(51) Int. Cl.
*B32B 27/00* (2006.01)
*G03C 1/675* (2006.01)
*C09K 19/00* (2006.01)

(52) U.S. Cl. .................. 428/421; 428/422; 428/1.1; 522/16; 522/18; 522/26; 522/28; 522/153; 522/154; 522/156; 522/148; 522/63; 522/64; 522/83; 522/99

(58) Field of Classification Search ............... 522/50, 522/64, 16, 18, 26, 28, 83, 63, 148, 99, 153, 522/154, 156; 359/580; 428/1.1, 421, 422
See application file for complete search history.

(56) References Cited

U.S. PATENT DOCUMENTS

| | | | | |
|---|---|---|---|---|
| 4,701,399 A | * | 10/1987 | Nagano et al. | 430/179 |
| 5,274,179 A | * | 12/1993 | Wu | 560/184 |
| 5,846,650 A | * | 12/1998 | Ko et al. | 428/336 |
| 6,306,563 B1 | * | 10/2001 | Xu et al. | 430/321 |
| 6,496,637 B2 | * | 12/2002 | Blomquist et al. | 385/129 |
| 6,660,389 B2 | * | 12/2003 | Liu et al. | 428/421 |
| 6,709,755 B2 | * | 3/2004 | Ferm et al. | 428/448 |
| 6,778,753 B2 | * | 8/2004 | Blomquist | 385/143 |
| 6,791,649 B1 | * | 9/2004 | Nakamura et al. | 349/137 |
| 6,846,568 B2 | * | 1/2005 | Yamaya et al. | 428/447 |
| 6,908,647 B2 | * | 6/2005 | Obayashi et al. | 428/1.32 |
| 7,371,439 B2 | * | 5/2008 | Matsunaga et al. | 428/1.3 |
| 7,473,462 B2 | * | 1/2009 | Coggio et al. | 428/212 |
| 7,553,543 B2 | * | 6/2009 | Bekiarian | 428/421 |

FOREIGN PATENT DOCUMENTS

JP 11-189621 A 7/1999

* cited by examiner

*Primary Examiner*—Susan W Berman
(74) *Attorney, Agent, or Firm*—Buchanan Ingersoll & Rooney PC

(57) ABSTRACT

An optical film comprising a support and a layer containing a cured product of a composition which contains a fluorinated photopolymerization initiator and an ionizing radiation-curing compound.

10 Claims, 7 Drawing Sheets

OPTICAL FILM CONTAINING FLUORINATED PHOTOPOLYMERIZATION INITIATOR, ANTIREFLECTIVE FILM, POLARIZING PLATE AND IMAGE DISPLAY UNIT INCLUDING SAME

FIELD OF THE INVENTION

This invention relates to an optical film having a low refractive index and an improved scratch resistance and an antireflective film. In particular, it relates to an optical film and an antireflective film to be used in image display units such as liquid crystal display units.

BACKGROUND OF THE INVENTION

Antireflective films have been employed to prevent the reflection of background and improve the visibility in image display units such as a cathode-ray tube (CTR), a plasma display panel (PDP), an electro luminescence display (ELD) and a liquid crystal display (LCD).

An antireflective film is located as the outermost face of a display so as to lower the refractive index with the use of the optical interference principle, thereby preventing a decrease in contrast or image transfer caused by the reflection.

Thus, an antireflective film is highly likely injured and it is therefore an important problem to impart an excellent scratch resistance to it.

Such an antireflective film can be constructed by providing a low-refractive index layer having an appropriate membrane thickness as the outermost face and optionally forming an high-refractive index layer, a medium-refractive index layer, a hard coat layer and so on between the low-refractive index layer and a support (a substrate). In order to achieve a low refractive index, it is preferred to employ a material having a refractive index as low as possible as the low-refractive index layer. Since the antireflective film is employed as the outermost face of a display, it should have a high scratch resistance. To achieve a high scratch resistance in a thin film having a thickness of about 100 nm, it is required that the film per se has a strength at a certain extent and a high adhesiveness to the under layer.

The refractive index of a material can be lowered by introducing a fluorine atom into a monomer binder having an ethylenically unsaturated group, or by lowering the density (introducing voids). By using these methods, however, the film strength and adhesiveness are worsened and the scratch resistance is lowered. Namely, it is a difficult problem to establish both of a low refractive index and a high scratch resistance.

JP-A-11-189621 proposes a method comprising introducing a polysiloxane structure into a fluoropolymer to thereby lower the coefficient of friction of the film surface and improve the scratch resistance. Although this method is efficacious to a certain degree in improving the scratch resistance, it is impossible to impart a sufficient scratch resistance by this method alone to a film which inherently has an insufficient film strength and interfacial adhesiveness.

On the other hand, it is stated in JP-A-2002-156508 that the hardness of a photo curing resin is elevated by curing it at a low oxygen concentration. To produce an antireflective film by using a web at a high efficiency, however, the degree of lowering the oxygen concentration by, for example, nitrogen purge is limited and thus no sufficient hardness can be obtained thereby.

JP-B-7-51641 discloses a method of twisting a base material around a hot roll and irradiating with ionizing radiation. However, the degree of curing by this method is still insufficient in the case where it is intended to sufficiently cure a thin film for specific use such as a low-refractive index layer.

SUMMARY OF THE INVENTION

An object of the invention is to provide an optical film or an antireflective film which has a sufficient antireflection performance and an improved scratch resistance. Another object of the invention is to provide the above-described optical film or antireflective film which can be produced under economical conditions, i.e., at a relatively high oxygen concentration. Another object of the invention is to provide a polarizing plate and an image display unit provided with the above optical film or antireflective film.

The inventor has conducted intensive studies and consequently found out that the objects of the invention as described above can be can be achieved by an antireflective film having the following components and a method of producing the same.

(1) An optical film wherein a layer formed on a support comprises a cured product of a composition which contains at least one fluorinated photopolymerization initiator and an ionizing radiation-curing compound.

(2) An optical film as described in the above (1) wherein a layer formed on a support comprises a cured product of a composition which contains at least one fluorinated photopolymerization initiator, an ionizing radiation-curing compound and at least one nonfluorinated photopolymerization initiator.

(3) An antireflective film having at least an antireflective layer on a support wherein at least one of layers laminated on the support is a layer formed by curing by ionizing radiation a composition which contains at least one fluorinated photopolymerization initiator and an ionizing radiation-curing compound.

(4) An antireflective film as described in the above (3) wherein the composition, which contains at least one fluorinated photopolymerization initiator and an ionizing radiation-curing compound, further contains at least one nonfluorinated photopolymerization initiator.

(5) An optical film as described in any one of the above (1) to (2) wherein the fluorinated photopolymerization initiator is represented by any one of the following formulae (1) to (5):

Formula (1):

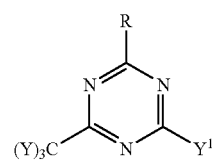

In the formula (1), Y represents a halogen atom. $Y^1$ represents $-CY_3$, $-NH_2$, $-NHR'$, $-NR'_2$ or $-OR'$. R' represents an alkyl group, a fluoroalkyl group or an aryl group. R represents a group selected from the group consisting of $R_a-Y_1-$, $R_a-Y_1-(CH_2)_r-$, $R_a-(CH_2)_r-Y_1-$, $R_a-Y_1-(CH_2)_s-O-$, $R_a-Y_1-(CH_2)_s-S-$, $R_a-Y_1-(CH_2)_s-NR_1-$, $-CY_3$, an alkyl group, a substituted alkyl group, a fluoroalkyl group, a substituted fluoroalkyl group, an aryl group, a substituted aryl group and a substituted alkenyl group. $R_1$ represents a hydrogen atom, a methyl group or an ethyl group; r represents an integer of from 1 to 10; and s represents an integer of from 2 to 10. $Y_1$'s independently represent each a divalent group selected from the group consisting of —O—, —S—, —O—C(=O)— and —O—Si(R$_2$)$_2$—(CH$_2$)$_r$—. R$_2$ represents an alkyl group having from 1 to 12 carbon atoms or a phenyl group. R$_a$ represents a linear or branched terminal chain: Z$^1$CF$_2$(—O—C$_2$F$_4$)$_p$—(CF$_2$)$_q$— (wherein Z$^1$ represents H or F; and one of p and q represents an integer of from 0 to 20 while the other represents an integer of from 1 to 20.

Formula (2):

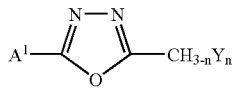

In the formula (2), A$^1$ represents a phenyl group, a naphthyl group, a substituted phenyl group or a substituted naphthyl group or has the same meaning as R in the formula (1) (wherein a substituent is a halogen atom, an alkyl group, a fluoroalkyl group, an alkoxy group, a nitro group, a cyano group or a methylenedioxy group). Y represents a halogen atom; and n represents an integer of from 1 to 3.

Formula (3):

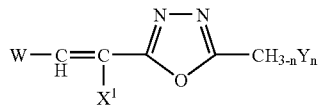

In the formula (3), W represents an unsubstituted or substituted phenyl group or an unsubstituted naphthyl group or has the same meaning as R in the formula (1) (wherein a substituent of a phenyl group is a halogen atom, a nitro group, a cyano group an alkyl group having from 1 to 3 carbon atoms or an alkoxy group having from 1 to 4 carbon atoms; in the case where a halogen atom is contained as a substituent, the phenyl group has one or two substituents, otherwise it has a single substituent). X$^1$ represents a hydrogen atom, a phenyl group or an alkyl group having from 1 to 3 carbon atoms. Y represents a halogen atom; and n represents an integer of from 1 to 3.

Formula (4):

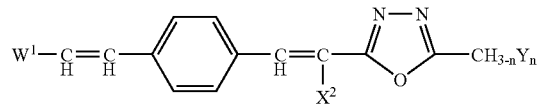

In the formula (4), W$^1$ represents an unsubstituted or substituted phenyl group or an unsubstituted naphthyl group or has the same meaning as R in the formula (1) (wherein a substituent of a phenyl group is a halogen atom, a nitro group, a cyano group, an alkyl group having from 1 to 3 carbon atoms or an alkoxy group having from 1 to 4 carbon atoms; in the case where a halogen atom is contained as a substituent, the phenyl group has one or two substituents, otherwise it has a single substituent). X$^2$ represents a hydrogen atom, a halogen atom, a cyano group, an alkyl group or an allyl group. Y represents a halogen atom; and n represents an integer of from 1 to 3.

Formula (5):

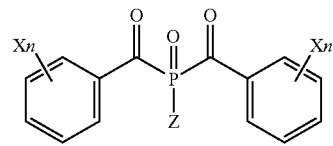

In the formula (5), Z represents an unsubstituted or substituted phenyl group, an unsubstituted naphthyl group or a fluoroalkyl group or has the same meaning as R in the formula (1) (wherein a substituent of a phenyl group is a halogen atom, a nitro group, a cyano group, an alkyl group having from 1 to 3 carbon atoms or an alkoxy group having from 1 to 4 carbon atoms). X's may be either the same or different and each represents a hydrogen atom, a halogen atom or an alkyl group or has the same meaning as R in the formula (1). n represents an integer of from 1 to 5, provided that at least one of Z and X's has the same meaning as R in the formula (1).

(6) An antireflective film as described in the above (3) or (4) wherein the fluorinated photopolymerization initiator is represented by any one of the following formulae (1) to (5):

Formula (1):

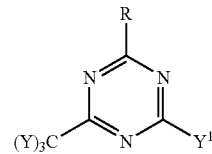

In the formula (1), Y represents a halogen atom. Y$^1$ represents —CY$_3$, —NH$_2$, —NHR', —NR'$_2$ or —OR'. R' represents an alkyl group, a fluoroalkyl group or an aryl group. R represents a group selected from the group consisting of R$_a$—Y$_1$—, R$_a$—Y$_1$—(CH$_2$)$_r$—, R$_a$—(CH$_2$)$_r$—Y$_1$—, R$_a$—Y$_1$—(CH$_2$)$_s$—O—, R$_a$—Y$_1$—(CH$_2$)$_s$—S—, R$_a$—Y$_1$—(CH$_2$)$_s$—NR$_1$—, —CY$_3$, an alkyl group, a substituted alkyl group, a fluoroalkyl group, a substituted fluoroalkyl group, an aryl group, a substituted aryl group and a substituted alkenyl group. R$_1$ represents a hydrogen atom, a methyl group or an ethyl group; r represents an integer of from 1 to 10; and s represents an integer of from 2 to 10. Y$_1$'s independently represent each a divalent group selected from the group consisting of —O—, —S—, —O—C(=O)— and —O—Si(R$_2$)$_2$—(CH$_2$)$_r$—. R$_2$ represents an alkyl group having from 1 to 12 carbon atoms or a phenyl group. R$_a$ represents a linear or branched terminal chain: Z$^1$CF$_2$(—O—C$_2$F$_4$)$_p$—(CF$_2$)$_q$— (wherein Z$^1$ represents H or F; and one of p and q represents an integer of from 0 to 20 while the other represents an integer of from 1 to 20.

Formula (2):

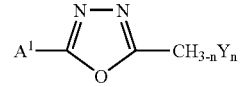

In the formula (2), A$^1$ represents a phenyl group, a naphthyl group, a substituted phenyl group or a substituted naphthyl group or has the same meaning as R in the formula (1)

(wherein a substituent is a halogen atom, an alkyl group, a fluoroalkyl group, an alkoxy group, a nitro group, a cyano group or a methylenedioxy group). Y represents a halogen atom; and n represents an integer of from 1 to 3.

Formula (3):

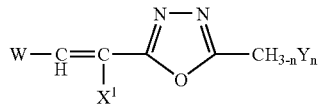

In the formula (3), W represents an unsubstituted or substituted phenyl group or an unsubstituted naphthyl group or has the same meaning as R in the formula (1) (wherein a substituent of a phenyl group is a halogen atom, a nitro group, a cyano group an alkyl group having from 1 to 3 carbon atoms or an alkoxy group having from 1 to 4 carbon atoms; in the case where a halogen atom is contained as a substituent, the phenyl group has one or two substituents, otherwise it has single substituent). $X^1$ represents a hydrogen atom, a phenyl group or an alkyl group having from 1 to 3 carbon atoms. Y represents a halogen atom; and n represents an integer of from 1 to 3.

Formula (4):

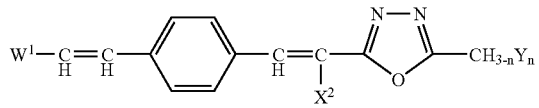

In the formula (4), $W^1$ represents an unsubstituted or substituted phenyl group or an unsubstituted naphthyl group or has the same meaning as R in the formula (1) (wherein a substituent of a phenyl group is a halogen atom, a nitro group, a cyano group, an alkyl group having from 1 to 3 carbon atoms or an alkoxy group having from 1 to 4 carbon atoms; in the case where a halogen atom is contained as a substituent, the phenyl group has one or two substituents, otherwise it has a single substituent). $X^2$ represents a hydrogen atom, a halogen atom, a cyano group, an alkyl group or an allyl group. Y represents a halogen atom; and n represents an integer of from 1 to 3.

Formula (5):

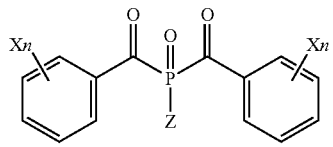

In the formula (5), Z represents an unsubstituted or substituted phenyl group, an unsubstituted naphthyl group or a fluoroalkyl group or has the same meaning as R in the formula (1) (wherein a substituent of a phenyl group is a halogen atom, a nitro group, a cyano group, an alkyl group having from 1 to 3 carbon atoms or an alkoxy group having from 1 to 4 carbon atoms). X's may be either the same or different and each represents a hydrogen atom, a halogen atom or an alkyl group or has the same meaning as R in the formula (1). n represents an integer of from 1 to 5, provided that at least one of Z and X's has the same meaning as R in the formula (1).

(7) An optical film as described in any one of the above (1), (2) and (5) wherein the ionizing radiation-curing compound is a compound having two or more ethylenically unsaturated groups.

(8) An antireflective film as described in any one of the above (3), (4) and (6) wherein the ionizing radiation-curing compound is a compound having two or more ethylenically unsaturated groups.

(9) An antireflective film as described in any one of the above (3), (4), (6) and (8) wherein the antireflective layer has a low-refractive index layer and the low-refractive index layer is formed by using a coating solution containing a fluoropolymer.

(10) An antireflective film as described in the above (9) wherein the fluoropolymer is a fluoropolymer represented by the following formula (1A):

Formula (1A):

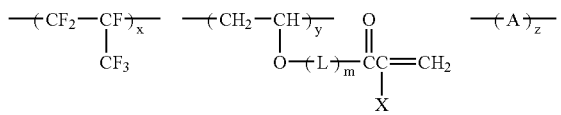

In the formula (1A), L represents a linking group having from 1 to 10 carbon atoms m represents 0 or 1. X represents a hydrogen atom or a methyl group. A represents an arbitrary vinyl monomer polymerization unit which may be either a single component or made up of multiple components and which may contain a silicone moiety. x, y and z represent the mol percentages of respective constituents individually satisfying the relationships $30 \leq x \leq 60$, $5 \leq y \leq 70$ and $0 \leq z \leq 65$.

(11) An antireflective film as described in the above (9) wherein the fluoropolymer is a fluoropolymer represented by the following formula (2A):

Formula (2A):

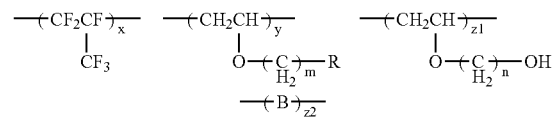

In the formula (2A), R represents an alkyl group having from 1 to 10 carbon atoms or an ethylenically unsaturated group (—C(=O)C(—X)=CH$_2$).

m represents an integer satisfying $1 \leq m \leq 10$, preferably $1 \leq m \leq 6$ and more preferably $1 \leq m \leq 4$.

n represents an integer satisfying $2 \leq n \leq 10$, preferably $2 \leq n \leq 6$ and more preferably $2 \leq n \leq 4$.

B represents a repeating unit derived from an arbitrary vinyl monomer which may be either a single component or made up of multiple components and which may contain a silicone moiety.

x, y, z1 and z2 represent the mol percentages of respective repeating units. It is preferable that x and y satisfy $30 \leq x \leq 60$ and $0 \leq y \leq 70$, more preferably $35 \leq x \leq 55$ and $0 \leq y \leq 60$ and particularly preferably $40 \leq x \leq 55$ and $0 \leq y \leq 55$. It is preferable that z1 and z2 satisfy $1 \leq z1 \leq 65$ and $1 \leq z2 \leq 65$, more preferably $1 \leq z1 \leq 40$ and $1 \leq z2 \leq 10$ and particularly preferably $1 \leq z1 \leq 30$ and $1 \leq z2 \leq 5$, provided that x+y+Z1+z2=100.

(12) An antireflective film as described in any one of the above (9) to (11) wherein the low-refractive index layer contains fine hollow silica particles.

(13) A method of producing an antireflective film having an antireflective layer comprising at least one layer on a transparent substrate wherein at least one of the layers laminated on the transparent support is formed by a layer forming method which comprises the following steps (i) to (iii) and in which the transport step (ii) and the curing step (iii) are continuously conducted:

(i) the step of forming a coating layer on a transparent support;

(ii) the step of transporting the film having the coating layer while heating to give a film face temperature of 25° C. or higher in an atmosphere wherein the oxygen concentration is lower than the atmospheric oxygen concentration; and (iii) the step of subjecting the film to ionizing radiation while heating to give a film face temperature of 25° C. or higher in an atmosphere of an oxygen concentration of 15% by volume or lower to thereby cure the coating layer.

(14) A method of producing an antireflective film as described in the above (3), (4) and (6) to (13) comprising the coating step of bringing the land of the front lip of a slot die close to the web surface that is continuously running while being supported by a backup roll and applying a coating solution from the slot of the lip, wherein the coating is conducted by using a coater which has a slot die having a land length of at least 30 μm but not more than 100 μm in the web-running direction of the front lip in the web-traveling direction side of the slot die and which is located so that, when the slot die is set at the coating position, the gap between the front lip in the direction opposite to the web-traveling direction and the web is larger by at least 30 μm but not more than 120 μm than the gap between the front lip in the web-traveling direction and the web.

(15) A method of producing an antireflective film as described in the above (14) wherein viscosity of the coating solution at the coating is 2.0 [mPa·sec] or less and the amount of the coating solution to be applied on the web surface is from 2.0 to 5.0 [ml/m$^2$].

(16) A method of producing an antireflective film as described in the above (14) or (15) wherein the coating solution is applied to the surface of the web, which is continuously running, at a speed of 25 [m/min] or hither.

(17) An antireflective film which is an antireflective film as described in any one of the above (3), (4) and (6) to (13) and produced by a method as described in any one of the above (13) to (16).

(18) A polarizing plate wherein an antireflective film as described in any one of the above (3), (4) and (6) to (13) is employed as one of a pair of protective films in the polarizing plate.

(19) An image display unit wherein an optical film as described in any one of the above (1), (2) and (5), an antireflective film as described in any one of the above (3), (4) and (6) to (13) or a polarizing plate as described in the above (18) is employed.

An image display unit provided with the optical film, antireflective film or polarizing plate of the invention suffers from little reflection of outside light or background and has highly excellent visibility. In addition, it is superior in scratch resistance to the existing ones.

According to the production method of the invention, furthermore, the antireflective film can be economically produced.

DESCRIPTION OF THE REFERENCE NUMERALS AND SIGNS

Figure 1:
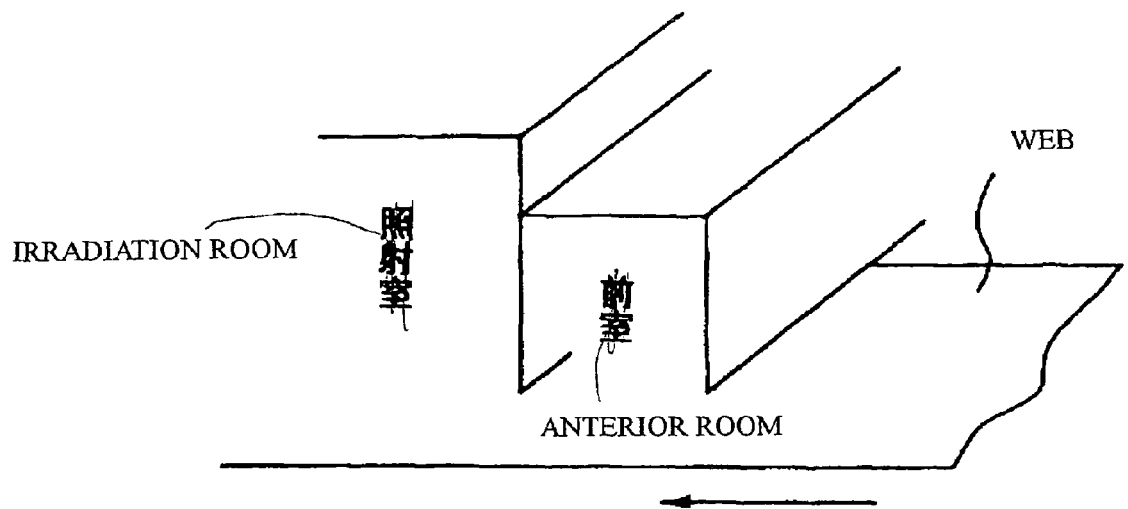
FIG. 1 is a schematic drawing which shows a production apparatus provided with an ionizing radiation reaction room and an anterior room.

| | |
|---|---|
| A | feeding roll |
| B | winding roll |
| 100, 200, 300, 400 | membrane-forming unit |
| 101, 201, 301, 401 | coating solution-applying step |
| 102, 202, 302, 402 | coating film-drying step |
| 103, 203, 303, 403 | coating film-curing step |
| 1 | antireflective film |
| 2 | transparent support |
| 3 | light diffusion layer |
| 4 | low-refractive index layer |
| 5 | light-transmitting particle |
| W | web |
| 10 | coater |
| 11 | backup roll |
| 13 | slot die |
| 14 | coating solution |
| 14a | bead form |
| 14b | coating membrane |
| 15 | pocket |
| 16 | slot |
| 16a | opening in slot |
| 17 | front lip |
| 18 | land (flat part) |
| 18a | up stream lip land |
| 18b | downstream lip land |
| $I_{UP}$ | land length of upstream lip land 18a |
| $I_{LO}$ | land length of downstream lip land 18b |
| LO | overbite length |
| $G_L$ | gap between front lip 17 and web W |
| 30 | slot die |
| 31a | upstream lip land |
| 31b | downstream lip land |
| 32 | pocket |
| 33 | slot |
| 40 | vacuum chamber |
| 40a | back plate |

-continued

| | |
|---|---|
| 40b | side plate |
| 40c | screw |
| $G_B$ | gap between back plate 40a and web W |
| $G_S$ | gap between side plate 40b and web W |

DETAILED DESCRIPTION OF THE INVENTION

Now, the invention will be described in greater detail. The expression "from (numerical value A) to (numerical value B)" as used herein in numerically indicating characteristics, physical properties or the like means "at least (numerical value A) but not more than (numerical value B)".

The antireflective film of the invention has a support (hereinafter also called a substrate or a substrate film in some cases), a hard coat layer as will be described hereinafter on the support if necessary, and an antireflective layer laminated thereon while taking the refractive index, membrane thickness, number of layers, the order of layers and so on into consideration so as to lower the reflectivity due to optical interference. In the simplest constitution, an antireflective layer generally employed comprises a low-refractive index layer alone formed on the substrate. To further lower the reflectivity, it is preferable that the antireflective film has a combination of a high refractive index layer having a refractive index higher than that of the substrate with a low refractive index layer having a refractive index lower than that of the substrate. Constitutional examples include a two-layered film having a high refractive index layer and a low refractive index layer from the substrate side, and a film having three layers differing in refractive index layered in the order of a medium refractive index layer (a layer having a refractive index which is higher than that of the substrate or the hard coat layer but lower than that of the high refractive index layer)/a high refractive index layer/a low refractive index layer. Moreover, there have been proposed antireflective films having a larger number of layers laminated together. Among all, an antireflective film in which a hard coat layer is formed on a substrate and a medium refractive index layer/a high refractive index layer/a low refractive index layer are layered thereon in this order is preferable from the viewpoints of durability, optical characteristics, cost and productivity. The antireflective film of the invention may have functional layers such as an antiglare layer and an antistatic layer in addition to the hard coat layer as described above.

Preferable layer constitutions of the antireflective film according to the invention are as follows
substrate film/low refractive index layer;
substrate film/antiglare layer/low refractive index layer;
substrate film/hard coat layer/antiglare layer/low refractive index layer;
substrate film/hard coat layer/high refractive index layer/low refractive index layer;
substrate film/hard coat layer/medium refractive index layer/high refractive index layer/low refractive index layer;
substrate film/antiglare layer/high refractive index layer/low refractive index layer;
substrate film/antiglare layer/medium refractive index layer/high refractive index layer/low refractive index layer;
substrate film/antistatic layer/hard coat layer/medium refractive index layer/high refractive index layer/low refractive index layer;
antistatic layer/substrate film/hard coat layer/medium refractive index layer/high refractive index layer/low refractive index layer;
substrate film/antistatic layer/antiglare layer/medium refractive index layer/high refractive index layer/low refractive index layer;
antistatic layer/substrate film/antiglare layer/medium refractive index layer/high refractive index layer/low refractive index layer; and
antistatic layer/substrate film/antiglare layer/high refractive index layer/low refractive index layer/high refractive index layer/low refractive index layer.

The layer constitution of the antireflective film according to the invention is not particularly restricted to these constitutions, so long as the reflectivity can be lowered thereby due to optical interference. The high-refractive index layer may be a light diffusion layer having no antiglare properties. The antistatic layer is preferably a layer containing electrically conductive polymer particles or fine particles of a metal oxide (for example, $SnO_2$ or ITO). It can be formed by, for example, coating or atmospheric plasma treatment.

[Light Diffusion Layer]

A light diffusion layer contains light-transmitting particles and a light-transmitting resin. The scattering light profile and haze are controlled by the light-transmitting particles and the light-transmitting resin. It is preferable in the invention to employ, in addition to particles of a single type, light-transmitting microparticles having two or more particle diameters or made of two or more materials.

It is preferable that the difference between the refractive index of the light-transmitting microparticles and the refractive index of the light-transmitting resin forming the entire light diffusion layer (in the case of adding inorganic microparticles or the like to the light-transmitting resin so as to control the refractive index of the layer as will be discussed hereinafter, the optical average refractive index) is from 0.03 to 0.30. It is preferable that the difference is at least 0.03, since the light diffusion effect can be easily achieved in this case due to the sufficiently large refractive index difference between them. It is preferable that the difference does not exceed 0.30, since the whole film scarcely undergoes whitening in this case. The refractive index difference is more preferably from 0.06 to 0.25 and most preferably from 0.09 to 0.20.

To elevate the visual qualities (improve viewing angle properties) in the invention, it is preferable that the particle diameter of the light-transmitting microparticles is from 0.5 to 3.5 μm, more preferably from 0.5 μm to 2.0 μm. By controlling the particle diameter, the light scattering angle distribution can be established.

To achieve favorable viewing angle properties and avoid whitening (clouding), it is particularly preferable that the light diffusion layer suitably usable in the invention is controlled by appropriately selecting the refractive index difference between the light-transmitting particles and the light-transmitting resin and the particle diameter of the light-transmitting microparticles.

Viewing angle properties are the more improved with an increase in the diffusion effect. To maintain the brightness on the front face to ensure favorable visual qualities, however, it is also needed to elevate the transmittance as far as possible. In the case where the particle diameter is less than 0.5 μm, a large scattering effect is achieved and thus the viewing angle properties are improved. In this case, however, the brightness is seriously lowered due to large backward scattering. In the case where the particle diameter exceeds 2.0 μm, on the other hand, the scattering effect is lessened and thus the viewing angle properties are little improved. Accordingly, the particle diameter preferably ranges from 0.6 μm to 1.8 μm, most preferably form 0.7 μm to 1.6 μm.

It is also preferred to add light-transmitting microparticles (second light-transmitting microparticles) not mainly aiming at the impartment of the diffusion effect. Such light-transmitting microparticles are employed to provide irregularities on the diffusion film surface to thereby prevent the reflection of background and so on. It is preferable that the particle diameter of the second light-transmitting microparticles is larger than the particle diameter of the first light-transmitting microparticles, still preferably from 2.5 μm to 10.0 μm. Thus, appropriate surface scattering can be imparted. To achieve favorable visual qualities, it is also necessary to prevent the reflection of outside light. A less cloudy and clear display can be achieved at a lower surface haze. In the case where the surface haze is too low, however, serious reflection arises. Therefore, it is required to provide a low-refractive index layer having a lower refractive index than that of the light diffusion layer as the outermost layer to thereby lower the reflectivity. To control the surface haze, it is preferable to provide appropriate irregularities on the resin layer surface by using the second light-transmitting microparticles, though the invention is not restricted thereto. In the case where the particle diameter is 2.5 μm or more, it becomes unnecessary to lessen the layer thickness in forming desired surface irregularities, which is favorable form the viewpoint of the film hardness. In the case where the particle diameter is less than 10 μm, on the other hand, individual particles become lighter, which is favorable from the viewpoint of particle sedimentation stability in the coating solution. Therefore, the particle diameter of the second light-transmitting microparticles is preferably from 2.7 μm to 9 μm, most preferably from 3 μm to 8 μm.

It is preferable that the difference between the refractive index of the second light-transmitting microparticles and the refractive index of the light-transmitting resin forming the entire light diffusion layer is smaller than that of the first light-transmitting microparticles.

Concerning the surface irregularities, it is preferable that the surface roughness Ra is 0.5 μm or less, more preferably 0.3 μm or less and most preferably 0.2 μm or less. The surface roughness (the centerline surface roughness) can be measured in accordance with JIS-B0601.

The haze, in particular, the inner scattering haze (inner haze) largely contributing to the diffusion of transmitting light, of the light diffusion layer strongly correlate to the effect of improving the viewing angle properties. Rays from the backlight are scattered by the light diffusion layer provided on the surface of the polarizing plate in the viewing side so as to improve the viewing angle properties. When rays are excessively scattered, however, the front luminance is lowered. Thus, it is preferable that the inner haze of the light diffusion layer is 45% or more but not more than 80%, more preferably 45% or more but not more than 70% and most preferably 45% or more but not more than 60%. The inner scattering haze can be elevated by, for example, using the light-transmitting microparticles for imparting the diffusibility at an increased concentration, enlarging the coating membrane thickness, enlarging the difference between the refractive index of the particles and the refractive index of the resin, and so on.

To enhance the visual qualities (improve the viewing angle properties), it is particularly preferred to control the scattering light strength at 30° to the light strength at an output angle of 0° in the scattering light profile determined with the use of a goniophotometer within a specific range. Namely, it is preferable that the scattering light strength at 30° to the light strength at an output angle of 0° in the scattering light profile with the use of a goniophotometer is 0.05% or more from the viewpoint of visual properties but not more than 0.3% from the viewpoint of regulating lowering in the front luminance. Therefore, it is preferable that this scattering light strength of the light diffusion layer of the invention is from 0.05 to 0.3%, more preferably from 0.05 to 0.2% and particularly preferably from 0.05 to 15%. It is still preferred that the requirement for the scattering light strength and the requirement for the inner haze as described above are both satisfied at the same time.

From the viewpoints of lessening the reflection of background and lessening clouding, the haze caused by surface scattering (surface haze) of the polarizing plate of the invention is preferably from 0.1 to 30%, more preferably 10% or less and still preferably 5% or less. In the case of emphasizing the prevention of the reflection of outside light, it is preferably 4% or less, more preferably 2% or less. By lowering the surface haze, the reflection becomes serious. It is therefore preferred to provide a low-refractive index layer and regulate the average integral reflectivity at 5° in the wavelength region of from 450 nm to 650 nm to 3.0% or less, more preferably 2.0% or less and most preferably 1.0% or less. In order to elevate the display qualities (improve viewing angle properties) in the invention, the inner scattering as described above should be controlled. At the same time, the surface haze and/or reflectivity are to be controlled within appropriate ranges so as to improve the contrast in a light place and establish the most favorable advantages.

The light-transmitting microparticles may be either monodispersion organic microparticles or inorganic microparticles. At a less variation in the particle diameter, the scattering properties with less variation can be obtained and thus the cloudiness can be easily designed. As the light-transmitting microparticles, plastic beads can be appropriately used. In particular, it is preferred to employ those having a high transparency and being capable of giving such a difference in refractive index from the light-transmitting resin as described above. As organic microparticles, use may be made of polymethyl methacrylate beads (refractive index 1.49), acryl-styrene copolymer beads (refractive index 1.54), melamine beads (refractive index 1.57), polycarbonate beads (refractive index 1.57), styrene beads (refractive index 1.60), crosslinked styrene beads (refractive index 1.61), polyvinyl chloride beads (refractive index 1.60), benzoguanamine-melamine formaldehyde beads (refractive index 1.68) and so on. As inorganic microparticles, use may be made of silica beads (refractive index 1.44 to 1.46), alumina beads (refractive index 1.63) and so on. The light-transmitting microparticles may be added in an amount of from 5 to 30 parts by mass per 100 parts by mass of the light-transmitting resin.

In the case of using such light-transmitting microparticles as described above, these light-transmitting microparticles are liable to settle out in the resin composition (the light-transmitting resin). Therefore, an inorganic filler such as silica may be added for preventing the settling. Although the higher effect of preventing the light-transmitting microparticles from settling can be obtained with an increase in the amount of the inorganic filler added, it sometimes undesirably affect the transparency of the coating membrane. Therefore, it is preferable that an inorganic filler having a particle diameter of 0.5 μm or less is added in an amount less than 0.1% by mass to the light-transmitting resin so that the transparency of the coating membrane is not worsened.

As the light-transmitting resin, use may be made of resins of three types, namely, a resin curing mainly by UV light/electron beam-irradiation, i.e., an ionizing radiation-curing resin, a mixture of an ionizing radiation-curing resin with a thermoplastic resin and a solvent, and a thermosetting resin. To impart hard coat properties, it is preferable to use an ionizing radiation-curing resin as the main component. The thickness of the light diffusion layer may be adjusted usually to 1.5 μm to 30 μm, preferably 3 μm to 20 μm. Although it is a common practice that the light diffusion layer also serves as a hard coat layer, a light diffusion layer having a thickness of 1.5 μm or more has insufficient hard coat properties. On the other hand, it is preferable form the viewpoint of curing and brittleness that the light diffusion layer thickness is 30 μm or less. In the case of providing a low-refractive index layer, the refractive index of the light-transmitting resin is preferably from 1.46 to 2.00, more preferably from 1.48 to 1.90 and still preferably from 1.50 to 1.80. The refractive index of the light-transmitting resin means the average refractive index of the light diffusion layer free from the light-transmitting microparticles. When the refractive index of the light diffusion layer is too low, the antireflective performance is worsened. When it is too high, on the other hand, there arises an undesirable tendency that the reflected light color becomes stronger. By taking these points into consideration, the refractive index preferably falls within the range as defined above. The refractive index of the light diffusion layer is adjusted to a desired level depending on the antireflective performance and the reflected light color.

It is preferable that a binder to be used in the light-transmitting resin is a polymer having a saturated hydrocarbon or polyether as the main chain. A polymer having a saturated hydrocarbon as the main chain is still preferred. It is also preferable that the binder has been crosslinked. It is preferable to obtain a polymer having a saturated hydrocarbon as the main chain by the polymerization of an ethylenically unsaturated monomer. To obtain a crosslinked binder, it is preferable to employ a monomer having two or more ethylenically unsaturated groups.

Examples of the monomer having two or more ethylenically unsaturated bonds include esters of polyhydric alcohol with (meth)acrylic acid (for example, ethylene glycol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, dipentaerythritol hexa (meth)acrylate, 1,3,5-cyclohexane triol trimethyacrylate, polyurethane polyacrylate and polyester polyacrylate), vinyl benzene derivatives (for example, 1,4-divinyl benzene, 4-vinylbenzoic acid-2-acryloylethyl ester and 1,4-divinyl cyclohexanone), vinyl sulfones (for example, divinyl sulfone), and acrylamide (for example, methylenebisacrylamide). Among them, an acrylate or methacryalte monomer having at least three functional groups is preferred and an acrylate or methacrylate monomer having at least five functional groups is more preferred from the viewpoints of film hardness and scratch resistance. A mixture of dipentaerythritol pentaacrylate with dipentaerythritol hexaacrylate, which is marketed, is particularly preferably usable.

Such a monomer having ethylenically unsaturated bonds can be cured by dissolving in a solvent together with a photo radical polymerization initiator or a heat radical polymerization initiator and subjecting to ionization radiation or heating.

It is also possible to conduct a reaction with a crosslinking group, as a substitute for the monomer having two or more ethylenically unsaturated bonds or in addition thereto, to thereby introduce the crosslinked structure into the binder. Examples of the crosslinking functional group include an isocyanate group, an epoxy group, an aziridine group, an oxazoline group, an aldehyde group, a carbonyl group, a hydrazine group, a carboxyl group, a methylol group and an active methylene group. As a monomer for introducing a crosslinked structure, use can be also made of vinylsuflonic acid, acid anhydrides, cyanoacrylate derivatives, melamine, etherified methylol, esters and urethane and metal alkoxides such as tetramethoxysilane. It is also possible to use a functional group that shows crosslinking ability as the result of a decomposition reaction, for example, a blocked isocyanate group. Namely, the crosslinking functional group to be used in the invention may be either one showing an immediate reactivity or one showing a reactivity after decomposition. The binder polymer containing such a crosslinking functional group can form a crosslinked structure by heating after the application.

It is preferable that the light-transmitting resin is made up of, in addition to the binder polymer as described above, a monomer having a high refractive index and/or ultrafine particles of a metal oxide having a high refractive index and so on. Specific examples of the monomer having high refractive index include bis(4-methacryloylthiophenyl)sulfide, vinyl naphthalene, vinyl phenyl sulfide and 4-methacryloyloxyphenyl-4'-methoxyphenyl thioether. Preferable examples of the ultrafine metal oxide particles having high refractive index include ultrafine particles containing oxide(s) of at least one metal selected from among zirconium, titanium, aluminum, indium, zinc, tin and antimony and having an average particle diameter of 100 nm or less, more preferably 50 nm or less. As the ultrafine metal oxide particles having high refractive index, it is preferable to use ultrafine particles of an oxide of at least one metal selected from among Al, Zr, Zn, Ti, In and Sn. Specific examples thereof include $ZrO_2$, $TiO_2$, $Al_2O_3$, $In_2O_3$, ZnO, $SnO_2$, $Sb_2O_3$, ITO and so on. Among all, it is particularly preferable to use $ZrO_2$. It is preferable that the monomer having a high refractive index or the ultrafine metal oxide particles are added in an amount of from 10 to 90% by mass, still preferably from 20 to 80% by mass, based on the total mass of the light-transmitting resin.

It is preferable to form the light diffusion layer by applying a cellulose acetate film. To prevent the excessive penetration of the light diffusion layer components into the transparent substrate film and ensure the adhesiveness between the light diffusion layer and the transparent substrate film, the solvent of the coating solution for forming the light diffusion layer comprises at least one solvent in which the transparent substrate film (for example, a triacetylcellulose support) is soluble and at least one solvent in which the transparent substrate film is insoluble. It is more preferable that at least one solvent in which the transparent substrate film is soluble has a higher boiling point than at least one solvent in which the transparent substrate film is insoluble. It is more preferable that the difference between the boiling point of a solvent having the highest boiling point among the solvents in which the transparent substrate film is soluble and the boiling point of a solvent having the highest boiling point among the solvents in which the transparent substrate film is insoluble is 30° C. or more, most preferably 40° C. or more.

Examples of the solvents in which the transparent substrate film (preferably triacetylcellulose) include ethers having from 3 to 12 carbon atoms such as dibutyl ether, dimetoxymethane, dimethoxyethane, diethoxyethane, propylene oxide, 1,4-dioxane, 1,3-dioxolane, 1,3,5-trioxane, tetrahydrofuran, anisole and phenetole; ketones having from 3 to 12 carbon atoms such as acetone, methyl ethyl ketone, diethyl ketone, dipropylketone, diisobutyl ketone, cyclopentanone, cyclohexanone and methylcyclohexanone; esters having from 3 to 12 carbon atoms such as ethyl formate, propyl formate, n-pentyl formate, methyl acetate, ethyl acetate, methyl propionate, ethyl propionate, n-pentyl acetate and γ-butyrolactone; organic solvents having two or more functional groups such as methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate and ethyl acetoacetate. Either one of these solvents or a combination of two or more thereof may be used. As the solvent in which the transparent support is soluble, a ketone solvent is preferred.

As the solvent in which the transparent support film (preferably triacetylcellulose) is insoluble, citation may be made of methanol, ethanol, 1-propanol, 2-propanol, 1-butanol, 2-butanol, tert-butanol 1-pentanol, 2-methyl-2-butanol, cyclohexanol, isobutyl acetate, methyl isobutyl ketone, 2-octanone, 2-pentanone, 2-hexanone, 2-heptanone, 3-pentanone, 3-heptanone, 4-heptanone and toluene. Either one of these solvents or a combination of two or more thereof may be used.

The mass ratio (A/B) of the total mass of the solvent (A), in which the transparent support is soluble, to the total mass of the solvent (B), in which the transparent support is insoluble, preferably ranges from 5/95 to 50/50, more preferably from 10/90 to 40/60 and more preferably from 15/85 to 30/70.

The ionizing radiation-curing resin composition as discussed above can be cured by a method usually employed for curing such an ionizing radiation-curing resin composition as described above, namely, irradiation with electron beams or UV light.

In the case of electron beam-curing, for example, use may be made of electron beams having energy of 50 to 1000 KeV, preferably 100 to 300 KeV generated from electron beam accelerators of various types such as the Cockcroft-Walton type, the Vandegraph type, the resonance transformer type, the isolated core transformer type, the linear type, the Dynamitron type, and the high-frequency type. In the case of UV-curing, use may be made of UV light generated from rays of an ultrahigh pressure mercury lamp, a high pressure mercury lamp, a low pressure mercury lamp, a carbon arc, a xenon arc, a metal halide lamp and so on.

[Fluorinated Photopolymerization Initiator]

The optical film and antireflective film according to the invention has a layer formed on a support by curing a composition, which contains at least one fluorinated photopolymerization initiator and an ionizing radiation-curing compound, by ionizing radiation. This layer may be at least one of the layers cited above as preferable constitutions of the antireflective film.

The fluorinated photopolymerization initiator generally has a tendency toward an increase in the concentration around the surface layer after the coating and drying. Thus the radical generated by the ionizing radiation quenches oxygen around the surface layer to thereby lessen the effect of the oxygen from the surface layer. Thus, the polymerization of the whole film can be effectively proceeded.

In the invention, it is particularly preferable to employ at least one compound selected from the compounds represented by the following formulae (1) to (5).

Now, the compounds represented by the following formulae (1) to (5) will be illustrated.

Formula (1):

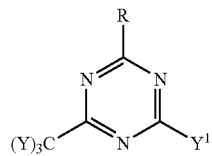

In the formula (1), Y represents a halogen atom. $Y^1$ represents —$CY_3$, —$NH_2$, —NHR', —$NR'_2$ or —OR'. R' represents an alkyl group, a fluoroalkyl group or an aryl group. R represents a group selected from the group consisting of $R_a$—$Y_1$—, $R_a$—$Y_1$—$(CH_2)_r$—, $R_a$—$(CH_2)_r$—$Y_1$—, $R_a$—$Y_1$—$(CH_2)_s$—O—, $R_a$—$Y_1$—$(CH_2)_s$—S—, $R_a$—$Y_1$—$(CH_2)_s$—$NR_1$—, —$CY_3$, an alkyl group, a substituted alkyl group, a fluoroalkyl group, a substituted fluoroalkyl group, an aryl group, a substituted aryl group and a substituted alkenyl group. $Y_1$'s independently represent each a divalent group selected from the group consisting of —O—, —S—, —O—C(=O)— and —O—Si$(R_2)_2$—$(CH_2)_r$—. $R_2$ represents an alkyl group having from 1 to 12 carbon atoms or a phenyl group.

$R_a$ represents a linear or branched terminal chain: $Z^1CF_2$(—O—$C_2F_4)_p$—$(CF_2)_q$— (wherein $Z^1$ represents H or F; and one of p and q represents an integer of from 0 to 20 while the other represents an integer of from 1 to 20.

It is particularly preferable to use a compound of the formula (1) wherein $Y^1$ is —$CY_3$. It is preferable that Y is a Cl, Br of F atom.

Specific examples of the compound represented by the formula (1) are as follows.

1

C₈F₁₇—CH₂CH₂—O—[triazine with CCl₃, CCl₃]

2

C₈F₁₇—CH₂CH₂—O—[triazine with CBr₃, CBr₃]

3

C₈F₁₇—CH₂CH₂—O—[triazine with NH₂, NH₂]

4

C₈F₁₇—CH₂CH₂—O—[phenyl]—[triazine with CCl₃, CCl₃]

-continued

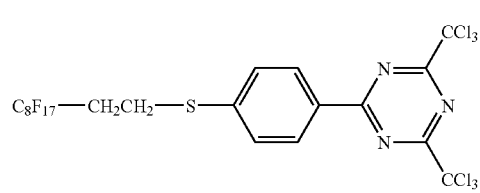
5

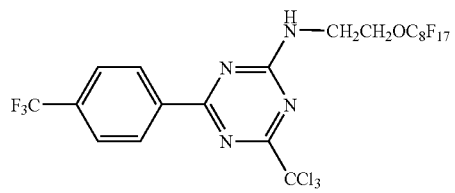
6

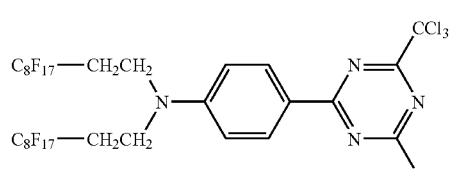
8

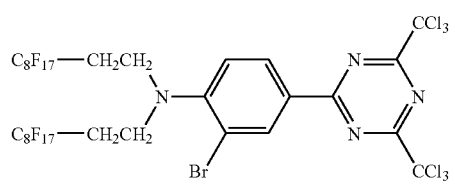
9

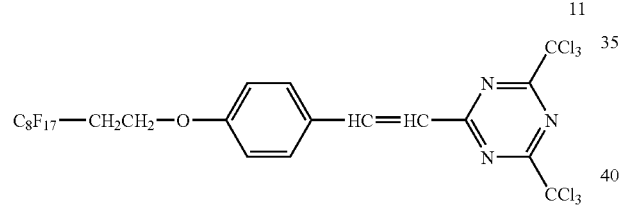
11

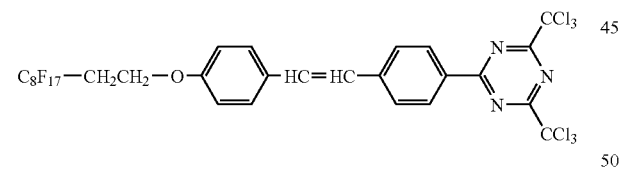
12

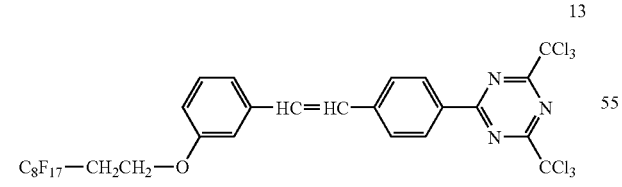
13

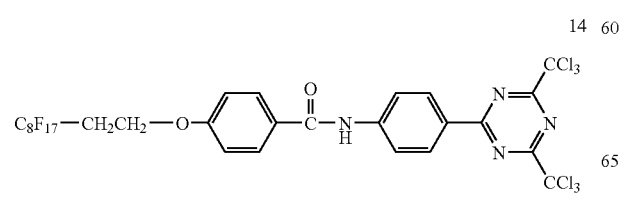
14

-continued

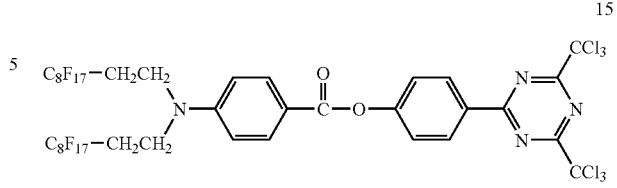
15

Formula (2):

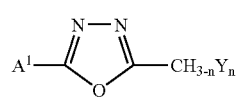

In the formula (2), $A^1$ represents a phenyl group, a naphthyl group, a substituted phenyl group or a substituted naphthyl group or has the same meaning as R in the formula (1) (wherein a substituent is a halogen atom, an alkyl group, a fluoroalkyl group, an alkoxy group, a nitro group, a cyano group or a methylenedioxy group). Y represents a halogen atom; and n represents an integer of from 1 to 3.

Specific examples of the compound represented by the formula (2) are as follows.

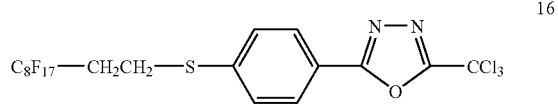
16

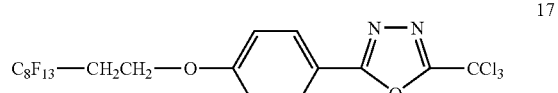
17

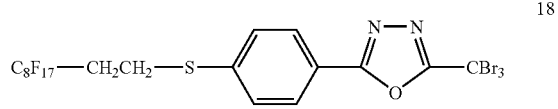
18

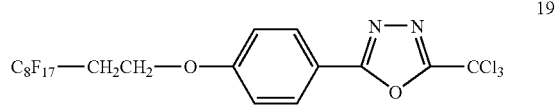
19

Formula (3):

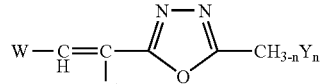

In the formula (3), W represents an unsubstituted or substituted phenyl group or an unsubstituted naphthyl group or has the same meaning as R in the formula (1) (wherein a substituent of a phenyl group is a halogen atom, a nitro group, a cyano group an alkyl group having from 1 to 3 carbon atoms or an alkoxy group having from 1 to 4 carbon atoms; in the case where a halogen atom is contained as a substituent, the phenyl group has one or two substituents, otherwise it has a single substituent). $X^1$ represents a hydrogen atom, a phenyl group or an alkyl group having from 1 to 3 carbon atoms. Y represents a halogen atom; and n represents an integer of from 1 to 3.

Specific examples of the compound represented by the formula (3) are as follows.

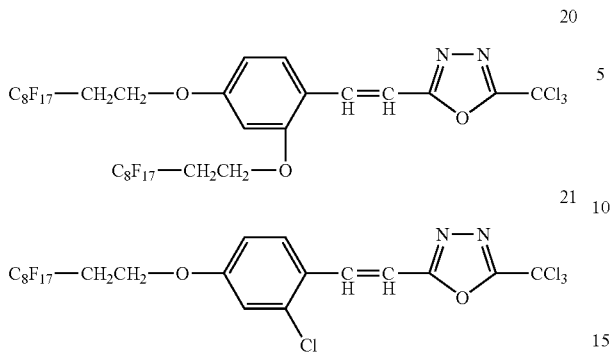

Formula (4):

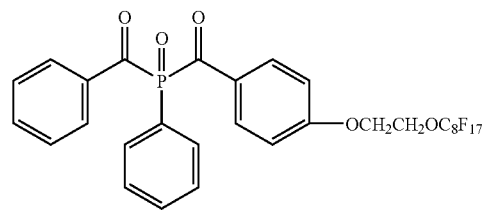

W¹ represents an unsubstituted or substituted phenyl group or an unsubstituted naphthyl group or has the same meaning as R in the formula (1) (wherein a substituent of a phenyl group is a halogen atom, a nitro group, a cyano group, an alkyl group having from 1 to 3 carbon atoms or an alkoxy group having from 1 to 4 carbon atoms; in the case where a halogen atom is contained as a substituent, the phenyl group has one or two substituents, otherwise it has a single substituent). $X^2$ represents a hydrogen atom, a halogen atom, a cyano group, an alkyl group or an allyl group. Y represents a halogen atom; and n represents an integer of from 1 to 3.

Specific examples of the compound represented by the formula (4) are as follows.

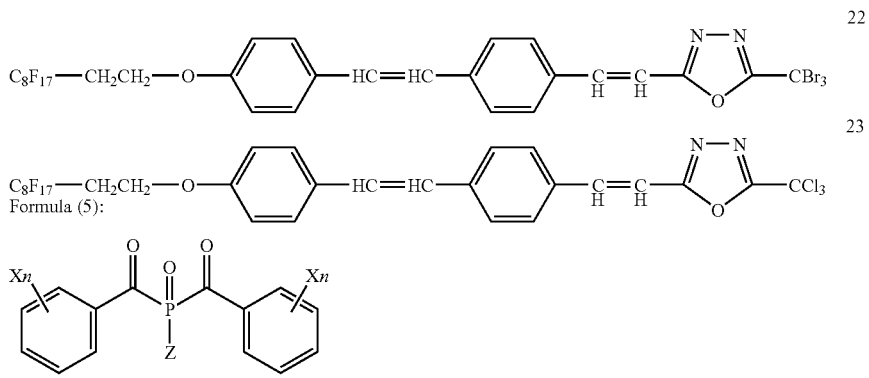

Formula (5):

In the formula (5), Z represents an unsubstituted or substituted phenyl group, an unsubstituted naphthyl group or a fluoroalkyl group or has the same meaning as R in the formula (1) (wherein a substituent of a phenyl group is a halogen atom, a nitro group, a cyano group, an alkyl group having from 1 to 3 carbon atoms or an alkoxy group having from 1 to 4 carbon atoms). X's may be either the same or different and each represents a hydrogen atom, a halogen atom or an alkyl group or has the same meaning as R in the formula (1). n represents an integer of from 1 to 5, provided that at least one of Z and X's has the same meaning as R in the formula (1).

Specific examples of the compound represented by the formula (5) are as follows.

-continued

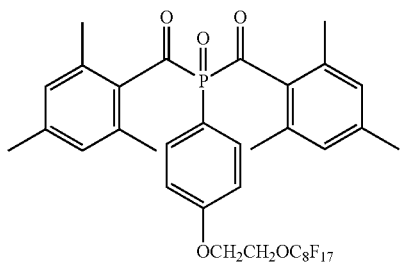

The compounds represented by the formulae (1) to (5) can be easily synthesized by a person skilled in the art in accordance with a synthesis method described in, for example, M. P. Hutt, F. Elslager and L. M. Werbel, Journal of Heterocyclic Chemistry, Vol. 7 (No. 3), p. 51 and thereafter (1970). An S-triazine compound can be synthesized by the following method. Namely, by using an aromatic nitrile compound, which is synthesized in accordance with a method described in Ed. by R. Adams et al, *Organic Syntheses* (J. Wiley & Sons) Collective Column 2, p. 623 or a method described in V. Coviello et al., Helvetica Chimica Acta, 59, 819-834 (1976), and a haloacetonitrile, cyclization is made in accordance with a method described in K. Wakabayashi et al., Bulletin of the Chemical Society of Japan, 42, 2924-2930 (1969) to thereby synthesize the target compound.

Although the fluorinated photopolymerization initiator may be used in an arbitrary amount without restriction, it is to be used preferably in the range of from 0.1 to 30 parts by mass, more preferably form 1 to 20 parts by mass, per 100 parts by mass of the ionizing radiation-curing compound. Two or more types of fluorinated photopolymerization initiators may be used. It is also possible to use the fluorinated photopolymerization initiator together with another polymerization initiator (non-fluorinated photopolymerization initiator) such as a radical polymerization initiator or a photosensitizer.

[Other Polymerization Initiators]

As the photo radical polymerization initiator and the photosensitizer, use can be made of acetophenones, benzoins, benzophenones, phosphine oxides, ketals, anthraquinones, thioxanthones, azo compounds, peroxides (JP-A-2001-139663, etc.), 2,3-dialkyldione compounds, disulfide compounds, fluoroamine compounds, aromatic sulfonium compounds, lophine dimers, onium salts, borate salts, active esters, active halogens, inorganic complexes, coumarins and so on.

Examples of the acetophenones include 2,2-dimethoxyacetophenone, 2,2-diethoxyacetophenone p-dimethylacetophenone, 1-hydroxydimetmhyl phenyl ketone, 1-hydroxy-dimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydichloroacetophenone and 4-t-butyl-dichloroacetophenone.

Examples of the benzoins include benzoin, benzoin methyl ether, benzoin ethyl ether, benzoin isopropyl ether, benzyl dimethyl ketal, benzoin benzenesulfonate and benzoin toluenesulfonate.

Examples of the benzophenones include benzophenone, hydroxybenzophenone, 4-benzoyl-4'-methyldiphenyl sulfide, 2,4-dichlorobenzophenone, 4,4-dichlorobenzophenone, p-chlorobenzophenon, 4,4'-dimethylaminobenzophenone (Michler's ketone), 3,3',4,4'-tetra(t-butylperoxycarbonyl) benzophenone and so on.

Examples of the phosphine oxides include 2,4,6-trimethylbenzoyldiphenylphosphine oxide.

Examples of the active esters include 1,2-octaneone, 1-[4-(phenylthio-2-(O-benzyloxime)], sulfonic acid esters, cyclic active ester compounds and so on.

More specifically speaking, compounds 1 to 21 described in EXAMPLES of JP-A-2000-80068 are particularly preferable.

Examples of the onium salts include aromatic diazoium salts, aromatic iodonium salts and aromatic sulfonium salts.

Examples of the borate salts include organic boric acid salt compounds reported by, for example, Japanese Patent No. 2764769, JP-A-2002-116539, Kunz, Martin, *Rad Tech* 98, Proceeding April, p. 19-22, 1998, Chicago, etc. For example, citation may be made of compounds described in the paragraphs [0022] to [0027] in JP-A-2002-116539 as described above. Specific examples of other organic boron compounds include organic boron transition metal coordination complexes (for example, ion complexes with cationic dyes) reported by JP-A-6-348011, JP-A-7-128785, JP-A-7-140589, JP-A-7-306527, JP-A-7-292014 and so on.

Specific examples of the active halogens include compounds reported by Wakabayashi, et al., Bull Chem. Soc. Japan, Vol. 42, p. 2921 (1969), U.S. Pat. No. 3,905,815, JP-A=5-27830, M. P. Hutt, Journal of Heterocyclic Chemistry, Vol. 1(3), (1970), etc. Among all, trihalomethyl-substituted oxazole compounds and s-triazine compounds may be cited. As more preferable examples thereof, s-triazine derivatives having at least mono-, di- or trihalogen-substituted methyl group is attached to the s-triazine ring may be cited. As specific examples thereof, there are known s-triazine and oxathiazole compounds such as 2-(p-methoxyphenyl)-4,6-bis(trichloromethyl)-s-triazine, 2-(p-styrylphenyl)-4,6-bis(trichloromethyl)-s-triazine, 2-(3-Br-4-di(ethyl acetate) amino)phenyl)-4,6-bis(trichloromethyl)-s-triazine and 2-trihalomethyl-5-(p-methoxyphenyl)-1,3,4-oxadiazole.

More specifically speaking, it is particularly preferable to employ compounds described in p. 14 to p. 30 in JP-A-58-15503, p. 6 to p. 10 in JP-A-55-77742, No. 1 to No. 8 in P. 287 in JP-B-60-27673, No. 1 to No. 17 in p. 443 to p. 444 in JP-A-60-239736, No. 1 to Nol. 19 in U.S. Pat. No. 4,701,399 and so on.

As an example of the inorganic complexes, bis($\eta^5$-2,4-cyclopentadien-1-yl)-bis(2,6-difluoro-3-(1H-pyrrol-1-yl)-phenyl)titanium may be cited.

As an example of the coumarins, 3-ketocoumarin may be cited.

Either one of these initiators or a mixture thereof may be used. Moreover, various examples are presented in *Saishin UV Koka Gijutsu*, publisher: GIJUTSU KYOKAI K.K., 1991, p. 159 and *Shigaisen Koka Shisutem*, K. Kato (1989), publisher: SOGO GIJUTSU SENTA, p. 65 to 148 and these initiators are useful in the invention.

As preferable examples of commercially available photo radical polymerization initiators of photo cleavage type, "IRGACURES (651, 184, 819, 907, 1870 (CGI-403/Irg184=7/3 mixture initiators, 500, 369, 1173, 2959, 4265, 4263, etc.), OXE01); manufactured by Ciba-Specialty Chemicals" and KAYACURE (DETX-S, BP-100, BDML, CTX, BMS, 2-EAQ, ABQ, CPTX, EPD, ITX, QTX, BTC, MCA, etc.; manufactured by NIPPON KAYAKU Co., Ltd.), ESACURE (KIP100F, KB1, EB3, BP, X33, KT046, KT37, KIP150, TZT; manufactured by SARTOMER Co.), etc. and combination thereof may be cited.

In the case where such another The photopolymerization initiator (a non-fluorinated photopolymerization initiator) is used, it is preferably employed in an amount of from 0.1 to 15 parts by mass, more preferably from 1 to 10 parts by mass, per 100 parts by mass of the ionizing radiation-curing compound.

It is estimated that the fluorinated photopolymerization initiator would relieve the effect of oxygen on the surface layer and thus play an effective role in promoting the curing of the surface layer, while the non-fluorinated photopolymerization initiator would ensure the promotion of the curing within the layer. Thus, it appears favorable to use the fluorinated photopolymerization initiator together with the non-fluorinated photopolymerization initiator.

In addition to the photopolymerization initiator, it is also possible to use a photosensitizer. Specific examples of the photosensitizer include n-butylamine, triethylamine, tri-n-butylphosphine, Michler's ketone, thioxanthone and so on.

Moreover, use may be made of an auxiliary agent such as an azide compound, a thiourea compound or a mercapto compound or a combination thereof.

Examples of commercially available photosensitizers include KAYACURES (DMBI and EPA) manufactured by NIPPON KAYAKU Co., Ltd. and so on.

As the heat radical initiator, use can be made of, for example, an organic or inorganic peroxide, an organic azo or diazo-compound.

More specifically speaking, examples of the organic peroxide include benzoyl peroxide, halogenobenzoyl peroxides, lauroyl peroxide, acetyl peroxide, dibutyl peroxide, cumene hydroxyperoxide and butyl hydroxyperoxide; examples of the inorganic peroxide include hydrogen peroxide, ammonium persulfate and potassium persulfate; examples of the azo compound include 2,2'-azobis(isobutyronitrile), 2,2'-azobis(propionitrile) and 1,1'-azobis(cyclohexanecarbonitrile); and examples of the diazo compound include diazoaminobenzene and p-nitrobenzene diazonium.

[Method of Curing Membrane]

It is preferable that the method of producing an antireflective film according to the invention involves the step of forming at least one layer which is laminated on the support by the following steps (1) and (2):

(1) the step of applying a coating solution containing at least one fluorinated photopolymerization initiator and an ionizing radiation-curing compound on a web containing a support, which is continuously running, and drying to thereby form a coating layer; and (2) the step of subjecting to the coating layer on the web to ionizing radiation for 0.5 sec or longer in an atmosphere with an oxygen concentration of 15% by volume or less to thereby cure the coating layer (hereinafter, the step (2) of forming the coating layer is sometimes referred to as "curing step").

It is preferable to conduct the ionizing radiation in an atmosphere with an oxygen concentration of 15% by volume or less, more preferably 10% by volume or less and more preferably 5.0% by volume or less. It is undesirable from the viewpoint of production cost to needlessly lower the oxygen concentration, since a large amount of an inert gas should be used therefor. To lower the oxygen concentration, it is preferred to replace the atmosphere (comprising about 79% by volume of nitrogen and about 21% by volume of oxygen) with another inert gas, more preferably with nitrogen (i.e., nitrogen purging).

In the invention, it is preferable to cure the coating layer by subjecting the coating layer on the web to ionizing radiation for 0.5 sec or longer in an atmosphere with an oxygen concentration of 15% by volume or less. The radiation time preferably ranges from 0.7 sec to 60 sec after the initiation of the radiation, more preferably from 0.7 sec to 10 sec. In the case where the radiation time is less than 0.5 sec, the curing reaction cannot be completed and thus sufficient curing cannot be made.

The term "web" as used herein may be either the support per se or the support having a layer forming thereon.

In the invention, it is preferable that the curing step is conducted in an ionizing radiation room (hereinafter sometimes referred to simply as "reaction room") in which the oxygen concentration is controlled to a desired level. In supplying an inert gas into the ionizing radiation room, the supplying conditions are controlled so that the gas is somewhat blown in the web-inlet side (the inlet through which the web is introduced) of the reaction room. Thus, the invasion of the air transported together with the web can be eliminated and the oxygen concentration in the reaction room can be effectively lowered. At the same time, the substantial oxygen concentration on the super surface, wherein curing is seriously inhibited by oxygen, can be efficiently lowered. The inert gas flow direction in the web-inlet side of the reaction room can be controlled by adjusting the air supply/air discharge balance in the reaction room. To eliminate the transport air, it is also preferable to directly spray the inert gas to the coating layer surface on the web immediately before the ionizing radiation. In particular, it is preferable to cure the low-refractive index layer, which serves as the outermost layer and has a small membrane thickness, by this method.

It is also preferable to locate an anterior room in front of the reaction room. It is preferable that the inside of the anterior room has been replaced with an inert gas and thus has a low oxygen concentration of, preferably, 5% by volume or less but not less than 0.01% by volume. The web may be merely passed (transported) through the anterior room before the ionizing radiation. Alternatively, the inert gas may be directly sprayed to the coating layer surface on the web therein for eliminating the transport air as described above.

By providing the anterior room and thus preliminarily eliminating oxygen on the coating layer surface, the oxygen concentration in the reaction room can be maintained at a low level and thus the curing can be conducted at an elevated efficiency.

To efficiently utilize the inert gas, it is preferred that the gap between at least one of the side faces constituting the web-inlet side of the ionizing radiation reaction room or the anterior room and the coating layer surface on the web is adjusted to 0.2 to 15 mm, more preferably 0.2 to 10 mm and most preferably 0.2 to 5 mm. The gap means the distance between the coating layer surface on the web and the top end in the web-inlet side of the side face constituting the web-inlet side.

To continuously produce the web, however, it is necessary to unite the web by bonding. For the bonding, it is a common practice to employ a bonding tape or the like. In the case where the gap between the inlet of the ionizing radiation reaction room or the anterior room and the coating layer surface on the web is too small, there arises a problem of the hung up of the bonding member such as a bonding tape. To lessen the gap, therefore, it is preferable to make at least a part of the inlet face of the ionizing radiation room or the anterior room movable and enlarge the gap by the thickness of the bonded part, when the bonded part enters the room. To achieve this object, use may be made of a method (A) which comprises making the inlet face of the ionizing radiation room or the anterior room movable back and forth in the traveling direction and enlarging the gap by moving the face back and forth when a bonding part passes through the inlet; and a method (B) which comprises making the inlet face of the ionizing radiation room or the anterior room movable perpendicularly to the web face and enlarging the gap by moving the face up and down when a bonding part passes through the inlet.

As a working example of the web-inlet face of the reaction room or the anterior room applicable to the invention, the operation at the web-inlet face of the anterior room will be illustrated by reference to FIGS. 1 to 4 (in explaining these figures, a web having a coating layer (not shown) will be merely called a "web").

FIG. 1 is a schematic drawing which shows a production apparatus provided with an ionizing radiation reaction room and an anterior room of the invention.

Figure 2:
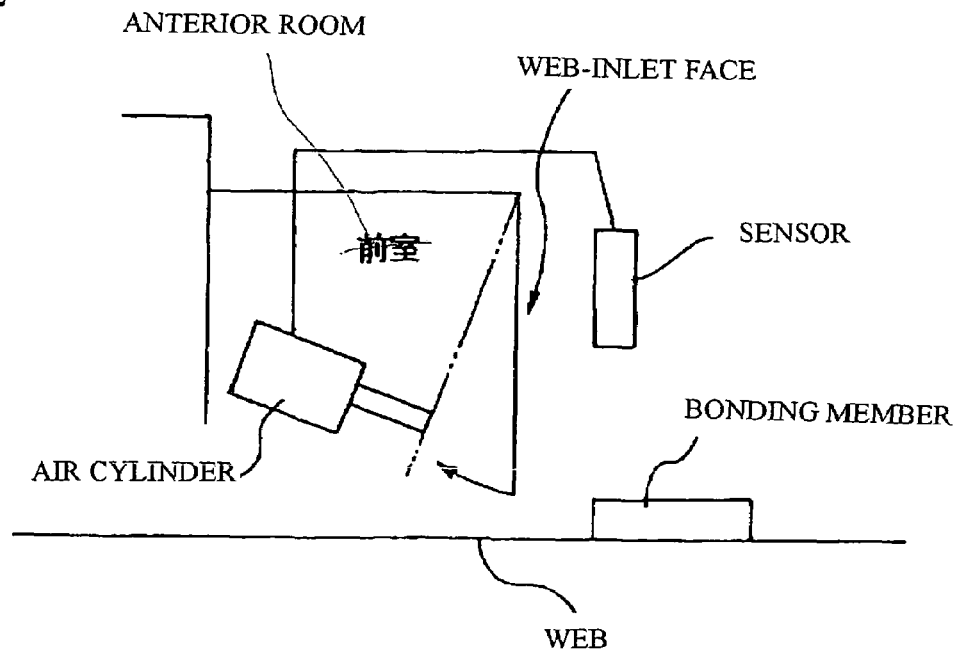
FIG. 2 is a side view which shows an example of the operation at the web-inlet face of a production apparatus according to the invention provided with an ionizing radiation reaction room and an anterior room.

FIG. 2 is a side view which shows an example of the operation at the web-inlet face of a production apparatus provided with an ionizing radiation reaction room and an anterior room of the invention, i.e., showing the mode (A) as described above. When a web is transported in the apparatus having the constitution as shown in FIG. 2, a bonding member, which is employed to uniting the web by bonding, is detected by a sensor before the bonding member enters the anterior room. Then the inlet face is moved back and front in the web-traveling direction by an air cylinder which is attached to at least a part of the web-inlet face of the anterior room and operated simultaneously with the above sensor via a control unit (not shown) to thereby make up for the thickness of the bonding member.

Figure 3:
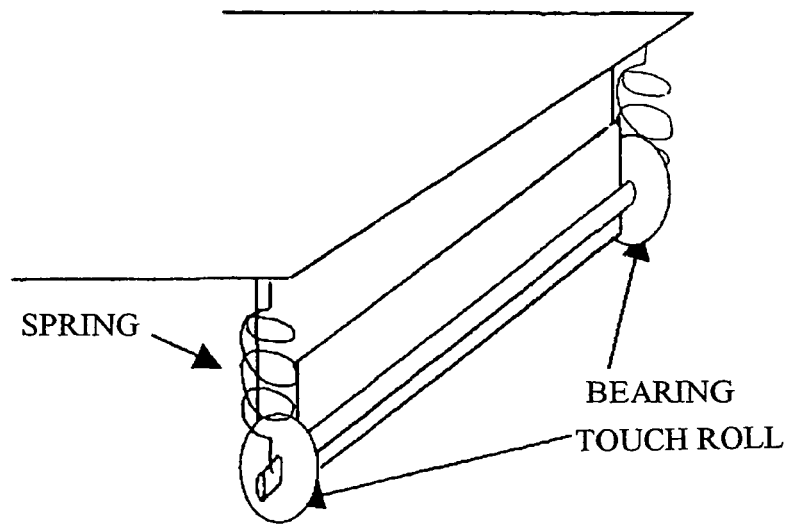
FIG. 3 is a drawing which schematically shows an example of the web-inlet face of the anterior room of a production apparatus to be used in the invention provided with an ionizing radiation reaction room and an anterior room.
Figure 4:
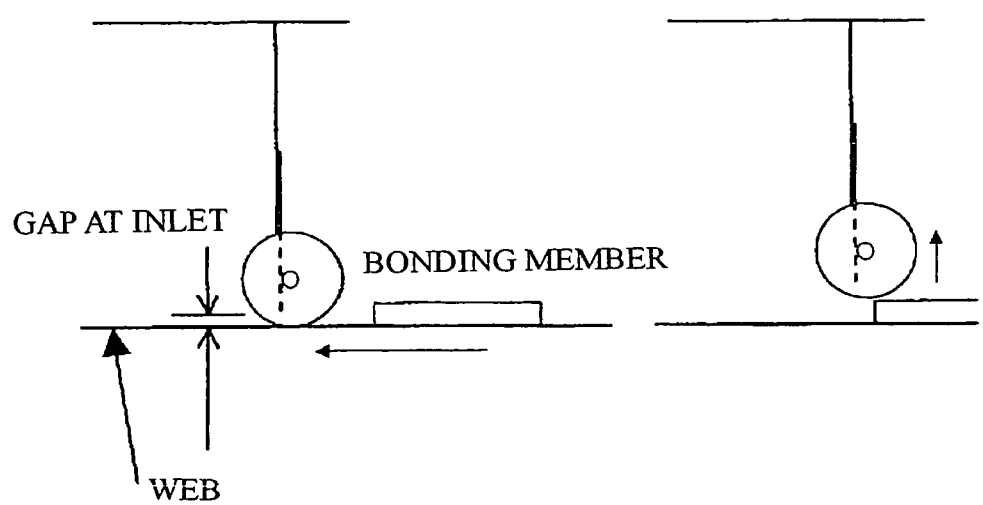
FIG. 4 is a side view which schematically shows the operation at the web-inlet face of the anterior room of FIG. 3.

FIGS. 3 and 4 are drawings which show the mode (B) as described above. Namely, FIG. 3 schematically shows the web-inlet face of the anterior room, while FIG. 4 shows the operation at the web-inlet face of the anterior room. A part of the web-inlet face of the anterior room is made movable and both of the width ends of the web are brought into contact with a bearing touch roll. Thus, the gap between the web and the inlet-face is determined. When a bonding member passes through, the bearing touch roll crosses over the bonding member so as to maintain the gap at the web-inlet face at a constant level. Any movable means may be used at the inlet without restriction so long as the bonding member can be made up for thereby.

In curing the coating layer on the web in the invention, it is also preferable to conduct the ionizing radiation, which is to be conducted in an atmosphere with an oxygen concentration of 5% by volume or less in the curing step as described above, multiple times.

In this case, it is preferred that the ionizing radiation is conducted at least twice in continuous atmospheres with an oxygen concentration of 5% by volume or less. By conducting the ionizing radiation several times in a single reaction room at a low oxygen concentration, a reaction time required for curing can be efficiently ensured. In the case where the production speed is elevated to establish a high productivity, in particular, the ionizing radiation should be carried out multiple times so as to hold the ionizing radiation energy required for the curing reaction. Thus, it is effective to employ the above-described modes so as to ensure the reaction time required for the curing reaction.

The term "continuous reaction room" means a mode wherein the ionizing radiation is conducted at least twice in a reaction room with an oxygen concentration of 5% by volume or less or a mode wherein at least two reaction rooms with an oxygen concentration of 5% by volume or less are provided and a low oxygen zone with an oxygen concentration of 5% by volume or less is located between these reaction rooms. In the latter case, the oxygen concentrations in individual rooms may be different, so long as being 5% by volume or less.

In the invention, it is preferable to conduct the curing step while heating the web so as to adjust the coating surface temperature to 25° C. or higher. It is also preferable that the web is heated, simultaneously with the ionizing radiation and/or continuously, in an atmosphere with an oxygen concentration of 5% by volume or less. By conducting the curing step under heating, the curing reaction is accelerated by the heat and thus a film having excellent physical strength and chemical resistance can be formed.

It is preferable that heating is made so as to control the coating layer surface temperature to 25° C. of higher but not higher than 170° C. Namely, a temperature of 25° C. or hither is favorable from the viewpoint of achieving sufficient curing, while a temperature not higher than 170° C. is favorable for preventing problems such as the deformation of the substrate. It is more preferable that the surface temperature is from 25° C. to 100° C. It is also preferable that the coating layer surface temperature is maintained at the temperature as defined above for 0.1 sec or longer but not longer than 300 sec, more preferably not longer than 10 sec. When the time of maintaining the coating layer surface temperature at the above temperature is too short, the reaction of the curing composition cannot be promoted. When the time is too long, on the contrary, there arise some problems in the production such as worsening in the optical performance of the film and necessity for a larger apparatus.

Although the method of heating is not particularly restricted, use may be preferably made therefor of the method of contacting the web with a heated roll, the method of blowing a heated nitrogen stream or irradiation with far infrared light or infrared light. It is also possible to employ a heating method described in Japanese Patent No. 2523574 which comprises flowing a heating medium such as hot water, steam or oil in a rotating metal roll. Moreover, use may be made of a dielectric heat roll for the heating.

The ionizing radiation species to be used in the invention is not particularly restricted but can be appropriately selected from among ultraviolet light, electron beams, near ultraviolet light, visible light, near infrared light, infrared light, X-ray and so on depending on the type of the curing composition for forming a film. It is preferable in the invention to employ UV-irradiation. UV-curing is preferred because of achieving a high polymerization speed, being available in a compact apparatus, allowing to use various compounds and being less expensive.

In the case of UV-curing, use may be made of an ultrahigh pressure mercury lamp, a high pressure mercury lamp, a low pressure mercury lamp, a carbon arc, a xenon arc, a metal halide lamp and so on. In the case of electron beam-curing, for example, use may be made of electron beams having energy of 50 to 1000 KeV generated from electron beam accelerators of various types such as the Cockcroft-Walton type, the Vandegraph type, the resonance transformer type, the isolated core transformer type, the linear type, the Dynamitron type, and the high-frequency type.

[Film-Forming Binder]

In the invention, it is preferable from the viewpoints of the film strength, the coating solution stability, the film productivity and so on that the film-forming curing composition contains an ionizing radiation, preferably a compound having an ethylenically unsaturated group, as the film-forming binder component. The content of the ionizing radiation-curing compound is preferably 10% by mass or more but not more than 100% by mass, more preferably 20% by mass or more but not more than 100% by mass and more preferably 30% by mass or more but not more than 95%, based on the film-forming components excluding inorganic particles. The term "ionizing radiation-curing compound" as used herein may be any compound curing by ionizing radiation.

As the film-forming binder and the ionizing radiation-curing compound, a polymer having a saturated hydrocarbon chain or a polyether chain as the main chain is preferred and a polymer having a saturated hydrocarbon chain as the main chain is more preferred. It is also preferable that such a polymer has a crosslinked structure.

As the polymer having a saturated hydrocarbon chain as the main chain and a crosslinked structure, a (co)polymer of monomer(s) having two or more ethylenically unsaturated bonds is preferable.

To achieve a high refractive index of the film, it is preferable to select a monomer having an aromatic ring or at least one atom selected from among halogen atoms other than fluorine, sulfur atom, phosphorus atom and nitrogen atom in its structure.

Examples of the monomer having two or more ethylenically unsaturated bonds include esters of polyhydric alcohol with (meth)acrylic acid (for example, ethylene glycol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate and polyester polyacrylate), divinyl benzene and its derivatives (for example, 1,4-divinyl benzene, 4-vinylbenzoic acid-2-acryloylethyl ester and 1,4-divinyl cyclohexanone), vinyl sulfones (for example, divinyl sulfone), acrylamides (for example, methylenebisacrylamide) and methacrylamides.

Two or more of these monomers may be used together. The terms "(meth)acrylate", "(meth)acryloyl" and "(meth)acrylic acid" as used herein respectively mean "acrylate or methacrylate", "acryloyl or methacryloyl" and "acrylic acid or methacrylic acid".

Specific examples of the monomer having high refractive index include bis(4-methacryloylthiophenyl)sulfide, vinyl naphthalene, vinyl phenyl sulfide and 4-methacryloyloxyphenyl-4'-methoxyphenyl thioether. It is also possible to use two or more of these monomers together.

Such a monomer having ethylenically unsaturated bonds can be polymerized by ionizing radiation or heating in the presence of the fluorinated photopolymerization initiator as described above optionally together with another polymerization initiator such as a photo radical polymerization initiator or a heat radical polymerization initiator.

In the invention, use can be made of a polymer having a polyether as the main chain. I is preferable to employ a ring-opening polymer of a polyfunctional epoxy compound. The ring-opening polymerization of the polyfunctional epoxy compound can be carried out by ionizing radiation or heating in the presence of a photo acid generator or a heat acid generator. As the photo acid generator or the heat acid generator, use can be made of publicly known ones.

It is also possible to use a monomer having a crosslinking functional group, as a substitute for the monomer having two or more ethylenically unsaturated bonds or in addition thereto, to thereby introduce the crosslinking functional group into the polymer. Thus, a crosslinked structure can be introduced into the binder polymer owing to the reaction of this crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. As a monomer for introducing a crosslinked structure, use can be also made of vinylsuflonic acid, acid anhydrides, cyanoacrylate derivatives, melamine, etherified methylol, esters and urethane and metal alkoxides such as tetramethoxysilane. It is also possible to use a functional group that shows crosslinking ability as the result of a decomposition reaction, for example, a blocked isocyanate group. Namely, the crosslinking functional group to be used in the invention may be either one showing an immediate reactivity or one showing a reactivity after decomposition.

The binder polymer containing such a crosslinking functional group can form a crosslinked structure by heating after the application.

[Material for Low-Refractive Index Layer]

The antireflective layer of the antireflective film of the invention may have a low-refractive index layer formed from a coating solution containing a fluoropolymer.

It is preferable that the low-refractive index layer of the invention is formed by applying and drying a curing composition which contains a fluorine-containing compound as the main component or a curing composition which contains a monomer having multiple binding groups in its molecule and particles having a low refractive index so as to adjust the refractive index within a range of from 1.20 to 1.50, more preferably from 1.25 to 1.45 and more preferably from 1.30 to 1.40.

Preferable modes of the curing compositions are as follows: (1) a composition containing a fluoropolymer having a crosslinkable or polymerizable functional group; (2) a composition containing a hydrolysis product of a fluorine-containing organosilane material as the main component; and (3) a composition containing a monomer having two or more ethylenically unsaturated groups and inorganic microparticles having a hollow structure. Thus, it is possible to obtain an optical film and an antireflective film which are superior in scratch resistance even, in the case of using as the outermost layer, to those having a low-refractive index layer comprising magnesium fluoride or calcium fluoride. After curing, the coefficient of dynamic friction of the surface of the low-refractive index layer preferably ranges from 0.03 to 0.15 while the contact angle thereof to water preferably ranges from 90° to 120°.

(1) Fluorine-Containing Compound Having Crosslinkable or Polymerizable Functional Group As examples of the fluorine-containing compound having a crosslinkable or polymerizable functional group, a copolymer of a fluorine-containing monomer with a monomer having a crosslinkable or polymerizable functional group may be cited. Examples of the fluorine-containing monomer include fluoroolefins (for example, fluoroethylene, vinylidene fluoride, tetrafluoroethylene, hexafluoroethylene, hexafluoropropylene, perfluoro-2,2-dimethyl-1,3-diol and so on) and completely or partly fluorinated alkyl ester derivatives of (meth)acrylic acid (for example, BISCOAT 6FM manufactured by OSAKA YUKI CHEMICAL Co., Ltd. and M-2020 manufactured by DAIKIN INDUSTRIES, LTD.) and completely or partly fluorinated vinyl ethers.

Examples of the monomer for imparting crosslinking reactivity include a (meth)acrylate monomer preliminarily having a self-crosslinkable functional group in its molecule such as glycidyl (meth)acrylate. Another mode comprises synthesizing a fluorine-containing copolymer by using a monomer having a functional group such as a hydroxyl group and modifying the substituents thereof to use a monomer capable of introducing a crosslinkable or polymerizable functional group. Examples of such a monomer include (meth)acrylate monomers having a carboxyl group, a hydroxy group, an amino group, a sulfo group or the like (for example, (meth)acrylic acid, methylol (meth)acrylate, hydroxyalkyl (meth)acrylate, allyl acrylate and so on). The latter mode is disclosed in JP-A-10-25388 and JP-A-10-147739.

From the viewpoints of solubility, dispersibility, coating properties, anti-fouling properties, antistatic properties and so on, the fluorine-containing copolymer as described above may contain additional copolymerizable components. To impart anti-fouling properties and slipperiness, it is particularly preferable to introduce silicone thereinto. Silicone may be introduced into either the main chain or a side chain.

To introduce a polysiloxane partial structure into the main chain, use can be made of, for example, the method with the use of a polymer type initiator such as an azo group-containing polysiloxane amide (marketed products: VPS-0501 and 1001 manufactured by WAKO PURE CHEMICAL INDUSTRIES) as described in JP-A-6-93100. To introduce it into a side chain, use can be made of, for example, the method of introducing polysiloxane having a reactive group at one end (for example, SILAPLANE SERIES manufactured by CHISSO, Ltd.) by a polymerization reaction as described in J. Appl. Polym. Sci. 2000, 78, 1955 and JP-A-56-28219 or the method of polymerizing a polysiloxane-containing macromer. Each method may be preferably employed.

As mentioned in JP-A-2000-17028, the above-described polymer may optionally contain a curing agent having a polymerizable unsaturated group. As mentioned in JP-A-2002-145952, it is also preferable to employ a compound having a fluorine-containing multifunctional polymerizable unsaturated group together. Examples of the a compound having a multifunctional polymerizable unsaturated group include monomers having two or more ethylenically unsaturated groups as discussed above. Moreover, use may be preferably made of a hydrolysis product of an organosilane as mentioned in JP-A-2004-170901 and a hydrolysis product of an organosilane having a (meth)acryloyl group is particularly preferred.

These compounds are favorable because of having an effect of largely improving the scratch resistance in the case of using together with a compound having a polymerizable unsaturated group in the polymer.

In the case where the polymer per se has only insufficient curing properties when employed alone, the desired curing properties can be imparted by blending a crosslinkable compound. When the polymer has hydroxyl group, for example, various amino compounds are preferably usable as a curing agent. Examples of the amino compounds usable as crosslinkable compounds include compounds having two or more hydroxyalkyl amino groups and alkoxyalkylamino groups (either one of them or both) such as melamine-type compounds, urea-type compounds, benzoguanamine-type compounds, glycoluryl-type compound and so on. To cure such a compound, it is preferable to employ an organic acid or its salt.

Examples of such fluoropolymers are presented in JP-A-2003-222702, JP-A-2003-183322 and so on.

(2) Hydrolysis Product of Fluorine-Containing Organosilane Material

It is also preferable to employ a composition containing a hydrolysis product of a fluorine-containing organosilane material as the main component since it has a low refractive index and a high film surface hardness. Use is preferably made of a condensation product of a compound having a hydrolyzable silanol group at one or both ends for fluoroalkyl group with a tetraalkoxysilane. Specific examples of such compositions are presented in JP-A-2002-265856 and JP-A-2002-317152.

(3) Composition Containing Monomer Having Two or More Ethylenically Unsaturated Groups and Inorganic Microparticles Having Hollow Structure As another preferable mode, a low-refractive index layer comprising particles having a low refractive index and a binder may be cited. Although the particles with a low refractive index may be either organic or inorganic ones, particles having a void inside are preferred. Specific examples of hollow particles are presented concerning silica particles in JP-A-2002-79616. The refractive index of the particles preferably ranges from 1.15 to 1.40, more preferably from 1.20 to 1.30. As the binder, use can be made of the monomer having two or more ethylenically unsaturated groups as described above concerning the light diffusion layer.

It is preferable that the low-refractive index layer of the invention contains a polymerization initiator as described above concerning the light diffusion layer. In the case of containing a radical polymerizable compound, the polymerization initiator can be used in an amount of from 1 to 10 parts by mass, preferably from 1 to 5 parts by mass, based on the compound.

The low-refractive index layer of the invention may further contain inorganic particles. To impart scratch resistance, use can be made of microparticles having a particle diameter amounting to 15% to 150%, preferably 30% to 100%, more preferably 45% to 60%, of the thickness of the low-refractive index layer.

To impart various characteristics such as anti-fouling properties, water-proofness, chemical resistance and slipperiness, the low-refractive index layer of the invention may optionally contain publicly known polysiloxane-based or fluorinated anti-fouling agent, slipping agent and so on.

Next, copolymers preferably usable in the low-refractive index layer of the invention will be illustrated.

Specific examples of the fluorine-containing monomer include fluoroolefins (for example, fluoroethylene, vinylidene fluoride, tetrafluoroethylene, hexafluoropropylene and so on), partly or completely fluorinated alkyl ester derivatives of (meth)acrylic acid (for example, BISCOAT 6FM manufactured by OSAKA YUKI CHEMICAL Co., Ltd. and M-2020 manufactured by DAIKIN INDUSTRIES, LTD.) and completely or partly fluorinated vinyl ethers. Perfluoroolefins are preferable and hexafluoropropylene is particularly preferable form the viewpoints of refractive index, solubility, transparency, availability and so on. Although the refractive index can be lowered by elevating the content of such a fluorine-containing monomer, the film strength is worsened therewitn. In the invention, it is preferable to introduce a fluorine-containing vinyl monomer in such an amount as to control the fluorine content in the copolymer to 20 to 60% by mass, more preferably 25 to 55% by mass and particularly preferably 30 to 50% by mass.

It is preferable that the copolymer as described above has a repeating unit having (meth)acryloyl group in its side chain as an essential constituent. By elevating the composition ratio of the repeating unit having (meth)acryloyl group, the film strength is improved and the refractive index is elevated. In general, the content of the repeating unit having (meth)acryloyl group preferably amounts to 5 to 90% by mass, more preferably 30 to 70% by mass and particularly preferably 40 to 60% by mass, though the preferable content varies depending on the type of the repeating unit derived from the fluorine-containing vinyl monomer.

In addition to the repeating unit derived from the fluorine-containing vinyl monomer and the repeating unit having (meth)acryloyl group in its side chain, the copolymer useful in the invention may optionally contain other vinyl monomers from various viewpoints of, for example, adhesiveness to the substrate, Tg of the polymer (contributing to the film strength), solubility in a solvent, transparency, slipperiness, resistance against dust and debris and so on. Depending on the purpose, two or more vinyl monomers may be combined. It is preferable that such vinyl monomers are introduced in a total amount of form 0 to 65% by mol, more preferably from 0 to 40% by mol and particularly preferably from 0 to 30% by mol.

Vinyl monomer units usable herein are not particularly restricted. Examples thereof include olefins (for example, ethylene, propylene, isoprene, vinyl chloride and vinylidene chloride), acrylic acid esters (for example, methyl acrylate, ethyl acrylate, 2-ethylhexyl acrylate and 2-hydroxyethyl acrylate), methacrylic acid esters (for example, methyl methacrylate, ethyl methacrylate, butyl methacrylate and 2-hydroxyethyl methacrylate), styrene derivatives (for example, styrene, p-hydroxymethylstyrene and p-methoxystyrene), vinyl ethers (for example, methyl vinyl ether, ethyl vinyl ether, cyclohexyl vinyl ether, hydroxyethyl vinyl ether and hydroxybutyl vinyl ether), vinyl esters (for example, vinyl acetate, vinyl propionate and vinyl cinnamate), unsaturated carboxylic acids (for example, acrylic acid, methacrylic acid, crotonic acid, maleic acid and itaconic acid), acrylamides (for example, N,N-dimethylacrylamide, N-tert-butylacrylamide and N-cyclohexylacrylamide), methacrylamides (for example, N,N-dimethylmethacrylamide), acrylonitrile and so on In the invention, it is preferable to employ a fluoropolymer represented by the following formula (1A).

Formula (1A):

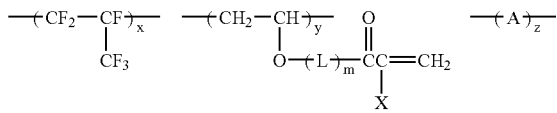

In the formula (1A), L represents a linking group having from 1 to 10 carbon atoms, preferably a linking group having from 2 to 4 carbon atoms. It may have either a linear, branched or cyclic structure. Further, it may have a hetero atom selected form among O, N and S.

Preferable examples thereof include *—$(CH_2)_2$—O—**, *$(CH_2)_2$—NH—**, *—$(CH_2)_4$—O—**, *—$(CH_2)_6$—O—**, *—$(CH_2)_2$—O—$(CH_2)_2$—**, *—CONH—$(CH_2)_3$—O—**, *—$CH_2CH(OH)CH_2$—O—** and *—$CH_2CH_2OCONH(CH_2)_3$—O—** (wherein * represents a linking site in the polymer main chain side, and ** represents a linking site in the (meth)acryloyl group side). m represents 0 or 1.

In the formula (1A), X represents a hydrogen atom or a methyl group. From the viewpoint of the curing reactivity, a hydrogen atom is preferred.

In the formula (1A), A represents a repeating unit derived from an arbitrary vinyl monomer. It is not particularly restricted so long as being a constituent of a monomer copolymerizable with hexafluoropropylene. It may be appropriately selected considering, for example, adhesiveness to the substrate, Tg of the polymer (contributing to the film strength), solubility in a solvent, transparency, slipperiness, resistance against dust and debris and so on. Depending on the purpose, either one or two or more vinyl monomers may be employed.

Preferable examples thereof include vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether and allyl vinyl ether; vinyl esters such as vinyl acetate, vinyl propionate and vinyl butyrate; (meth)acrylates such as methyl (meth)acrylate, ethyl (meth)acrylate, hydroxyethyl (meth) acrylate, glycidyl methacrylate, allyl (meth)acrylate and (meth)acryloyloxypropyl trimethoxysilane; styrene and its derivatives such as styrene and p-hydroxymethylstyrene; unsaturated carboxylic acids and derivatives thereof such as crotonic acid, maleic acid and itaconic acid and so on. Vinyl ether derivatives and vinyl ester derivatives are preferable and vinyl ether derivatives are still preferable.

x, y and z represent the mol percentages of respective constituents individually satisfying the relationships $30 \leq x \leq 60$, $5 \leq y \leq 70$ and $0 \leq z \leq 65$, preferably $35 \leq x \leq 55$, $30 \leq y \leq 60$ and $0 \leq z \leq 20$ and particularly preferably $40 \leq x \leq 55$, $40 \leq y \leq 55$ and $0 \leq z \leq 10$.

In another mode as a copolymer preferably usable in the invention, the following formula (2A) may be cited.

Formula (2A):

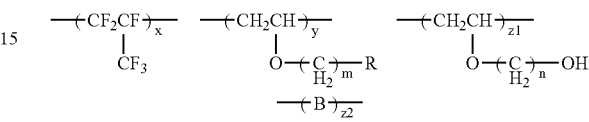

In the formula (2A), R represents an alkyl group having from 1 to 10 carbon atoms or an ethylenically unsaturated group (—C(=O)C(—X)=$CH_2$).

m represents an integer satisfying $1 \leq m \leq 10$, preferably $1 \leq m \leq 6$ and more preferably $1 \leq m \leq 4$.

n represents an integer satisfying $2 \leq n \leq 10$, preferably $2 \leq n \leq 6$ and more preferably $2 \leq n \leq 4$.

B represents a repeating unit derived from an arbitrary vinyl monomer which may be either a single component or made up of multiple components and which may contain a silicone moiety.

x, y, z1 and z2 represent the mol percentages of respective repeating units. It is preferable that x and y satisfy $30 \leq x \leq 60$ and $0 \leq y \leq 70$, more preferably $35 \leq x \leq 55$ and $0 \leq y \leq 60$ and particularly preferably $40 \leq x \leq 55$ and $0 \leq y \leq 55$. It is preferable that z1 and z2 satisfy $1 \leq z1 \leq 65$ and $1 \leq z2 \leq 65$, more preferably $1 \leq z1 \leq 40$ and $1 \leq z2 \leq 10$ and particularly preferably $1 \leq z1 \leq 30$ and $1 \leq z2 \leq 5$, provided that $x+y+Z1+z2=100$.

A copolymer represented by the formula (1A) or (2A) can be synthesized by introducing (meth)acryloyl group into a copolymer containing, for example, a hexafluoropropylene component with a hydroxyalkyl vinyl ether component.

As preferable copolymers useful in the invention, those presented in the paragraphs [0043] to [0047] in JP-A-2004-45462 may be cited.

The copolymer to be used in the invention can be synthesized by a method described in JP-A-2004-45462. Moreover, the copolymer to be used in the invention may be synthesized by synthesizing a precursor such as a hydroxyl-containing polymer by using various polymerization methods other than the above-described one, for example, solution polymerization, precipitation polymerization, suspension polymerization, block polymerization or emulsion polymerization and then introducing (meth)acryloyl group thereinto by the polymer reaction as described above. The polymerization reaction can be conducted by using a publicly known procedure such as batch-wise, semicontinuous or continuous reaction.

The polymerization may be initiated by using a radical initiator, ionizing radiation, etc. These polymerization methods and methods of initiating the polymerization are reported by, for example, T. Tsuruta, *Kobunshi Gosei Hoho*, revised, NIKKAN KOGYO SHINBUN-SHA, 1971 and T. Otsu and M. Kinoshita, *Kobunshi Gosei no Jikken Hoho*, KAGAKU DOJIN, 1972, p. 124 to p. 154.

Among the polymerization methods as cited above, the solution polymerization method using a radical initiator is particularly preferred. As the solvent to be used in the solution polymerization method, it is possible to employ various organic solvents such as ethyl acetate, butyl acetate, acetone, methyl ethyl ketone (MEK), methyl isbobutyl ketone (MIBK), cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol, either alone or as a mixture of two or more thereof, or a solvent mixture with water.

The polymerization temperature, which should be determined depending on the molecular weight of the polymer product to be formed, the type of the initiator and so on, may range from 0° C. or below to 100° C. or above. It is generally preferred to conduct the polymerization at 50 to 100° C.

Although the reaction pressure may be appropriately selected, it is usually preferable to control the pressure to 1 to 100 kPa, in particular, about 1 to 30 kPa. The reaction is conducted for about 5 to 30 hours.

As the solvent for re-precipitating the obtained polymer, use is preferably made of isopropanol, hexane, methanol, etc.

Next, inorganic microparticles preferably usable in the low-refractive index layer of the antireflective film according to the invention will be illustrated.

The coating amount of the inorganic microparticles is preferably from 1 mg/m$^2$ to 100 mg/m$^2$, more preferably from 5 mg/m$^2$ to 80 mg/m$^2$ and more preferably from 10 mg/m$^2$ to 60 mg/m$^2$. In the case where the coating amount is too small, the effect of improving scratch resistance is worsened. In the case where the coating amount is too large, fine peaks and valleys are formed on the surface of the low-refractive index layer and thus there arise some troubles, for example, worsening in appearance such as definitiveness in black color and lowering integral reflection ratio.

Since the inorganic microparticles are to be contained in the low-refractive index layer, it is preferable that they have a low refractive index. For example, silica or hollow silica microparticles are preferred therefor. The average particle diameter of the silica microparticles preferably amounts to from 30% to 150% of the thickness of the low refractive index layer, more preferably from 35% to 80% and more preferably form 40% to 60%. In the case where the low refractive index layer has a thickness of 100 nm, namely, the average particle diameter of the hollow microparticles preferably ranges from 30 nm to 150 nm, more preferably from 35 nm to 80 nm and more preferably from 40 nm to 60 nm.

In the case where the particle diameter of the silica microparticles is too small, the effect of improving scratch resistance is worsened. In the case where the particle diameter is too large, fine peaks and valleys are formed on the surface of the low-refractive index layer and thus there arise some troubles, for example, worsening in appearance such as definitiveness in black color and lowering integral reflection ratio. The silica microparticles may be either crystalline particles or amorphous ones. Also, either singly dispersed particles or aggregated particles may be used, so long as they satisfy the requirement for the particle size. Concerning the shape, spherical particles are most desirable but those having an undefined shape may be also usable without any problem. The average particle diameter of the inorganic microparticles is measured with a Coulter's counter.

To lower the refractive index of the low-refractive index layer, it is preferable to use hollow silica microparticles. The refractive index of the hollow silica microparticles preferably ranges from 1.15 to 1.40, more preferably from 1.17 to 1.35 and most preferably from 1.17 to 1.30. The refractive index as used herein means not the refractive index of the silica, i.e., the shell forming the hollow particles, but the refractive index of the particles as a whole. When the radius of the inner cavity in a particle is referred to as a and the radius of the outer shell of the particle is referred to as b, the porosity x, which is represented by the following numerical formula (VIII), preferably ranges from 10 to 60%, more preferably from 20 to 60% and most preferably form 30 to 60%.

$$x=(4\pi a^3/3)/(4\pi b^3/3)\times 100 \qquad \text{Numerical formula (VIII)}$$

From the viewpoint of the scratch resistance, it is preferable to achieve a sufficient thickness of the shell and a favorable strength of the particles, particles having a refractive index of 1.17 or more are desirable.

Methods of producing hollow silica are described in, for example, JP-A-2001-233611 and JP-A-2002-79616. Among all, it is preferable particles which have a void in the shell and in which pores in the shell are closed. The refractive index of such hollow silica particles can be calculated according to a method described in JP-A-2002-79616.

The coating amount of the hollow silica is preferably from 1 mg/m$^2$ to 100 mg/m$^2$, more preferably from 5 mg/m$^2$ to 80 mg/m$^2$ and more preferably from 10 mg/m$^2$ to 60 mg/m$^2$. In the case where the coating amount is too small, the effect of improving scratch resistance is worsened. In the case where the coating amount is too large, fine peaks and valleys are formed on the surface of the low-refractive index layer and thus there arise some troubles, for example, worsening in appearance such as definitiveness in black color and lowering integral reflection ratio.

The average particle diameter of the hollow silica preferably amounts to from 30% to 150% of the thickness of the low refractive index layer, more preferably from 35% to 80% and more preferably form 40% to 60%. In the case where the low refractive index layer has a thickness of 100 nm, namely, the average particle diameter of the hollow silica preferably ranges from 30 nm to 150 nm, more preferably from 35 nm to 100 nm and more preferably from 40 nm to 60 nm.

In the case where the particle diameter is too small, the ratio of void is reduced and thus it cannot be expected that the refractive index is lowered. In the case where the particle diameter is too large, fine peaks and valleys are formed on the surface of the low-refractive index layer and thus there arise some troubles, for example, worsening in appearance such as definitiveness in black color and lowering integral reflection ratio. The silica microparticles may be either crystalline particles or amorphous ones and singly dispersed particles are preferred. Concerning the shape, spherical particles are most desirable but those having an undefined shape may be also usable without any problem.

It is also possible to use tow or more types of hollow silica differing in average particle diameter. The average particle diameter of the hollow silica is determined by using an electron micrographic photograph.

In the invention, the specific surface area of the hollow silica preferably ranges from 20 to 300 m$^2$/g, more preferably from 20 to 120 m$^2$/g and most preferably from 40 to 90 m$^2$/g. The surface area can be determined by the BET method using nitrogen.

In the invention, the hollow silica may be used together with void-free silica particles. The particle size of the void-free silica is 30 nm or more but not more than 150 nm, preferably 35 nm or more but not more than 100 nm and most preferably 40 nm or more but not more than 80 nm.

It is also possible that at least one type of silica microparticles having an average diameter amounting to less than 25% of the thickness of the low-refractive index layer (hereinafter referred to as "small-sized silica microparticles") together with the silica microparticles having the average particle diameter as described above (referred to as "large-sized silica microparticles").

These small-sized silica microparticles, which can be located in gaps among the large-sized silica microparticles, can serve a holder for the large-sized silica microparticles.

The average particle diameter of the small-sized silica microparticles is preferably 1 nm or more but not more than 20 nm, more preferably 5 nm or more but not more than 15 nm and particularly preferably 10 nm or more but not more than 15 nm. Use of these silica microparticles is favorable from the viewpoints of the material cost and the holding effect.

The silica microparticles may be subjected to a physical surface treatment such as plasma discharge treatment or corona discharge treatment or a chemical surface treatment with the use of, for example, a surfactant or a coupling agent to thereby stabilize the dispersion thereof in a liquid dispersion or a coating solution or to improve the affinity and binding properties thereof to a binder component. It is particularly preferable to employ a coupling agent therefor. As the coupling agent, it is preferable to use an alkoxymetal compound (for example, a titanium coupling agent or a silane coupling agent). Among all, a treatment with a silane coupling agent having an acryloyl group or a methacryloyl group is particularly effective.

The coupling agent is employed as a surface-treating agent by which the inorganic filler in the low refractive index layer is preliminarily surface-treated before the preparation of the coating solution for forming the layer. It is preferable that the coupling agent is further added as an additive in preparing the coating solution for forming the layer so that the low refractive index layer contains the coupling agent.

To lessen the load during the surface-treatment, it is preferable that the silica microparticles are preliminarily dispersed in a medium before the surface-treatment. As specific examples of the surface-treating agents and catalysts preferably usable in the invention, organosilane compounds and catalysts mentioned in WO 2004/017105 may be cited.

To improve the film strength, it is preferable in the invention to add a hydrolysis product of an organosilane and/or its partial condensate (a sol). The content of the sol preferably ranges from 2 to 200% by mass, more preferably form 5 to 100% by mass and most preferably from 10 to 50% by mass based on the inorganic microparticles.

From the viewpoint of improving the anti-fouling properties, it is preferable in the invention to lower the surface free energy of the antireflective film surface. More specifically speaking, it is preferable to employ a fluorine-containing compound or a silicone-based compound having a polysiloxane structure in the low-refractive index layer. Preferable examples of the silicone-based compound include X-22-174DX, X-22-2426, X-22-164B, X22-164C, X-22-170DX, X-22-176D and X-22-1821 (trade names of products manufactured by SHIN-ETSU CHEMICAL Co., Ltd.}, FM-0725, FM-7725, FM-4421, FM-5521, FM6621 and FM-1121 (manufactured by CHISSO CORPORATION), DMS-U22, RMS-033, RMS-083, UMS-182, DMS-H21, DMS-H31, HMS-301, FMS121, FMS123, FMS131, FMS141 and FMS221 (trade names of products manufactured by Gelest) and so on, though the invention is not restricted thereto. Moreover, use may be preferably made of silicone-based compounds listed in TABLES 2 and 3 in JP-A-2003-112383. Such a polysiloxane is added preferably in an amount of from 0.1 to 10% by mass, particularly preferably form 1 to 5% by mass, based on the total solid content in the low-refractive index layer.

The fluoropolymer can be polymerized by ionizing radiation or heating in the presence of the polymerization initiator as described above, for example, a photo radical polymerization initiator or a heat radical polymerization initiator.

Namely, the low-refractive index layer can be formed by preparing a coating solution containing the fluoropolymer, the polymerization initiator (for example, a photo radical polymerization initiator or a heat radical polymerization initiator) and the inorganic microparticles, applying the coating solution on the support and then curing the same by ionizing radiation or heat.

[Hard Coat Layer]

A hard coat layer has hard coat properties for improving the scratch resistance of the film. Further, it is preferable to use a hard coat layer in order to impart light scattering properties, due to at least one of surface scattering and inner scattering, to the film. Therefore, it is preferable that the hard coat layer contains a light-transmitting resin for imparting hard coat properties and light-transmitting microparticles for imparting light scattering properties optionally together with an inorganic filler for elevating refractive index, preventing shrinkage caused by crosslinkage and elevating the strength.

To impart the hard coat properties, the membrane thickness of the hard coat layer preferably ranges from 1 to 10 μm, more preferably from 1.2 to 6 μm. SO long as the membrane thickness falls within this range, sufficient hard coat properties are imparted while avoiding worsening in processability due to curing or lowered brittleness.

As the light-transmitting resin, it is preferable to use a binder polymer having a saturated hydrocarbon chain or a polyether chain as the main chain and a binder polymer having a saturated hydrocarbon chain is still preferable. It is also preferable that the binder polymer has a crosslinked structure.

As the binder polymer having a saturated hydrocarbon chain as the main chain, a polymer of an ethylenically unsaturated monomer is preferred. As the binder polymer having a saturated hydrocarbon chain as the main chain and a crosslinked structure, a (co)polymer of monomer(s) having two or more ethylenically unsaturated bonds is preferable.

To achieve a higher refractive index, it is preferable to select a high refractive index monomer having an aromatic ring or at least one atom selected from among halogen atoms other than fluorine, sulfur atom, phosphorus atom and nitrogen atom in its structure.

Examples of the monomer having two or more ethylenically unsaturated bonds include esters of polyhydric alcohol with (meth)acrylic acid (for example, ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,3,5-cyclohexanetriol triacrylate, polyurethane polyacrylate and polyester polyacrylate), ethylene oxide-denatured products of the above-described esters, vinyl benzene and its derivatives (for example, 1,4-divinyl benzene, 4-vinylbenzoic acid-2-acryloylethyl ester and 1,4-divinyl cyclohexanone), vinyl sulfones (for example, divinyl sulfone), acrylamides (for example, methylenebisacrylamide) and methacrylamides. Two or more of these monomers may be used together.

Specific examples of the monomer having high refractive index include bis(4-methacryloylthiophenyl)sulfide, vinyl naphthalene, vinyl phenyl sulfide and 4-methacryloyloxyphenyl-4'-methoxyphenyl thioether. It is also possible to use two or more of these monomers together.

Such a monomer having ethylenically unsaturated bonds can be polymerized by ionizing radiation or heating in the presence of the polymerization initiator contained in the low-refractive index layer as described above.

That is to say, the hard coat layer can be formed by preparing a coating solution, which contains the monomer for forming the light-transmitting resin such as the ethylenically unsaturated monomer as described above, a polymerization initiator generating radical due to ionizing radiation or heating, light-transmitting particles and, if desired, an inorganic filler, then applying the coating solution to the support and hardening the same by polymerization under ionizing radiation or heating.

As a substitute for the polymerization initiator generating radical due to ionizing radiation or heating, use may be made of the photosensitizer contained in the low-refractive index layer as described above.

As the polymer having polyether as the main chain, it is preferable to employ a ring-opening polymer of a polyfunctional epoxy compound. The ring-opening polymerization of the polyfunctional epoxy compound can be carried out by ionizing radiation or heating in the presence of a photo acid generator or a heat acid generator.

That is to say, a coating solution, which contains the polyfunctional epoxy compound, a photo acid generator or a heat acid generator, the light-transmitting particles and the inorganic filler, is prepared. Then the coating solution is applied to a support and then cured by polymerization under ionizing radiation or heating. Thus, the hard coat layer can be formed.

As a substitute for the monomer having two or more ethylenically unsaturated groups or in addition thereto, use can be made of a monomer having a crosslinkable functional group to thereby introduce the crosslinkable functional group into the polymer. Then, the crosslinked structure is introduced into the binder polymer via the reaction of the crosslinkable functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. As a monomer for introducing a crosslinked structure, use can be also made of vinylsuflonic acid, acid anhydrides, cyanoacrylate derivatives, melamine, etherified methylol, esters and urethane and metal alkoxides such as tetramethoxysilane. It is also possible to use a functional group that shows crosslinking ability as the result of a decomposition reaction, for example, a blocked isocyanate group. Namely, the crosslinking functional group to be used in the invention may be either one showing an immediate reactivity or one showing a reactivity after decomposition.

The binder polymer containing such a crosslinking functional group can form a crosslinked structure by heating after the application.

To impart antiglare properties or light scattering properties, light-transmitting microparticles to be used in the hard coat layer have an average particle size of from 0.5 to 5 µm, preferably from 1.0 to 4.0 µm. It is preferred that the average particle diameter is 0.5 µm or more from the viewpoints of preventing the light scattering angle distribution from widening over the broad angle region, preventing worsening in display resolution and ensuring antiglare properties caused by the formation of peaks and valleys on the surface. On the other hand, it is unnecessary to enlarge the membrane thickness of the hard coat layer. That is, a membrane thickness of 5 µm or less is preferable since serious curling and an increase in the material cost can be avoided thereby.

Specific examples of the light-transmitting particles as described above include particles of inorganic compounds such as silica particles and $TiO_2$ particles; and resin particles such as acryl particles, crosslinked acryl particles, methacryl particles, crosslinked methacryl particles, polystyrene particles, crosslinked styrene particles, melamine resin particles, benzoguanamine resin particles, crosslinked acryl-styrene particles and so on. Among all, crosslinked styrene particles, crosslinked acryl particles, crosslinked acryl-styrene particles and silica particles are preferred.

These light-transmitting particles may be either spherical or irregular-shaped.

Also, use can be made of two or more types of different light-transmitting particles. Namely, the light-transmitting microparticles having a larger particle diameter can impart antiglare properties, while the light-transmitting microparticles having a smaller particle diameter can impart other optical properties. In the case of bonding the antireflective film to a high-resolution display of 133 ppi or higher, for example, it is required to cause no such an optical problem as called dazzle. Dazzle is caused when pixels are enlarged or downscaled due to peaks and valleys (contributing to antiglare properties) on the film surface and thus the brightness becomes uneven. This problem can be largely overcome by using the light-transmitting microparticles for imparting antiglare properties together with light-transmitting microparticles having a smaller particle diameter and different refractive index from the binder.

Concerning the particle size distribution of the light-transmitting particles, as described above, monodispersion is most desirable. That is to say, it is preferred that the sizes of individual particles are as close as possible. In the case where particles having particle size larger by 20% or more than the average particle size are specified as coarse particles, for example, it is preferable that the content of these coarse particles is 1% or less of all particles, more preferably 0.1% or less and more preferably 0.01% or less. Light-transmitting particles having such a particle size distribution can be obtained by classifying particles after the completion of a usual synthesis reaction. Light-transmitting particles having a still preferable distribution can be obtained by performing the classification in an increased number or at an elevated level.

Taking the light scattering effect, image resolution, surface clouding, dazzle, etc. into consideration, the light-transmitting microparticles are added to the hard coat layer in such an amount of preferably from 3 to 30% by mass, more preferably from 5 to 20% by mass based on the total solid matters contained in the hard coat layer.

The density of the light-transmitting microparticles preferably ranges from 10 to 1000 mg/m$^2$, more preferably from 100 to 700 mg/m$^2$.

The particle size distribution of the light-transmitting particles is measured by Coulter's counter method and the distribution thus measured is converted into the particle number distribution.

To elevate the refractive index of the layer, the hard coat layer preferably contains, in addition to the light-transmitting particles as described above, an inorganic filler which comprises oxide of at least one metal selected from among titanium, zirconium, aluminum, indium, zinc, tin and antimony and has an average particle size of 0.2 µm or less, preferably 0.1 µm or less and more preferably 0.06 µm or less.

To enlarge the difference in refractive index between the hard coat layer and the light-transmitting particles, it is also possible in a hard coat layer with the use of light-transmitting particles having a high refractive index to employ silicon oxide to thereby maintain the refractive index of the layer at a low level. The preferable particle size thereof is the same as the inorganic filler as described above.

Specific examples of the inorganic filler to be used in the hard coat layer include $TiO_2$, $ZrO_2$, $Al_2O_3$, $In_2O_3$, ZnO, $SnO_2$, $Sb_2O_3$, ITO and $SiO_2$. $TiO_2$ and $ZrO_2$ are preferred from the viewpoint of elevating refractive index. It is also preferable that the inorganic filler is surface-treated by silane coupling or titanium coupling. Use is preferably made of a surface-treating agent having a functional group capable of reacting with the binder on the filler surface.

The content of such an inorganic filler is preferably from 10 to 90% based on the total mass of the hard coat layer, more preferably from 20 to 80% and particularly preferably from 30 to 75%.

Because of having a particle size sufficiently smaller than the light wavelength, the inorganic filler causes no scattering. Therefore, a dispersion having the filler dispersed throughout the binder polymer behaves as an optically homogeneous substance.

In the hard coat layer, it is also possible to use at least one of an organosilane compound, a hydrolysis product of an organosilane and/or its partial condensate (a sol).

In the case of a layer other than the low-refractive index layer (for example, the hard coat layer), the content of the sol to be added to the hard coat layer preferably ranges from 0.001 to 50% by mass, more preferably from 0.01 to 20% by mass, more preferably from 0.05 to 10% by mass and particularly preferably from 0.1 to 5% by mass based on the total solid matters contained in the layer containing the same (the layer to which the component is added). Since the addition level of the organosilane compound or its sol is less strictly limited in the hard coat layer than in the low-refractive index layer, it is preferable to use the organosilane compound therein.

The bulk refractive index of the mixture of the light-transmitting resin with the light-transmitting microparticles is preferably from 1.48 to 2.00, more preferably from 1.50 to 1.80. The refractive index can be controlled within the range as specified above by appropriately selecting the types and mixing ratio of the light-transmitting resin with the light-transmitting microparticles. It can be easily understood through preliminary experiments how to select these materials.

The difference in refractive index between the light-transmitting resin with the light-transmitting microparticles (i.e., (refractive index of light-transmitting microparticles)−(refractive index of light-transmitting resin)) preferably ranges from 0.02 to 0.2, more preferably from 0.05 to 0.15. So long as the difference falls within this range, a sufficient inner scattering effect can be established without causing dazzle or clouding on the film surface.

The refractive index of the light-transmitting resin is preferably from 1.45 to 2.00, more preferably from 1.48 to 1.70.

The refractive index of the light-transmitting resin can be quantitatively evaluated by directly measuring with an Abbe refractometer or measuring the spectral reflection or spectral ellipsometry.

To ensure facial uniformity of the hard coat layer without coating unevenness, drying unevenness, spot defects and so on, the coating solution for forming hard coat layer contains a fluorine-based or silicone-based surfactant or both of the same. It is particularly preferable to employ a fluorine-based or surfactant because of having effects of preventing the antireflective film of the invention from facial failures such as coating unevenness, drying unevenness, spot defects and so on.

It is intended to improve the facial uniformity while imparting suitability for high-speed coating to the film to thereby elevate the productivity.

[High (Medium) Refractive Index Layer]

To impart an improved antireflection performance, it is preferable that the antireflective film of the invention has a hard coat layer and/or a medium-refractive index layer. The refractive index of the hard coat layer in the antireflective film of the invention preferably ranges from 1.60 to 2.40, more preferably from 1.70 to 2.20. The refractive index of the medium-refractive index layer is controlled to a level between the refractive index of the low refractive index layer and the refractive index of the high refractive index layer. The refractive index of the medium refractive index layer preferably ranges from 1.55 to 1.80. It is also preferable that the high refractive index layer and the medium refractive index layer have each a haze of 3% or less. The refractive index can be appropriately controlled by adjusting the amount of the inorganic microparticles or the binder or the like.

To elevate the refractive index of the high (medium) refractive index layer, it is preferable that the layer an inorganic filler which comprises oxide of at least one metal selected from among zirconium, titanium, aluminum, indium, zinc, tin and antimony and has an average particle diameter of 0.2 µm or less, more preferably 0.1 µm or less and more preferably 0.06 µm or less.

To enlarge the difference in refractive index from matting particles contained in the high (medium) refractive index layer, it is also preferable in a high (medium) refractive index layer with the use of matting particles having a high refractive index to employ silicon oxide so as to maintain the refractive index of the layer at a lower level. As the matting particles, those having a refractive index of from 1.80 to 2.80 and an average particle diameter of primary particles of from 3 to 150 nm are preferred. Particles having a refractive index less than 1.80 can achieve only an insufficient effect of elevating the refractive index of the film. On the other hand, particles having a refractive index exceeding 2.80 are undesirable because of being colored. Particles having an average particle diameter of primary particles exceeding 150 nm are undesirable, since such particles result in a high haze value after forming a film and thus worsen the transparency of the film. On the other hand, by using particles having an average particle diameter of primary particles less than 3 nm, a high refractive index can be hardly maintained. The preferable particle diameter is the same as specified above concerning the inorganic filler to be used in the hard coat layer.

Specific examples of the inorganic filler to be used in the high (medium) refractive index layer include $ZrO_2$, $TiO_2$, $Al_2O_3$, $In_2O_3$, ZnO, $SnO_2$, $Sb_2O_3$, ITO and so on. Among all, $TiO_2$ and $ZrO_2$ are preferred from the viewpoint of elevating refractive index. It is also preferable that the inorganic filler is surface-treated by silane coupling or titanium coupling. Use is preferably made of a surface-treating agent having a functional group capable of reacting with the binder on the filler surface.

The content of such an inorganic filler is controlled depending on the refractive index required. In the case of a high-refractive index layer, it preferably ranges from 10 to 90% based on the total mass, more preferably from 20 to 80% and particularly preferably from 30 to 70%.

Because of having a particle size sufficiently smaller than the light wavelength, the inorganic filler causes no scattering.

Therefore, a dispersion having the filler dispersed throughout the binder polymer behaves as an optically homogeneous substance.

The high (medium) refractive index layer to be used in the invention may be formed preferably as follows. Namely, after dispersing the inorganic microparticles in the dispersion medium as discussed above, a binder precursor required in matrix formation (for example, a monomer having two or more ethylenically unsaturated groups as described above concerning the hard coat layer), a photopolymerization initiator, etc. to give a coating composition for forming hard coat layer. Then the coating composition for forming hard coat layer is applied to a support and cured via a crosslinking reaction or a polymerization of an ionizing radiation-curing compound (for example, a polyfunctional monomer or a polyfunctional oligomer).

For the polymerization reaction of the photopolymerizable polyfunctional monomer, use is preferably made of a photopolymerization initiator. As the photopolymerization initiator, a photo radical polymerization initiator and a photo cation polymerization initiator are preferable and a photo radical polymerization initiator is still preferred. As the photo radical polymerization initiator, those the same as in the low-refractive index layer as discussed above may be used.

In addition to the above-described components (i.e., the inorganic microparticles, the polymerization initiator, the photo sensitizer, etc.), the high (medium) refractive index layer may contain a resin, a surfactant, an antistatic agent, a coupling agent, a thickener, a coloration inhibitor, a coloring agent (a pigment or a dye), particles for imparting antiglare properties, a defoaming agent, a leveling agent, a flame retardant agent, an ultraviolet absorber, an infrared absorber, a tackifier, a polymerization inhibitor, an antioxidant, a surface-improver, electrically conductive metal microparticles and so on.

The membrane thickness of the high (medium) refractive index layer may be appropriately designed depending on the purpose. In the case of using the high (medium) refractive index layer as an optical interference layer, the membrane thickness thereof preferably ranges from 30 to 200 nm, more preferably form 50 to 170 nm and particularly preferably from 60 to 150 nm.

[Support]

It is preferable that the support of the optical film and antireflective film according to the invention is transparent and a plastic film is preferably employed therefor.

Examples of the polymer constituting the plastic film include cellulose esters {for example, cellulose triacetate, cellulose diacetate, cellulose acetate propionate and cellulose acetate butyrate typified by FUJITAC TD80U and FUJITAC TD80UF, manufactured by FUJI PHOTOFILM Co., Ltd.), polyamides, polycarbonates, polyesters (for example, polyethylene terephthalate and polyethylene naphthalate), polystyrenes, polyolefins, norbornene resins (for example, ARTON manufactured by JSR) and amorphous polyolefins (for example, ZEONEX manufactured by ZEON)}. Among these materials, triacetyl cellulose, polyethylene terephthalate and polyethylene naphthalate are preferable and triacetylcellulose is particularly preferable. A cellulose acylate film substantially free form any halogenated hydrocarbons such as dichloromethane and a method of producing the same are described in Japan Institute of Invention and Innovation Journal of Technical Disclosure No. 2001-1745 (2001.03.15, hereinafter abbreviated as Journal of Technical Disclosure No. 2001-1745). Cellulose acylate described therein is also preferably usable in the invention.

[Saponification Treatment]

In the case where the optical film or the antireflective film according to the invention is used in a liquid crystal image display unit, it is preferable that the film is provided with a pressure-sensitive adhesion layer or the like on one face and located as the outermost face of the display. The antireflective film may be combined with a polarizing plate. When a transparent substrate made of triacetylcellulose is used, triacetylcellulose is employed as a protective film for protecting the polarizing layer of the polarizing plate. Thus, it is favorable from the viewpoint of cost to use the antireflective film as such as a protective film.

In the case where the optical film or antireflective film of the invention is provided with a pressure-sensitive adhesion layer or the like on one face and located as the outermost face of the display or used as such as a protective film for a polarizing plate, it is preferable that the outermost layer comprising a fluoropolymer as the main component is formed on the transparent substrate and then saponified to ensure sufficient adhesion. The saponification can be carried out by a publicly known procedure, for example, dipping the film in an alkali solution for an appropriate time. After dipping in the alkali solution, it is preferable to sufficiently wash the film with water or neutralize the alkali component by dipping in a dilute acid, thereby eliminating the alkali component remaining in the film.

Owing to the saponification treatment, the surface of the transparent substrate in the side opposite to the side having the outermost layer is made hydrophilic.

The hydrophilic surface is particularly effective in improving the adhesiveness to a polarizing film comprising polyvinyl alcohol as the main component. Since dust and debris in the atmosphere hardly stick to the hydrophilic surface, moreover, dust and debris scarcely enter into the space between the polarizing membrane and the antireflective film in the step of adhering to the polarizing film, which brings about another advantage of preventing defect spots caused by dust and debris.

It is preferable to perform the saponification treatment so that the contact angle of the surface of the transparent substrate in the side opposite to the side having the outermost layer to water becomes 40° or smaller, more preferably 30° or smaller and particularly preferably 20° or smaller.

In practice, the alkali saponification can be carried out by a procedure selected from the following means (1) and (2). Between them, the means (1) is favorable from the viewpoint that the treatment can be carried out in the same step as the cellulose acylate film formation commonly employed. However, the means (1) suffers from some problems such that the antireflective layer surface is also saponified and thus the antireflective layer is deteriorated due to alkali-hydrolysis and that the remaining saponification solution would cause stains. In contrast, the means (2) is favorable, though an additional step is needed therefor.

(1) After forming antireflective layer on the transparent substrate, the film is dipped at least once in an alkali solution to thereby saponify the back face of the film.

(2) Before or after forming the antireflective layer on the transparent substrate, an alkali solution is applied on the face of the transparent substrate opposite to the face on which the antireflective film is to be formed. Then the transparent substrate is heated, washed with water and/or neutralized to thereby saponify the back face alone of the film.

[Film-forming Method]

The antireflective film according to the invention can be formed by the following method, though the invention is not restricted to this method.

[Formation of Antireflective Film]

Each layer of the antireflective film according to the invention with multilayer structure can be formed by a coating method such as dip coating method, air knife coating method, curatin coating method, roller coating method, die coating method, wire bar coating method, gravure coating method or extrusion coating method (U.S. Pat. No. 2,681,294). It is preferable to apply the solution by the die coating method, more preferably using a die coater. It is also possible to apply two or more layers simultaneously. For the simultaneous application, use may be made, without restriction, of methods reported in U.S. Pat. No. 2,761,791, U.S. Pat. No. 2,941,898, U.S. Pat. No. 3,508,947, U.S. Pat. No. 3,526,528 and *KOTINGU KOGAKU*, Yuji Harasaki, p. 253, Asakura Shoten (1973).

To continuously produce the antireflective film according to the invention, the production method involves the step of continuously feeding a rolled transparent substrate film, the step of applying a coating solution, the step of drying the same, the step of curing the coating membrane, and the step of winding the substrate film having the thus hardened layer.

Now, the procedures will be described in detail.

From a substrate film roll, the substrate film is continuously fed into a clean room. In the clean room, static electricity is eliminated from charged substrate film by a neutralization apparatus. Next, foreign matters sticking to the substrate film is eliminated by a cleaner. Then a coating solution is applied to the substrate film in the coating part located in the clean room and the thus coated substrate film is transported into a drying room and dried.

The substrate film having the dried coating layer is fed from the drying room to a radiation curing room where it is exposed to radiation and thus the curing resin contained in the coating layer is polymerized, thereby causing curing. The substrate film having the layer cured by the radiation is further transported to a thermosetting part and heated. Thus, curing is completed by heating. The substrate film having the thus completely cured layer is wound into a roll.

Figure 5:
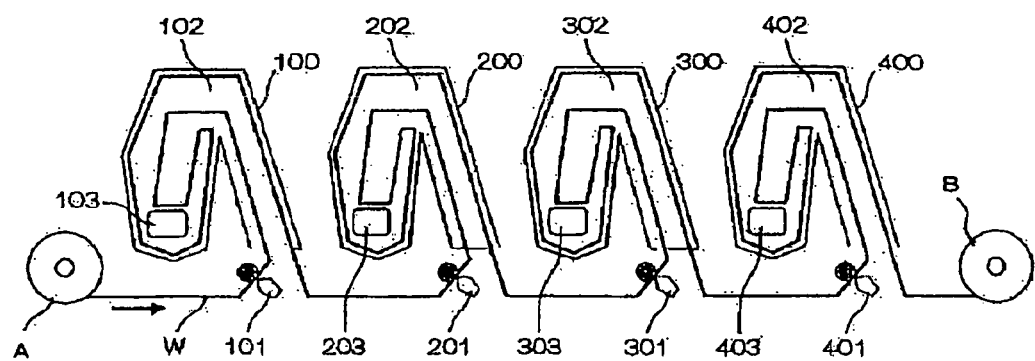
FIG. 5 is a drawing which shows an example of an apparatus whereby the antireflective layer of the antireflective film according to the invention is formed and cured.

The above-described steps may be performed for the formation of each layer. Alternatively, it is also possible to provide a plural number of systems each having a coating part-a drying room-a radiation curing part-a thermosetting room so that individual layers are continuously formed. From the viewpoint of productivity, it is favorable to continuously form the individual layers. Now, the method will be illustrated in greater detail by reference to an embodiment of the production apparatus shown in FIG. 5. This production apparatus has a step 1 for continuously feeding a roll of a substrate film and a step 2 for winding the substrate film, and an appropriate number of membrane-forming units 100, 200, 300 and 400 provided between the steps 1 and 2. FIG. 5 shows an example of the apparatus by which four layers are not wound but subjected to continuous application. However it is needless to say that the number of membrane-forming units may be varied depending on the layer constitution. The membrane-forming unit 100 consists of a coating part 101 for performing the step of applying the coating solution, a drying part 102 for performing the step of drying the applied solution, and a curing part 103 for performing the step of curing the dried coating membrane.

It is preferable from the viewpoint of productivity that, by using an apparatus provided with three membrane-forming units, a roll-type substrate film having the hard coat layer formed thereon is continuously fed and the hard coat layer, the high refractive index layer and the low refractive index layer are successively formed by the respective membrane-forming units followed by winding. It is still preferable that, by using an apparatus provided with four membrane-forming units as shown by FIG. 5, a roll-type substrate film is continuously fed and the hard coat layer, the medium refractive index layer, the high refractive index layer and the low refractive index layer are successively formed by the respective membrane-forming units followed by winding, since the application cost can be largely reduced thereby. As another preferable mode of embodiment, an apparatus having two application stations may be cited. In this mode, namely, the medium-refractive index layer and the high-refractive index layer are formed in a single step and the examination data (face figure, membrane thickness, etc.) are fed back to elevate the yield.

In the invention, the die coat method is preferably employed as an application method from the viewpoint of elevating the production speed. The die coat method is preferred since both of a high productivity and a favorable face figure without unevenness can be established at a high level thereby.

As a method of producing the antireflective film according to the invention, the following application method with the use of the die coat method is preferred.

Namely, the die coat method comprises the coating step of bringing the land of the front lip of a slot die close to the web surface that is continuously running while being supported by a backup roll and applying a coating solution from the slot of the lip. In the invention, it is preferable to conduct the application with the use of a coating device which has a slot die having a land length of at least 30 μm but not more than 100 μm in the web-traveling direction of the front lip in the web-traveling direction side of the slot die and which is located so that, when the slot die is set at the coating position, the gap between the front lip in the direction opposite to the web-traveling direction and the web is larger by at least 30 μm but not more than 120 μm (hereinafter, this numerical limitation will be called "overbite length") than the gap between the front lip in the web-traveling direction and the web.

Next, a die coater preferably usable in the production method according to the invention will be illustrated by reference to the drawings. This die coater is preferable because of being usable in the case where a wet coating amount is small (20 ml/m² or less).

≦Constitution of Die Coater>

Figure 6:
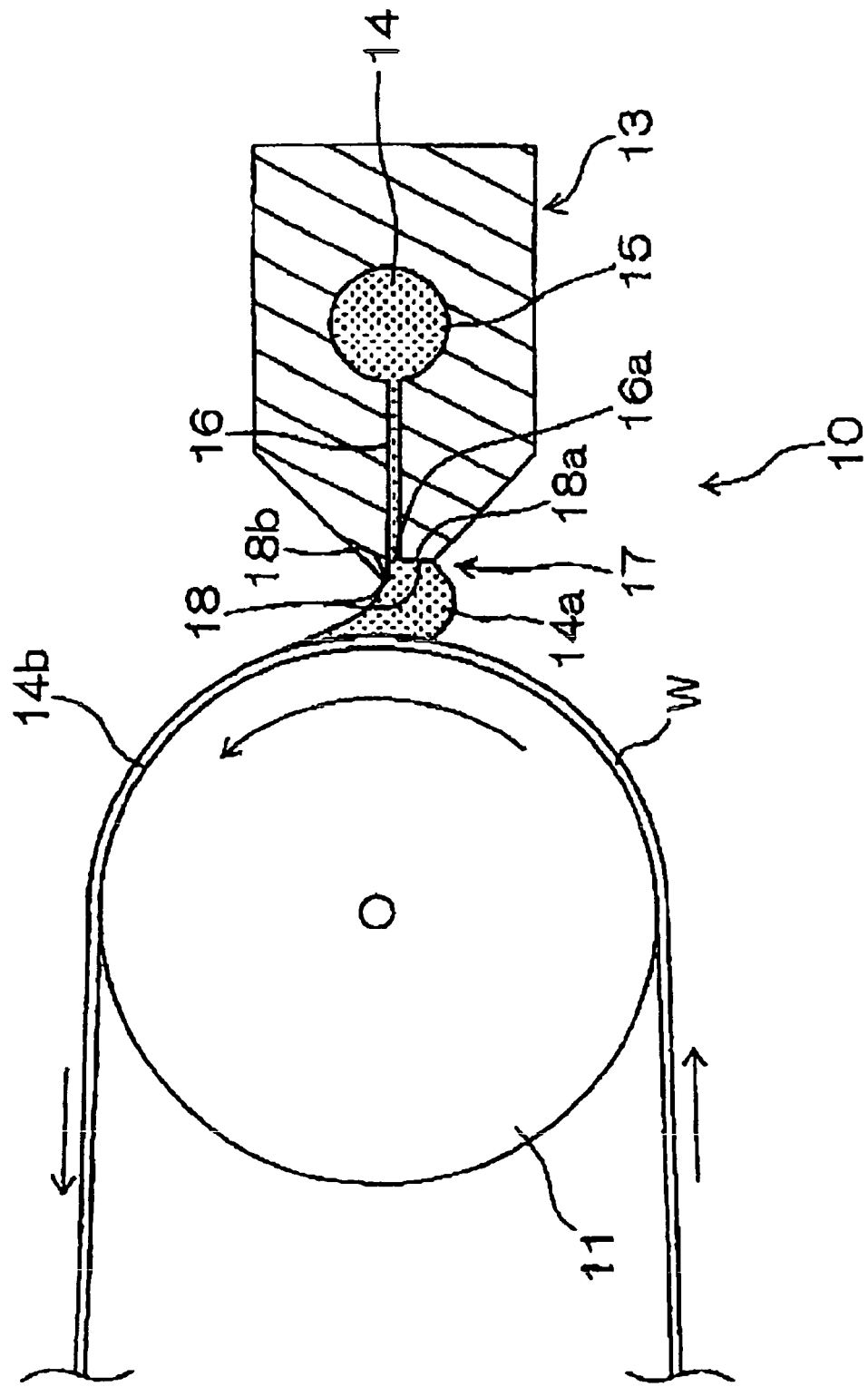
FIG. 6 is a schematic side view which shows an embodiment of a coater preferably employed in the invention.

FIG. 6 is a sectional view of a coater (a coating device) provided with a slot die with which the invention can be preferably embodied.

In a coater 10 comprising a backup roll 11 and a slot die 13, a coating solution 14 is discharged in a bead-like form 14*a* from the slot die 13 onto a web W that is continuously running while being supported by the backup roll 11. Thus, the coating solution is applied to the web W to form a coating membrane 14*b* thereon.

A pocket 15 and a slot 16 are formed within the slot die 13. The pocket 15 has a cross section made up of a curve and a line and it may have either an almost round shape or a half-round shape. This pocket 15 is a space for pooling the coating solution which is extended, while keeping the cross-sectional shape, along the width direction of the slot die 13 (the width direction of the slot die 13 as used herein means the direction toward the front or back side in the drawing of FIG. 6). In general, its effective extension length is adjusted almost the same as or somewhat longer than the coating width. To the pocket 15, the coating solution 14 is supplied from the side face of the slot die 13 or from the center of the face opposite to the slot opening 16a. The pocket 15 is also provided with a stopper (not shown in the drawing) for preventing the coating solution 14 from leakage.

The slot 16, which serves as a flow channel of the coating solution 14 from the pocket 15 to the web W, has a cross section shape in the width direction of the slot die as in the pocket 15. The opening 16a located in the web side is regulated to almost the same length as the coating width usually by using a width regulating plate which is not shown in the drawing. At the front edge of the slot 16, the angle between the backup roll 11 and the tangent line in the web-traveling direction is preferably 30° or larger but not larger than 90°.

A front lip 17 of the slot die 13, where the opening 16a of the slot 16 is provided, has a tapered form and has a flat front edge 18 called a land. Concerning this land 18, the upstream side in the web W-traveling direction to the slot 16 (the direction opposite to the traveling direction indicated by the arrow in the drawing) is referred to as the upstream lip land 18a, while the downstream side (the traveling direction side) is referred to as the downstream lip land 18b.

In the front lip 17, the downstream side is wider than the upstream side (i.e., the overbite shape). Thus, the gap between the upstream lip land 18a and the web W is larger than the gap between the downstream lip land 1b and the web W by the range as defined above. The length of the downstream lip land 18b falls within the range as defined above.

Figure 7A:
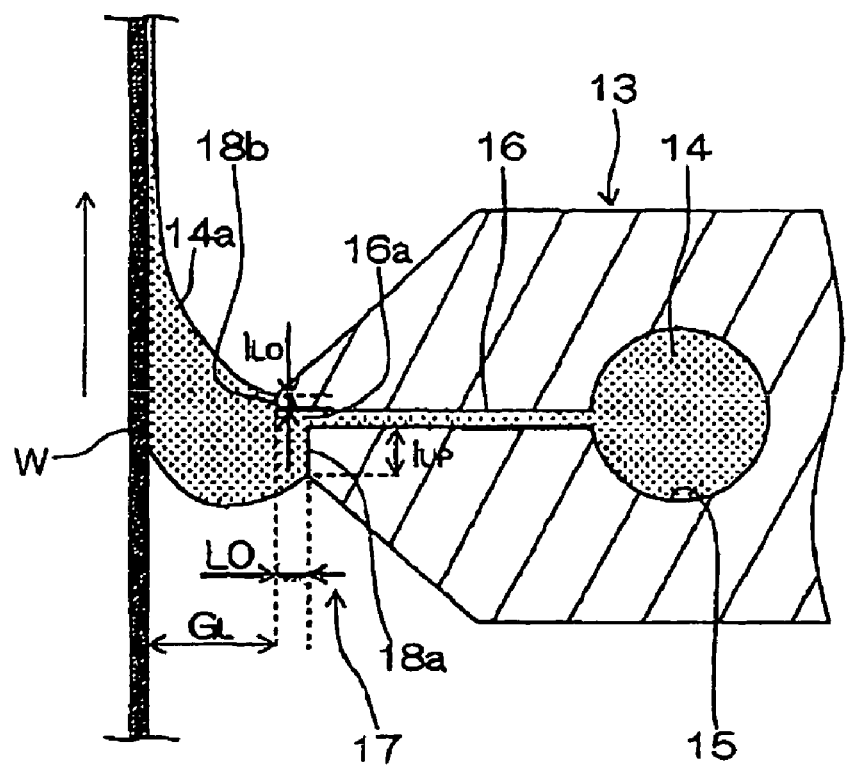
FIG. 7A is an enlarged view of the die coater shown in FIG. 6.
Figure 7B:
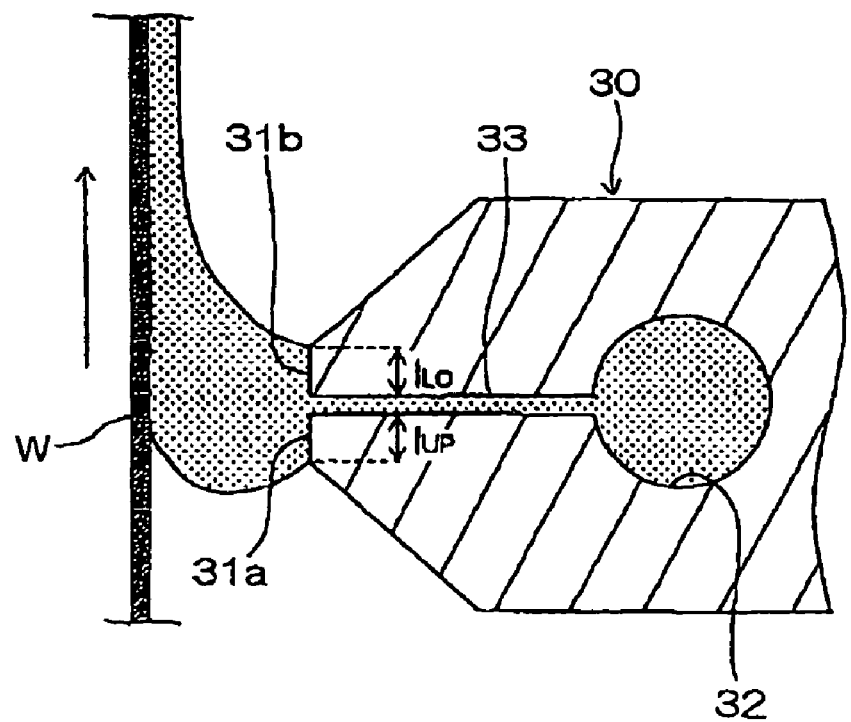
FIG. 7B is a schematic sectional view showing a slot die of the existing type.

By referring FIG. 7A, the parts relating to the numerical limitations as described above will be illustrated. The land length in the web-traveling direction side (downstream side) corresponds to the part indicated by $I_{LO}$ in FIG. 7A, while the overbite length as described above corresponds to the part indicated by LO in FIG. 7A.

The land length $I_{UP}$ of the upstream lip land 18a is preferably from 500 μm to 1 mm, though the invention is not particularly restricted thereto. The land length $L_{LO}$ of the downstream lip land 18b is preferably 30 μm or more but not more than 100 μm, more preferably 30 μm or more but not more than 80 μm and most preferably 30 μm or more but not more than 60 μm. It is preferable that the land length $L_{LO}$ of the downstream lip land 18b is 30 μm or more, since the edge or the land of the front lip is hardly chipped off and thus streaking in the coating membrane can be inhibited. Moreover, the wet line position in the downstream side can be easily determined and, furthermore, spreading of the coating solution in the downstream side can be controlled. Spreading of the coating solution in the downstream side means non-uniformity of the wet line and, in its turn, brings about troubles such as streaks on the coated face. When the land length $L_{LO}$ of the downstream lip land is not more than 100 μm, on the other hand, a bead 14a can be formed. Owing to the formation of the bead 14a by the coating solution, thin layer coating can be performed.

The downstream lip land 18b has an overbite shape closer to web W than the upstream lip land 18a. Thus, the degree of vacuum can be elevated and a bead 14a appropriate for the thin membrane coating can be formed. The difference of the distance between the downstream lip land 18b and the web W from the distance between the upstream lip land 18a and the web W (hereinafter referred to as the overbite length LO) is preferably 30 μm or more but not more than 120 μm, more preferably 30 μm or more but not more than 100 μm and most preferably 30 μm or more but not more than 80 μm. In the case where the slot die 13 has an overbite shape, the gap $G_L$ between the front lip 17 and the web W means the gap between the downstream lip land 18b and the web W.

Next, the whole coating step as described above will be illustrated by referring to FIG. 8.

Figure 8:
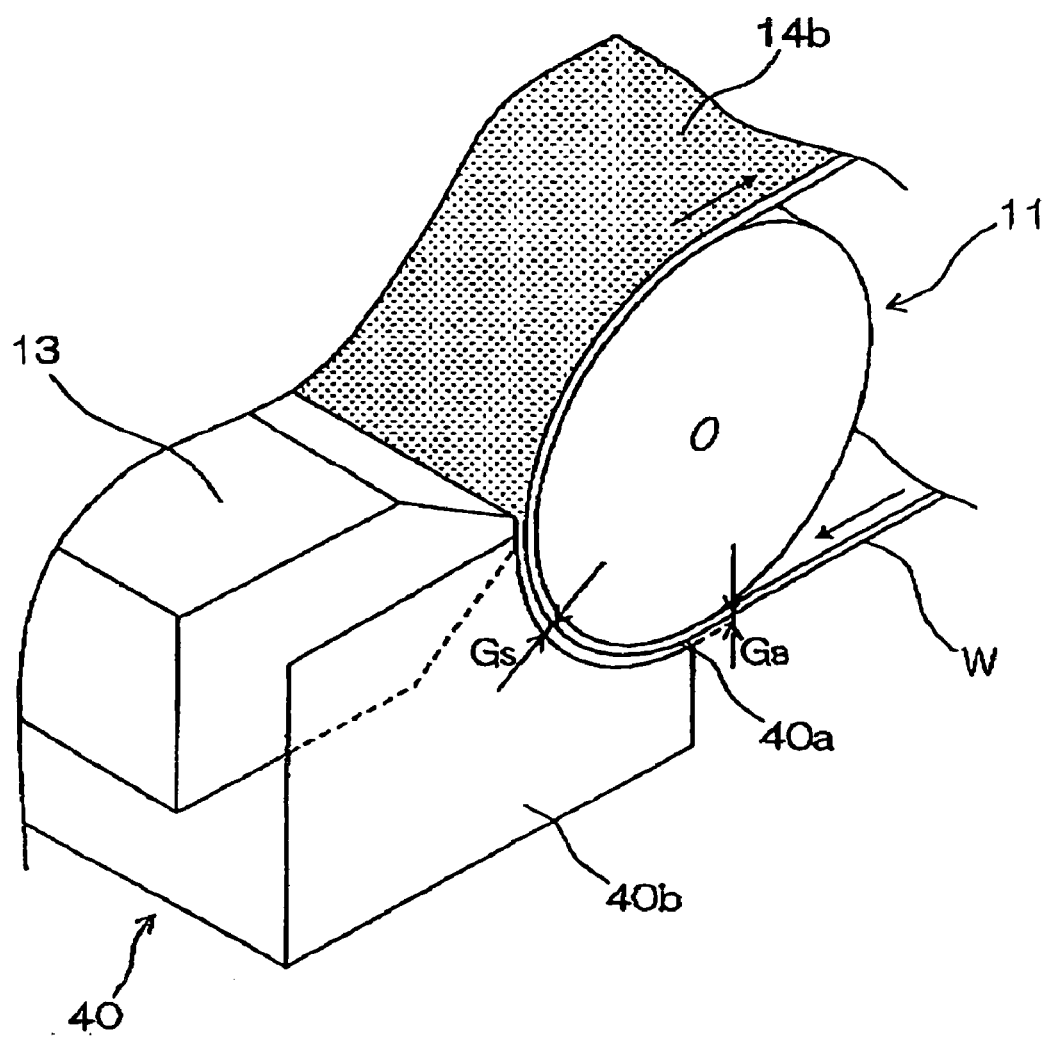
FIG. 8 is a perspective view showing a slot die and its vicinity in the coating step preferably employed in the invention.

FIG. 8 is a perspective view showing the slot die 13 and its vicinity in the coating step for embodying the production method according to the invention. In the opposite side to the web W-traveling direction side (i.e., the upstream side of the bead 14a) to the slot die 13, a vacuum chamber 40 is provided at a non-contact position so as to sufficiently control the degree of vacuum of the bead 14a. The vacuum chamber 40 has a back plate 40a and a side plate 40b for maintaining its driving efficiency. The gap between the back plate 40a and the web is referred to as $G_B$, while the gap between the side plate 40b and the web is referred to as $G_S$.

Figure 9:
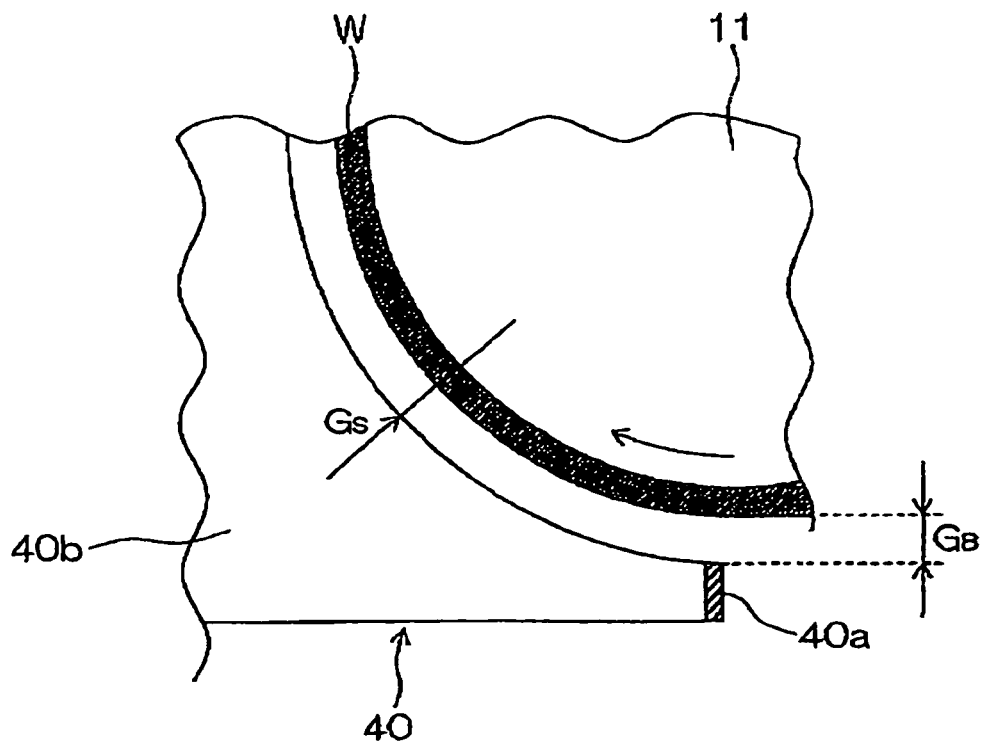
FIG. 9 is a sectional view which schematically shows the relation between the vacuum chamber in FIG. 8 and the web.
Figure 10:
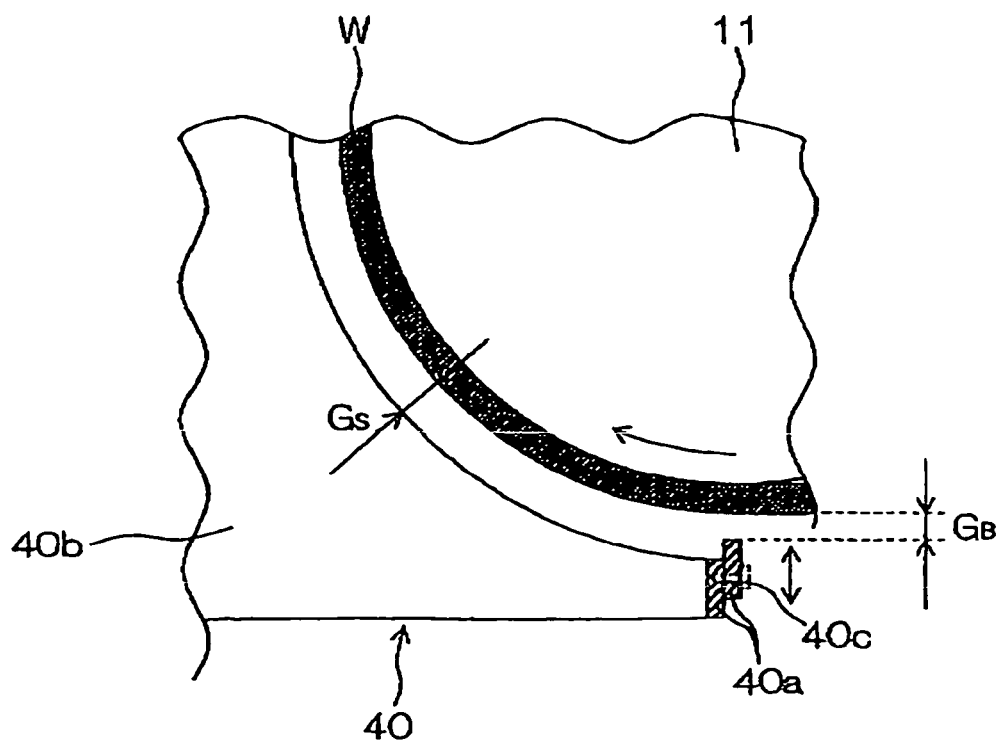
FIG. 10 is a sectional view which schematically shows the relation between the vacuum chamber in FIG. 8 and the web.

Now, the relationship between the vacuum chamber 40 and the web W will be illustrated by referring to FIGS. 9 and 10. FIGS. 9 and 10 are each a sectional view showing the vacuum chamber 40 and the web W being close to each other.

The side plate 40b and the back plate 40a may be united with the chamber body 40 as shown in FIG. 9. Alternatively, the back plate 40a may be fixed to the chamber 40 with, for example, a screw 40c so that the gap $G_B$ can be appropriately altered as shown in FIG. 10. In any structure, the gap between the back plate 40a and the web W and the gap between the side plate 40b and the web W are defined respectively as $G_B$ and $G_S$. In the case of locating the vacuum chamber 40 below the web W and the slot die 13 as in FIG. 8, the gap $G_B$ between the back plate 40a of the vacuum chamber 40 and the web W means the space from top end of the back plate 40a to the web W.

It is preferable that the gap $G_B$ between the back plate 40a and the web W is larger than the gap $G_L$ (see FIG. 7A) between the front lip 17 of the slot die 13 and the web W. Owing to this structure, change in the degree of vacuum around the bead caused by decentering of the backup roll 11 can be regulated. In the case where the gap $G_L$ between the front lip 17 of the slot die 13 and the web W is 30 μm or more but not more than 100 μm, the gap $G_B$ between the back plate 40a and the web W is preferably 100 μm or more but not more than 500 μm.

≦Material and Accuracy>

It is preferable to control the length in the web-traveling direction of the front lip in the web-traveling direction side (the downstream lip land length $I_{LO}$ shown in FIG. 7A) falls within the range as described above. It is also preferable to regulate the fluctuation range of $I_{LO}$ in the slot die width direction within 20 μm. It is preferable that the fluctuation falls within this range, since the beads never becomes unstable due to slight external disturbance.

It is undesirable to employ a material such as stainless steel in the front lip of the slot die, since it would undergo sagging in the step of die processing. By using stainless steel or the like, the front lip accuracy can be hardly satisfied even though the downstream lip land length $I_{LO}$ is controlled to the above-described range, i.e., from 30 μm to 100 μm. To maintain a high processing accuracy, use is preferably made of an ultra-hard material as reported by Japanese Patent No. 2817053. More specifically speaking, it is preferable that at least the front lip of the slot die is made of an ultrahard alloy consisting of carbide crystals having an average grain size of 5 μm or less bonded together. Examples of such an ultrahigh alloy include those obtained by bonding carbide crystal grains by using a metallic binder such as cobalt, e.g., tungsten carbide (hereinafter referred to as WC). As the metallic binder, it is also possible to use titanium, tantalum, niobium or a mixture thereof. It is still preferable that the average grain size of WC crystals is 3 μm or less.

To achieve highly accurate coating, the downstream lip land length $I_{LO}$ as described above serves an important role. It is still preferable to regulate the fluctuation range of the gap $G_L$ in the slot die width direction. The backup roll 11 and the front lip 17 preferably have such straightnesses as enabling the regulation of the fluctuation of the gap $G_L$ in the slot die width direction. In a preferred case, the straightnesses of the front lip 17 and the backup roll 11 are controlled so as to regulate the fluctuation of the gap $G_L$ in the slot die width direction to 5 μm or below.

In the case where the antireflective film has a layered structure, defect spots become noticeable in the presence of foreign matters such as dust and debris. The term "defect spots" as used herein means defects visible with the naked eye due to reflection on the coating membrane as discussed above. They can be detected with the naked eye by, for example, painting the back face of the antireflective film black after the coating. In general, defect spots visible with the naked eye are 50 μm or larger in size. With an increase in the defect spots, the production yield is lowered and thus it becomes impossible to produce an antireflective film having a large area.

The antireflective film according to the invention preferably has 20 or less, still preferably 10 or less, still preferably 5 or less and particularly preferably 1 or less, defect spots per square meter.

An antireflective film with little defect spots can be produced by precisely controlling the dispersion of inorganic fine particles having high refractive index in the coating composition for forming high refractive index layer and microfiltering the coating solution. It is preferable that, at the same time, the coating step in the coating part and the drying step in the drying room for forming each of the layers constituting the antireflective layer are performed in an atmosphere of a high air cleanliness and dust and debris are sufficiently removed from the film before the coating. The air cleanliness in the coating step and the drying step is preferably class 10 (not more than 353 particles ($\geqq 0.5$ μm)/m$^3$) or more, more preferably class 1 (not more than 35.5 particles ($\geqq 0.5$ μm)/m$^3$) or more, in accordance with US Federal Standard 209E. It is still preferable that a high air cleanliness is also achieved in the parts other than the coating-drying steps such as the winding part.

Examples of the dedusting method to be used in the dedusting step, which is a preliminary step before the coating, include dry dedusting methods such as a method of pressing a nonwoven fabric or a blade against the film surface as described in JP-A-59-150571; a method of spraying air of a high cleanliness at a high speed, thus stripping extraneous matters from the film surface and then sucking via a suction port closely located as described in JP-A-10-309553; and a method of spraying compressed air under ultrasonic vibration, thus stripping extraneous matters from the film surface and then sucking as described in JP-A-7-33613 (for example, NEW ULTRA CLEANER manufactured by SHINKO).

It is also possible to employ wet dedusting methods, for example, a method of introducing a film into a washing tank and stripping extraneous matters by using an ultrasonic vibrator; a method of supplying a washing liquor to a film and spraying air at a high speed followed by sucking, as described in JP-B-49-13020; and a method of continuously rubbing a web with a moistened roll and jetting a liquid onto the rubbed face to thereby wash the web as described in JP-A-2001-38306. Among these dedusting methods, an ultrasonic dedusting method or a wet dedusting method is particularly favorable from the viewpoint of dedusting effect.

To elevate the dedusting effect and prevent sticking of dust and debris, it is particularly preferable that, before the dedusting step as described above, to eliminate static electricity from the substrate film. To remove the electricity, use can be made of an ionizer of the corona discharge type or an ionizer of the irradiation type (UV, soft X-ray and so on). Before and after the dedusting and coating, the electric potential of the substrate film is preferably 1000 V or less, still preferably 300 V or less and particularly preferably 100 V or less.

≦Dispersion Medium for Coating>

The dispersion medium to be used in the coating are not specifically restricted. Namely, either a single medium or a mixture of two or more media may be employed. Preferable examples of the dispersion medium include aromatic hydrocarbons such as toluene, xylene and styrene; chlorinated aromatic hydrocarbons such as chlorobenzene and ortho-dichlorobenzene; chlorinated aliphatic hydrocarbons including methane derivatives such as monochloromethane and ethane derivatives such as monochloroethane; alcohols such as methanol, isopropyl alcohol and isobutyl alcohol; esters such as methyl acetate and ethyl acetate; ethers such as ethyl ether and 1,4-dioxane; ketones such as acetone, methyl ethyl ketone, methyl isobutyl ketone and cyclohexanone; glycol ethers such as ethylene glycol monomethyl ether; alicyclic hydrocarbons such as cyclohexane; aliphatic hydrocarbons such as normal hexane; and mixtures of aliphatic or aromatic hydrocarbons. Among these media, it is particularly preferable to use a ketone alone or a mixture of two or more ketones as the dispersion medium.

≦Filtration>

Before the coating, it is preferable to filter the coating solution to be used in the coating. In the filtration, it is preferable to employ a filter having a pore size as small as possible so long as the components in the coating solution are not eliminated thereby. In the filtration, it is preferable to use a filter having an absolute filtration accuracy of form 0.1 to 10 μm, still preferably to use a filter having an absolute filtration accuracy of form 0.1 to 5 μm. The thickness of the filter is preferably from 0.1 to 10 mm, still preferably form 0.2 to 2 mm. In such a case, it is preferable to perform the filtration at a filtration pressure of 1.5 MPa or less, still preferably 1.0 MPa or less and still preferably 0.2 MPa or less.

The material of the filter is not particularly restricted, so long as the coating solution is not affected thereby. Specifically speaking, use can be made of the same filter materials as those employed in wet dispersions of the inorganic compounds as described above.

It is also preferable to ultrasonically disperse the filtered coating solution so as to accelerate defoaming of the dispersion and the retention of the dispersed state.

≦Coating Solution Properties>

In the coating system of the production method according to the invention, it is preferable to control the liquid properties, in particular the viscosity and the surface tension, at the point of the coating. It is favorable to control the liquid properties, since the upper limit of the coating speed can be thus elevated.

The viscosity of the coating solution at the point of the coating is preferably 2.0 [mPa·sec] or less, still preferably 1.5 [mPa·sec] or less and most preferably 1.0 [mPa·sec] or less. Since the viscosities of some coating solutions vary depending on shear speed, the upper limits as defined above each means the viscosity at shear speed the point of the coating. It is preferable to add a thixotropic agent to the coating solution. This is because the viscosity can be regulated to a low level thereby in the coating under a high shear force while the viscosity is elevated in the course of drying with little shear force, thus preventing unevenness in drying.

Further, the amount of the coating solution to be applied to the web also affects the upper limit of the coating speed, though it does not fall within the category of solution properties. Namely, the amount of the coating solution to be applied to the web preferably ranges from 2.0 to 5.0 [ml/m$^2$]. It is preferred to increase the amount of the coating solution to be applied to the web since the upper limit of the coating speed can be elevated thereby. When the coating solution is applied to the web in an excessively large amount, however, the drying load is elevated. Therefore, it is favorable to determine the amount of the coating solution to be applied to the web depending on the solution formulation and processing conditions.

The surface tension preferably ranges from 15 to 36 [mN/m]. It is preferable to lower the surface tension by adding, for example, a leveling agent, since unevenness in drying can be regulated thereby. On the other hand, an excessive decrease in the surface tension results in a lowering in the upper limit of the coating speed. Thus, it still preferably ranges from 17 [mN/m] to 32 [mN/m] and particularly preferably from 19 [mN/m] to 26 [mN/m].

≦Coating Speed>

Owing to the production method with the use of the die coat method as described above, the above-described coating system can establish a high membrane thickness stability at high-speed coating. Moreover, the premeasurement is employed in this coating system, which ensures stable membrane thickness even at high-speed coating. As discussed above, the coating system is applicable to the case where a wet coating amount is small (20 ml/m$^2$ or less) or a coating solution is employed in a small amount and thus a high membrane thickness stability can be achieved at a high speed. As a method of producing the antireflective film of the invention, it is preferable to employ the above-described production method with the use of the die coat method. It is preferable to employ this production method, since it is free from the problem of vibration of the coating solution in a solution tank, it causes little stepwise unevenness, it is free from roll-core deviation or sagging relating to the coating and thus suffers from little stepwise unevenness and the premeasurement system ensuring a high membrane thickness stability is employed therein. From the viewpoint of productivity, it is preferable to employ the above-described production method and conduct the coating at a speed of 25 m/min or higher.

[Polarizing Plate]

In usual, a polarizing plate comprises a polarizing membrane and two protective films provided in both side thereof. It is preferable in the invention that the antireflective film according to the invention is employed as at least one of these protective films between which the polarizing film is inserted. By using the antireflective film also as the protective film, the production cost of the polarizing plate can be reduced. By using the antireflective film as the outermost layer, the reflection of outside light can be prevented and a polarizing plate having excellent scratch resistance, antifouling properties and so on can be obtained.

As the polarizing film, use may be made of a publicly known polarizing film or a polarizing film cut out from a continuous polarizing membrane sheet the absorption axis of which is neither parallel nor perpendicular to the lengthwise direction. Such a continuous polarizing membrane sheet the absorption axis of which is neither parallel nor perpendicular to the lengthwise direction can be produced by the following method.

That is, it can be produced by a stretching method which comprises stretching a polymer film by applying a tension while holding both ends of the film by holding members, stretching the thus obtained polarizing membrane at a stretching ratio of at least 1.1 to 20.0 in the film width direction, and flexing the film-traveling direction while holding its both ends so that the difference in the speed in the lengthwise direction between the holding members at the both ends of the film is not more than 3% and the angle between the film-traveling direction at the outlet of the step holding the both ends of the film and the actual stretching direction of the film is inclined at 20 to 70°. From the viewpoint of productivity, a film with an incline angle of 45° is preferably employed.

Methods of stretching polymer films are described in detail in paragraphs [0020] to [0030] in JP-A-2002-86554.

[Image Display Unit]

As one of the surface-protective films of a polarizing membrane, the antireflective film according to the invention is preferably usable in liquid crystal display units of transmission, reflection and semi-transmission modes such as twisted nematic (TN), super-twisted nematic (STN), vertical alignment (VA), in-place switching (IPS) and optically compensated bend cell (OCB) modes.

Liquid crystal cells of the VA mode include: (1) a liquid crystal cell of VA mode in a narrow sense, in which rod-like liquid crystal molecules are essentially vertically aligned while voltage is not applied, and the molecules are essentially horizontally aligned while voltage is applied (JP-A-2-176625); (2) a liquid crystal cell of MVA mode, in which the VA mode is modified to be multi-domain type so as to enlarge the viewing angle (described in SID97, Digest of tech. Papers, 28(1997), 845); (3) a liquid crystal cell of n-ASM mode, in which rod-like liquid crystal molecules are essentially vertically aligned while voltage is not applied, and the molecules are essentially oriented in twisted multi-domain alignment while voltage is applied (described in *Nippon Ekisho Toronkai* [Liquid crystal forum of Japan], Digest of tech. Papers (1998), 58-59); and (4) a liquid crystal cell of SURVAIVAL mode (published in LCD international 98).

In a liquid crystal cell of the VA mode, it is preferable to employ a polarizing plate constructed by combining a biaxially stretched triacetylcellulose film with the antireflective film according to the invention. To produce such a biaxially stretched triacetylcellulose film, use may be preferably made of methods reported in, for example, JP-A-2001-249223 and JP-A-2003-170492.

A liquid crystal cell of the OCB mode is a liquid crystal display unit with the use of a liquid crystal cell of bend alignment mode, in which rod-like liquid crystal molecules are aligned essentially in opposite directions (symmetrically) in the upper part and the lower part, as disclosed in U.S. Pat. No. 4,583,825 and U.S. Pat. No. 5,410,422. Since the rod-like liquid crystal molecules are symmetrically aligned in the upper part and the lower part, this liquid cell of the bend alignment mode has a self-optically compensatory function. Therefore, this liquid crystal mode is also called OCB (optically compensatory bend) liquid crystal mode. Such a liquid crystal display device of the bend alignment mode has an advantage of having a high response speed.

A liquid crystal cell of the TN mode, in which rod-like liquid crystal molecules are essentially horizontally aligned while voltage is not applied, has been most frequently used as a color TFT liquid crystal display unit and reported in a large number of documents, for example, *EL, PDP, LCD Display*, Toray Research Center (2001).

As described in, for example, JP-A-2001-100043, it is particularly preferable that in liquid crystal display units of the TN mode and the IPS mode, an optically compensatory film having an effect of enlarging viewing angle is used in the opposite side of the antireflective film according to the invention, which is employed as one of the protective films in the front and back faces of a polarizing membrane, to thereby give a polarizing plate having an antireflective effect and a viewing angle-enlarging effect at the thickness of a single polarizing plate alone.

EXAMPLES

Example 1

Now, the invention will be illustrated in greater detail by reference to the following EXAMPLES. However, it is to be understood that the invention is not construed as being restricted thereto.

(Preparation of Coating Solution for Hard Coat Layer)

The composition as specified below was fed into a mixing tank and stirred to give a coating solution for hard coat layer.

To 750.0 parts by weight of trimethylolpropane triacrylate (BISCOAT #295 manufactured by OSAKA YUKI CHEMICAL Co., Ltd.), 270.0 parts by mass of polyglycidyl methacrylate having a mass-average molecular weight of 15000, 730.0 parts by mass of methyl ethyl ketone, 500.0 parts by weight of cyclohexanone and 50.0 parts by mass of a photopolymerization initiator (IRGACURE 184 manufactured by Ciba-Specialty Chemicals) were added followed by stirring. The obtained mixture was filtered through a polypropylene filter having a pore size of 0.4 μm to give a coating solution for hard coat layer. The polyglycidyl methacrylate was obtained by dissolving glycidyl methacrylate (TOKYO KASEI KOGYO K.K.) in methyl ethyl ketone (MEK) and reacted under dropping a heat polymerization initiator V-65 (manufactured by WAKO PURE CHEMICAL INDUSTRIES) for 2 hours at 80° C. Then, the liquid reaction mixture thus obtained was dropped into hexane and the precipitate was dried under reduced pressure.

(Preparation of Dispersion of Titanium Dioxide Microparticles)

As titanium dioxide microparticles, use was made of titanium dioxide microparticles containing cobalt and having been surface-treated with the use of aluminum hydroxide and zirconium hydroxide (MPT-129C manufactured by ISHIHARA SANGYO K.K., $TiO_2:Co_3O_4:Al_2O_3:ZrO_2=90.5:3.0:4.0:0.5$ by weight).

To 257.1 parts by mass of these particles, 41.1 parts by mass of the following dispersing agent and 701.8 parts by mass of cyclohexanone were added and dispersed with a Dynomill to thereby give a titanium dioxide dispersion having a weight-average diameter of 70 nm.

Dispersing agent:

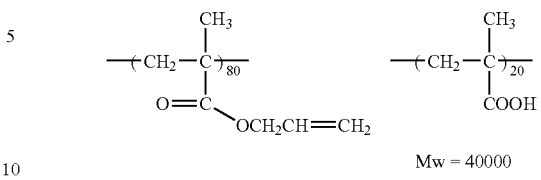

$Mw = 40000$ (Preparation of Coating Solution for Medium-Refractive Index Layer)

To 99.1 parts by mass of the titanium dioxide dispersion as described above, 68.0 parts by mass of a mixture of dipentaerythritol pentaacrylate with dipentaerythritol hexaacrylate (DPHA manufactured by NIPPON KAYAKU Co., Ltd.), 3.6 part by mass of a photopolymerization initiator (IRGACURE 907 manufactured by Ciba Specialty Chemicals), 1.2 parts by mass a photosensiizer (KAYACURE DETX, manufactured by NIPPON KAYAKU Co., Ltd.), 279.6 parts by mass of methyl ethyl ketone and 1049.0 parts by mass of cyclohexanone were added and stirred. After thoroughly stirring, the mixture was filtered through a polypropylene filter having a pore size of 0.4 μm to give a coating solution for medium-refractive index layer.

(Preparation of Coating Solution for High-Refractive Index Layer)

To 469.8 parts by mass of the titanium dioxide dispersion as described above, 40.0 parts by mass of a mixture of dipentaerythritol pentaacrylate with dipentaerythritol hexaacrylate (DPHA manufactured by NIPPON KAYAKU Co., Ltd.), 3.3 part by mass of part of a photopolymerization initiator (IRGACURE 907 manufactured by Ciba Specialty Chemicals), 1.1 parts by mass a photosensitizer (KAYACURE DETX, manufactured by NIPPON KAYAKU Co., Ltd.), 526.6 parts by mass of methyl ethyl ketone and 459.6 parts by mass of cyclohexanone were added and stirred. After thoroughly stirring, the mixture was filtered through a polypropylene filter having a pore size of 0.4 μm to give a coating solution for high-refractive index layer.

(Preparation of Coating Solution for Low-Refractive Index Layer)

The fluorine-containing copolymer P-3 (weight-average molecular weight: about 50000) described in JP-A-2004-45462 relating to the present invention was dissolved in methyl isobutyl ketone to give a concentration of 7% by mass. Next, 3%, based on the solid matters of a terminal methacrylate-containing silicone resin X-22-164C (manufactured by SHIN-ETSU CHEMICAL Co., Ltd.), 5% by mass, based on the solid matters, of the above-described photopolymerization initiator IRGACURE 907 (trade name) (in the samples excluding the samples Nos. 107 to 110, 5% by mass of either IRGACURE 907 or 2-(p-methoxyphenyl)-4,6-bis(trichloromethyl)-s-triazine compound was used together with the compound 1) were added thereto to give a coating solution for low-refractive index layer.

(Production of Antireflective Film 101)

On a triacetylcellulose film of 80 μm in thickness (FUJITAC TD80UF, manufactured by FUJI PHOTOFILM Co., Ltd.), the coating solution for forming hard coat layer as described above was applied by using a gravure coater. After drying at 100° C., the coating layer was cured by irradiating, under nitrogen-purge to achieve an atmosphere with an oxygen concentration of 1.0% by volume or less, with ultraviolet light at 300 mJ/cm² by using an air-cool metal halide lamp (manufactured by EYEGRAPHICS, 160 W/cm, 400 mW/cm²). Thus a hard coat layer of 8 μm in thickness was formed.

On the hard coat layer, the coating solution for medium-refractive index layer, the coating solution for high-refractive index layer and the coating solution for low-refractive index layer were successively applied by using a gravure coater having three coating station at a speed of from 5 to 100 m/min.

The medium-refractive index layer was dried at 90° C. for 30 sec and cured by irradiating, under nitrogen-purge to achieve an atmosphere with an oxygen concentration of 1.0% by volume or less, with ultraviolet light at 200 mJ/cm² by using an air-cool metal halide lamp (manufactured by EYE-GRAPHICS, 180 W/cm, 200 mW/cm²).

After curing, the medium-refractive index layer had a refractive index of 1.630 and a membrane thickness of 67 nm.

The high-refractive index layer was dried at 90° C. for 30 sec and cured by irradiating, under nitrogen-purge to achieve an atmosphere with an oxygen concentration of 1.0% by volume or less, with ultraviolet light at 400 mJ/cm² by using an air-cool metal halide lamp (manufactured by EYE-GRAPHICS, 240 W/cm, 600 mW/cm²).

After curing, the high-refractive index layer had a refractive index of 1.905 and a membrane thickness of 107 nm.

The low-refractive index layer was dried at 90° C. for 30 sec and cured by irradiating, under nitrogen-purge (using 1.40 m³/min of nitrogen gas in a 0.2 m³ reaction room) to achieve an atmosphere with an oxygen concentration of 1.0% by volume or less, with ultraviolet light at 200 mJ/cm² by using an air-cool metal halide lamp (manufactured by EYE-GRAPHICS, 240 W/cm, 200 mW/cm²).

After curing, the low-refractive index layer had a refractive index of 1.440 and a membrane thickness of 85 nm. Thus, an antireflective film 101 was produced.

By altering the initiator and curing conditions as listed in Table 1, samples 102 to 115 were produced. Each initiator was employed in the equivalent mass. In sample 116, 50.0 parts by mass of compound 1 was employed together as an additional initiator for the hard coat layer. In sample 117, 50.0 parts by mass portions of compound 1 and 2-(p-methoxyphenyl)-4,6-bis(trichloromethyl)-s-triazine compound were employed together as additional initiators for the hard coat layer. On samples 116 and 117, low-refractive index layers respectively containing 5% by mass of compound 1 and 2-(p-methoxyphenyl)-4,6-bis(trichloromethyl)-s-triazine compound were formed and other conditions were as in listed in Table 1. To blow nitrogen gas, an anterior room was provided immediately before the UV-irradiation room (the reaction room) and nozzles were provided so that the inert gas was directly jetted on the membrane face. The air discharge form the radiation room and the anterior room was controlled so that the inert gas was blown from the web inlet of the anterior room. The gap between the web and the coating layer surface at the web-inlet was adjusted to 4 mm.

In the case of altering the coating speed, the UV-irradiation dose was maintained at a constant level by controlling the illuminance.

TABLE 1

| Sample No. | Initiator | Anterior room/ nitrogen blowing | Nitrogen blowing rate (m³/min) | Nitrogen gas rate (m³/min) for purging reaction room | Oxygen concentration (%) at UV-irradiation | Low-oxygen level time (sec) after starting UV-irradiation | Remark |
|---|---|---|---|---|---|---|---|
| 101 | IRGACURE 907 | No | 0 | 1.40 | 0.1 | 0.3 | Comp. |
| 102 | IRGACURE 907 | Yes | 0.2 | 1.40 | 0.08 | 0.3 | Comparison |
| 103 | Compound 1 | No | 0 | 1.40 | 0.1 | 0.3 | Invention |
| 104 | Compound 1 | Yes | 0.2 | 1.40 | 0.08 | 0.3 | Invention |
| 105 | Compound 1 | Yes | 0.2 | 1.0 | 1 | 1 | Invention |
| 106 | Compound 1 | Yes | 0.2 | 0.7 | 5 | 1 | Invention |
| 107 | Compound 1 with *Compound A = 5 mass % | Yes | 0.2 | 1.40 | 0.08 | 1 | Invention |
| 108 | Compound 1 with *Compound B = 5 mass % | Yes | 0.5 | 1.40 | 0.07 | 1 | Invention |
| 109 | Compound 1 with *Compound A = 5 mass % | Yes | 0.2 | 1.0 | 1 | 1 | Invention |
| 110 | Compound 1 with *Compound B = 5 mass % | Yes | 0.5 | 0.7 | 5 | 1 | Invention |
| 111 | Compound 9 | Yes | 0.2 | 1.40 | 0.08 | 1 | Invention |
| 112 | Compound 11 | Yes | 0.2 | 1.40 | 0.08 | 1 | Invention |
| 113 | Compound 25 | Yes | 0.2 | 1.40 | 0.08 | 1 | Invention |
| 114 | Compound 30 | Yes | 0.2 | 1.40 | 0.08 | 1 | Invention |
| 115 | Compound 32 | Yes | 0.2 | 1.40 | 0.08 | 1 | Invention |
| 116 | *Condition c | Yes | 0.2 | 1.0 | 1 | 1 | Invention |
| 117 | *Condition d | Yes | 0.2 | 1.0 | 1 | 1 | Invention |

*Compound A: IRGACURE 907 (manufactured by Ciba-Geigy).
*Compound B: 2-(p-methoxyphenyl)-4,6-bis(trichloromethyl)-s-triazine.
*Condition c: Adding compound 1 as an initiator for hard coat layer; and adding compound 1 as an initiator for low-refractive index layer.
*Condition d: Adding 5% by mass portions of compound 1 and compound B as initiators for hard coat layer; and adding 5% by mass portions of compound 1 and compound B as initiators for low-refractive index layer.

In Table 1, the expression "low oxygen level time after starting UV-irradiation" means the period of time wherein UV-irradiation was conducted in practice in an atmosphere maintained at a definite oxygen concentration.

Compound 1 and so on as described above are those having been described herein. In particular, compound 1 will be presented again.

Compound 1:

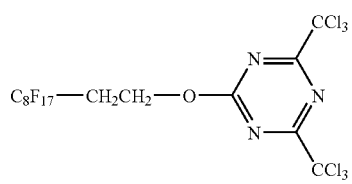

The obtained films were evaluated in the following items. Table 2 summarizes the results.

[Specular Reflectivity]

The specular reflectivity at an output angle −5° at an input angle 5° was measured with the use of a spectral hardness meter V-550 (manufactured by JASCO) in a wavelength range of 380 to 780 nm. The average reflectivity within 450 to 650 nm was calculated to thereby evaluate the antireflection performance.

[Pencil Hardness]

The pencil hardness test was conducted in accordance with JIS K-5400. An antireflective film was conditioned at a temperature of 25° C. and a humidity of 60% RH for 2 hours and then subjected to the test with the use of pencils H to 5H for the test as defined in JIS S-6006 under a load of 500 g. Evaluation was made based on the following criteria and the highest hardness at which the sample was evaluated as "OK" was referred to the test result.

OK: No or one mark in the evaluation (n=5).
NG: Three or more marks in the evaluation (n=5).

[Steel Wool Scratch Resistance]

Under a load of 1.96 N/cm², a sample was rubbed with steel wool "No. 000" back and forth 30 times. Then scratch marks in the rubbed part were evaluated in five grades as shown below.

A: No noticeable mark observed.
B: Slightly noticeable marks observed.
C: Clearly noticeable marks observed.
D: Remarkably noticeable marks observed.
E: Film-separation occurred.

TABLE 2

| Sample no. | Reflectivity (%) | Pencil Hardness | Steel wool resistance | Remark |
|---|---|---|---|---|
| 101 | 0.32 | 2H | D/C | Comparison |
| 102 | 0.32 | 2H | C | Comparison |
| 103 | 0.32 | 3H | B/A | Invention |
| 104 | 0.32 | 3H | B/A | Invention |
| 105 | 0.32 | 2H/3H | B/A | Invention |
| 106 | 0.32 | 2H/3H | B | Invention |
| 107 | 0.32 | 3H/4H | A | Invention |
| 108 | 0.32 | 4H | A | Invention |
| 109 | 0.32 | 3H/4H | B/A | Invention |
| 110 | 0.32 | 2H/3H | B/A | Invention |
| 111 | 0.32 | 3H/4H | A | Invention |
| 112 | 0.32 | 3H/4H | A | Invention |
| 113 | 0.32 | 3H/4H | A | Invention |

TABLE 2-continued

| Sample no. | Reflectivity (%) | Pencil Hardness | Steel wool resistance | Remark |
|---|---|---|---|---|
| 114 | 0.32 | 3H/4H | A | Invention |
| 115 | 0.32 | 3H/4H | A | Invention |
| 116 | 0.32 | 2H/3H | B/A | Invention |
| 117 | 0.32 | 4H | A | Invention |

Thus, it is understood that an antireflective film, which was cured under the conditions according to the invention with the use of the fluorinated photopolymerization initiator, showed a sufficient antireflection performance and had an excellent scratch resistance and the scratch resistance was not worsened even at a high oxygen concentration in the reaction room.

It can be also understood that a high scratch resistance was obtained by using the fluorinated photopolymerization initiator together with other initiators.

Example 2

Samples 118 to 129 were produced as in samples 101, 103, 109 and 116 in EXAMPLE 1 but elevating the web temperature at the UV-irradiation. Then, the samples were evaluated in the same manner.

The temperature of the coated face of the web was controlled by changing the temperature of the metal plate being in contact with the back face of the web.

TABLE 3

| Sample no. | Temp. at UV-irradiation | Reflectivity (%) | Pencil Hardness | Steel wool resistance | Remark |
|---|---|---|---|---|---|
| 101 | No heating | 0.32 | 2H | D/C | Comparison |
| 118 | 40° C. | 0.32 | 2H | C | Comparison |
| 119 | 60° C. | 0.32 | 2H3H | C | Comparison |
| 120 | 80° C. | 0.32 | 3H | B | Comparison |
| 103 | No heating | 0.32 | 3H | B/A | Invention |
| 121 | 40° C. | 0.32 | 3H/4H | A | Invention |
| 122 | 60° C. | 0.32 | 3H/4H | A | Invention |
| 123 | 80° C. | 0.32 | 4H | A | Invention |
| 109 | No heating | 0.32 | 3H/4H | B/A | Invention |
| 124 | 40° C. | 0.32 | 3H/4H | A | Invention |
| 125 | 60° C. | 0.32 | 4H | A | Invention |
| 126 | 80° C. | 0.32 | 4H | A | Invention |
| 116 | No heating | 0.32 | 2H/3H | B/A | Invention |
| 127 | 40° C. | 0.32 | 4H | A | Invention |
| 128 | 60° C. | 0.32 | 4H | A | Invention |
| 129 | 80° C. | 0.32 | 4H | A | Invention |

In the invention, elevated scratch resistances were achieved by elevating the temperature at the UV-irradiation to 40° C. or higher. Further, sample 109 containing compound A in addition to compound 1 and sample 116 containing compound A in both of the hard coat layer and the low-refractive index layer were also excellent in pencil hardness and scratch resistance even though the UV-irradiation was conducted at a low temperature of 40° C.

Example 3

Samples 130 to 133 as listed in Table 4 were prepared as in sample 103 in EXAMPLE 1 but conducting the UV-irradiation in multiple times and altering the degree of nitrogen-purge during the UV-irradiation. Then, the samples were evaluated in the same manner.

When the UV-irradiation was conducted multiple times, the UV-irradiation dose was maintained at a constant level by controlling the illuminance. Table 5 summarizes the results.

It is understood that, even in the case of lowering the illuminance in a single UV-irradiation, the samples showed performance at a high oxygen concentration comparable or even superior to the samples of COMPARATIVE EXAMPLES 101 and 102 (oxygen concentration: 0.1% or less). It is also found out that these samples were suitable for high-speed production.

TABLE 4

| Sample no. | UV-irradiation (times) | Nitrogen-purge in UV-irradiation | Oxygen concentration (%) in UV-irradiation | Remark |
|---|---|---|---|---|
| 103 | 1 | Yes | 0.1 | Invention |
| 130 | 2 | No | 21 | Invention |
| 131 | 2 | Yes | 10 | Invention |
| 132 | 2 | Yes | 5.0 | Invention |
| 133 | 2 | Yes | 1.0 | Invention |

TABLE 5

| Sample no. | Reflectivity (%) | Pencil hardness | Steel wool resistance | Remark |
|---|---|---|---|---|
| 103 | 0.32 | 3H | B/A | Invention |
| 130 | 0.32 | 2H | C/B | Invention |
| 131 | 0.32 | 3H | B | Invention |
| 132 | 0.32 | 3H/4H | A | Invention |
| 133 | 0.32 | 3H/4H | A | Invention |

Example 4

The fluoropolymers employed in the low-refractive index layers in EXAMPLES 1 to 3 were replaced by fluorocopolymers P-1 and P-2 described in JP-A-2004-45462 (replacement at equivalent mass) and the obtained samples were evaluated in the same manner. As a result, obtained effects were comparable to those in EXAMPLES 1 to 3.

Example 5

The low-refractive index layers in EXAMPLES 1 to 4 were replaced by the following low-refractive index layers A and B and the obtained samples were evaluated. As a result, it was confirmed that the advantages of the present invention were similarly obtained thereby.

By using hollow silica microparticles, antireflective films having low refractive index and improved scratch resistance could be obtained.

(Preparation of Sol Solution a)

120 parts by mass of methyl ethyl ketone, 100 parts by mass of acryloxypropyltrimethoxysilane (KBM-5103, manufactured by SHIN-ETSU CHEMICAL Co., Ltd.) and 3 parts by mass of diisopropoxyaluminum ethyl acetoacetate (CHELOPE EP-12 manufactured by Hope Chemical Co., Ltd.) were introduced into a reactor provided with a stirrer and a reflux condenser and stirred. Next, 30 parts by mass of ion-exchanged water was added. After reacting at 60° C. for 4 hours, the reaction mixture was cooled to room temperature to give a sol solution a. It had a mass average molecular weight of 1600 and components of from 1000 to 20000 in molecular weight amounted to 100% of the oligomer components and higher. When analyzed by gas chromatography, it was found out that no starting acryloxypropyltrimethoxysilane remained therein. The solid content was adjusted to 29% with methyl ethyl ketone to give a sol solution a.

(Preparation of Hollow Silica Microparticle Dispersion (Dispersion A-1))

To 500 parts of a hollow silica microparticle sol (particle size about 40 to 50 nm, shell thickness 6 to 8 nm, refractive index 1.31, solid concentration 20%, main solvent isopropyl alcohol, prepared in accordance with Preparation Example 4 in JP-A-2002-79616 but altering particle size), 30 parts of acryloxypropyltrimethoxysilane (KBM-5103, manufactured by SHIN-ETSU CHEMICAL Co., Ltd.) and 1.5 parts by mass of diisopropoxyaluminum ethyl acetoacetate (CHELOPE EP-12 manufactured by Hope Chemical Co., Ltd.) were added and mixed. Then 9 parts of ion-exchanged water was added thereto. After reacting at 60° C. for 8 hours, the mixture was cooled to room temperature. Next, 1.8 parts of acetylacetone was added thereto to give a hollow silica dispersion. The hollow silica dispersion thus obtained had a solid content of 18% by mass and, after drying, a refractive index of 1.31.

(Preparation of Coating Solution A for Low-Refractive Index Layer)

To 100 parts by mass of methyl ethyl ketone, 44.0 parts by mass of fluorine-containing copolymer P-3 (weight-average molecular weight: about 50000) described in JP-A-2004-45462, 6.0 parts by mass of a mixture of dipentaerythritol pentaacrylate with dipentaerythritol hexaacrylate "DPHA" (manufactured by NIPPON KAYAKU Co., Ltd.), 3.0 parts by mass of terminal methacrylate-containing silicone RMS-033 (manufactured by Gelest) and 3.0 parts by mass of compound 1 were added and dissolved. Then 195 parts by mass (corresponding to 39.0 parts by mass of silica+surface-treating agent on the solid basis) of dispersion (A-1) and 17.2 parts by mass (corresponding to 5.0 parts by mass on the solid basis) of sol solution a were added thereto. The resulting mixture was diluted with cyclohexanone and methyl ethyl ketone so that the solid content of the whole coating solution amounted to 6% by mass and the ratio of cyclohexane to methyl ethyl ketone amounted to 10:90, thereby giving a coating solution (coating solution A).

(Preparation of Coating Solution B for Low-Refractive Index Layer)

To 200 parts by mass of methyl ethyl ketone, 93.0 parts by mass of fluorine-containing copolymer P-3 (weight-average molecular weight: about 50000) described in JP-A-2004-45462, 3.0 parts by mass of terminal methacrylate-containing silicone RMS-033 (manufactured by Gelest) and 14.0 parts by mass of compound 1 were added and dissolved. The resulting mixture was diluted with cyclohexanone and methyl ethyl ketone so that the solid content of the whole coating solution amounted to 6% by mass and the ratio of cyclohexane to methyl ethyl ketone amounted to 10:90, thereby giving a coating solution (coating solution B).

Example 6

The low-refractive index layers in EXAMPLES 1 to 5 were replaced by the following low-refractive index layer C followed by evaluation. As a result, the advantages of the present invention were similarly obtained. Also, similar advantages were established by using a low-refractive index layer wherein OPSTAR JN7228A had been replaced by the same weight of JTA113 (manufactured by JSR) having an elevated degree of crosslinking.

(Preparation of Sol Solution a')

120 parts by mass of methyl ethyl ketone, 100 parts by mass of acryloxypropyltrimethoxysilane (KBM-5103, manufactured by SHIN-ETSU CHEMICAL Co., Ltd.) and 3 parts by mass of diisopropoxyaluminum ethyl acetoacetate (CHELOPE EP-12 manufactured by Hope Chemical Co., Ltd.) were introduced into a reactor provided with a stirrer and a reflux condenser and stirred. Next, 30 parts by mass of ion-exchanged water was added. After reacting at 60° C. for 4 hours, the reaction mixture was cooled to room temperature to give a sol solution a'. It had a mass average molecular weight of 1800 and components of from 1000 to 20000 in molecular weight amounted to 100% of the oligomer components and higher. When analyzed by gas chromatography, it was found out that no starting acryloxypropyltrimethoxysilane remained therein. [0197]

(Preparation of Coating Solution C for Low-Refractive Index Layer)

The following composition was fed into a mixing tank and stirred. Next, it was passed through a polypropylene filter having a pore size of 1 μm to give a coating solution C for low-refractive index layer.

To 783.3 parts by mass (corresponding to 47.0 parts by mass on the solid basis) of OPSTAR JN7228A (heat-crosslinkable fluorinated silicone polymer composition solution (solid content: 6%): manufactured by JSR), 195 parts by mass (corresponding to 39.0 parts by mass of silica+surface-treating agent on the solid basis) of dispersion A-1, 30.0 parts by mass (corresponding to 9.0 parts by mass on the solid basis) of a colloidal silica dispersion (Silica, MEK-ST having different particle diameter, average particle diameter: 45 nm, solid content: 30%, manufactured by NISSAN CHEMICAL INDUSTRIES, Ltd.) and 17.2 parts by mass (corresponding to 5.0 parts by mass on the solid basis) of sol solution a' were added. The resulting mixture was diluted with cyclohexanone and methyl ethyl ketone so that the solid content of the whole coating solution amounted to 6% by mass and the ratio of cyclohexane to methyl ethyl ketone amounted to 10:90, thereby giving a coating solution (coating solution C).

The compounds employed above are as follows.

KBM-5103: a silane coupling agent (manufactured by SHIN-ETSU CHEMICAL Co., Ltd.).

DPHA: a mixture of dipentaerythritol pentaacrylate with dipentaerythritol hexaacrylate (manufactured by NIPPON KAYAKU Co., Ltd.).

RMS-033: reactive silicone (manufactured by Gelest).

Then the coating solution C for low-refractive index layer as described above was applied by using a microgravure roll (diameter: 50 mm) having a gravure pattern of a line density of 200 lines/in. and a depth of 30 μm and a doctor blade at a transport speed of 10 m/min. After drying at 120° C. for 150 seconds and then at 140° C. for 12 minutes, the coating layer was irradiated under nitrogen-purge with ultraviolet light at 450 mJ/cm$^2$ by using an air-cool metal halide lamp (240 W/cm, manufactured by EYEGRAPHICS Co., Ltd.) at an illuminance of 200 mW/cm$^2$. Thus a low-refractive index layer was formed followed by winding. The rotation speed of the gravure roll was controlled so as to give a low-refractive index layer thickness of 100 nm after drying.

Example 7

(Production of Protective Film for Polarizing Plate)

A 1.5 mol/l aqueous solution of sodium hydroxide was prepared and maintained at 55° C. to give a saporifying solution.

Further, a 0.005 mol/l dilute aqueous solution of sulfuric acid was prepared.

In each of the antireflective films according to the invention produced in EXAMPLES 1 to 6, the surface of the transparent substrate in the side opposite to the side having the low-refractive index layer of the invention was saponified by using the saponifying solution.

The aqueous sodium hydroxide solution on the saponified surface of the transparent substrate was sufficiently washed successively with water, the dilute aqueous solution of sulfuric acid and the dilute aqueous solution of sulfuric acid again. Next, it was sufficiently dried at 100° C.

The contact angle to water of the saponified surface of the transparent substrate in the side opposite to the side having the low-refractive index layer was 40° or less. Thus, protective films for polarizing plates were produced.

(Construction of Polarizing Plate)

A polyvinyl alcohol film (manufactured by KURARAY) having a film thickness of 75 μm was dipped in an aqueous solution comprising 1000 parts by mass of water, 7 parts by mass of iodine and 105 parts by mass of potassium iodide for 5 minutes to thereby allow the film to adsorb iodine.

Next, this film was uniaxially stretched 4.4-fold lengthwise in a 4% by mass aqueous boric acid solution. Then it was dried in the stretched state to give a polarizing membrane.

Using a polyvinyl alcohol-based adhesive, the saponified triacetylcellulose face of the antireflective film of the invention (protective film for polarizing plate) was bonded to one face of the polarizing membrane. Further, a triacetylcelluose film having been saponified in the same manner was bonded to the other face of the polarizing membrane by using the same polyvinyl alcohol-based adhesive.

(Evaluation of Image Display Unit)

Liquid crystal display units of transmission, reflection and semi-transmission types of TN, STN, IPS, VA and OCB modes, each being provided with the polarizing plate of the invention thus constructed as the outermost surface of the display, were excellent in antireflection performance and showed highly favorable visibility. These advantages were particularly noticeable in the VA mode.

Example 8

(Construction of Polarizing Plate)

In an optically compensatory film having an optically compensatory layer (WIDE VIEW FILM SA-12B, manufactured by FUJI PHOTOFILM CO., LTD.), the surface opposite to the side having the optically compensatory layer was saponified under the same conditions as in EXAMPLE 7.

Using a polyvinyl alcohol-based adhesive, the saponified triacetylcellulose face of each of the antireflective films of the invention (protective films for polarizing plate) produced in EXAMPLES 1 to 7 was bonded to one face of the polarizing membrane produced in EXAMPLE 7. Further, a triacetylcellulose film of the optically compensatory film having been saponified was bonded to the other face of the polarizing membrane by using the same polyvinyl alcohol-based adhesive.

(Evaluation of Image Display Unit)

Liquid crystal display units of transmission, reflection and semi-transmission types of TN, STN, IPS, VA and OCB modes, each being provided with the polarizing plate of the invention thus constructed as the outermost surface of the display, were excellent in contrast in a light place, had very wide viewing angle in all directions, showed excellent antireflection performance and had highly favorable visibility and visual qualities, compared with liquid crystal display units having no optically compensatory film. These advantages were particularly noticeable in the VA mode.

Example 9

In the method of producing the antireflective film as described in EXAMPLE 1, the formulation of the coating solution for low-refractive index layer was replaced by DY-91 as will be described hereinafter and the solution was applied by using the following die coater at a coating speed of 25 ml/min. After drying at 90° C. for 30 sec, the coating layer was cured by irradiating, under nitrogen-purge to achieve an atmosphere with an oxygen concentration of 0.1% by volume or less, with ultraviolet light at 400 mJ/cm$^2$ by using an air-cool metal halide lamp (240 W/cm, 600 mW/cm$^2$). Thus a low-refractive index layer (refractive index: 1.45, membrane thickness: 83 nm) was formed.

Further, antireflective films (9-2) to (9-3) were produced by replacing the coating solution for low-refractive index layer by DY-92 to 93 as will be described hereinbelow.

(Constitution of Die Coater)

As the die coater, use was made of the one in which the slot die 13 had an upstream lip land length $I_{UP}$ of 0.5 mm, a downstream lip land length $I_{LO}$ of 50 μm, the opening length of the slot 16 in the web-traveling direction of 150 μm, and a slot 16 length of 50 mm. The gap between the upstream lip land 18a and the web 12 was larger by at least 50 μm (hereinafter, called "overbite length of 50 μm") than the gap between the downstream lip land 18b and the web 12, while the gap $G_L$ between the downstream lip land 18b and the web 12 was adjusted to 50 μm. The gap $G_S$ between the side plate 40b of the vacuum chamber 40 and the web 12 and the gap $G_B$ between the back plate 40a and the web 12 were both adjusted to 200 μm.

(Preparation of Coating Solution (DY-91) for Low-refractive Index Layer)

To 152.4 parts by mass of a solution prepared by dissolving the following fluorocopolymer in methyl ethyl ketone to give a concentration of 23.7% by mass, 1.1 parts by mass of a terminal methacrylate-containing silicone resin X-22-164C (manufactured by SHIN-ETSU CHEMICAL Co., Ltd.), 1.8 parts by mass of a fluorinated photopolymerization initiator (compound 1), 815.9 parts by mass of methyl ethyl ketone and 28.8 parts by mass of cyclohexanone were added and stirred. The mixture was passed through a PTFE filter having a pore size of 0.45 μm to give a coating solution (DY-91) for low-refractive index layer. The viscosity of this coating solution was 0.48 [mPa·sec], while the surface tension thereof was 24 [mN/m]. The coating solution was applied to a transparent substrate at a ratio of 2.8 [ml/m$^2$].

Fluorocopolymer:

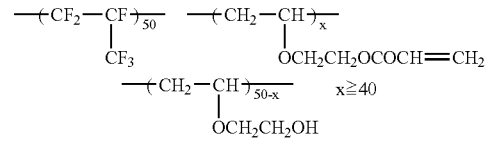

(Preparation of Coating Solution (DY-92) for Low-Refractive Index Layer)

To 426.64 parts by mass of a solution prepared by dissolving the above fluorocopolymer in methyl ethyl ketone to give a concentration of 23.7% by mass, 3.0 parts by mass of a terminal methacrylate-containing silicone resin X-22-164C (manufactured by SHIN-ETSU CHEMICAL Co., Ltd.), 5.1 parts by mass of a fluorinated photopolymerization initiator (compound 1), 538.6 parts by mass of methyl ethyl ketone and 26.7 parts by mass of cyclohexanone were added and stirred. The mixture was passed through a PTFE filter having a pore size of 0.45 μm to give a coating solution (DY-92) for low-refractive index layer. The viscosity of this coating solution was 0.79 [mPa·sec], while the surface tension thereof was 24 [mN/m]. The coating solution was applied to a transparent substrate at a ratio of 2.2 [ml/m$^2$].

(Preparation of Coating Solution (DY-93) for Low-Refractive Index Layer)

To 213.3 parts by mass of a solution prepared by dissolving the above fluorocopolymer in methyl ethyl ketone to give a concentration of 23.7% by mass, 1.5 parts by mass of a terminal methacrylate-containing silicone resin X-22-164C (manufactured by SHIN-ETSU CHEMICAL Co., Ltd.), 2.5 parts by mass of a fluorinated photopolymerization initiator (compound 1), 2.5 parts by mass of compound B in the above Table 1, 754.3 parts by mass of methyl ethyl ketone and 28.4 parts by mass of cyclohexanone were added and stirred. The mixture was passed through a PTFE filter having a pore size of 0.45 μm to give a coating solution (DY-93) for low-refractive index layer. The viscosity of this coating solution was 0.82 [mPa·sec], while the surface tension thereof was 24 [mN/m]. The coating solution was applied to a transparent substrate at a ratio of 2.0 [ml/m$^2$].

Facial figures of the samples produced by using the coating solutions DY-91 to DY-93 for low-refractive index layer were evaluated. Table 6 shows the results. Favorable performance was obtained in each case.

[Evaluation of Antireflective Film]

The obtained antireflective films were evaluated in face figure. Further, the average reflectivities were measured as in EXAMPLE 1.

(Facial Figure)

After forming all of layers, the back face of each film was painted with a black oily ink and the evenness in density was evaluated with the naked eye.

A: No obvious difference in density observed.

B: Obvious difference in density observed.

By using the antireflective films (9-1), (9-2) and (9-3) thus obtained, display unites were constructed in the same manner as in EXAMPLES 7 and 8. As a result, the obtained units constructed by using a gravure coater were superior in color evenness and display qualities to the display units of EXAMPLES 7 and 8.

TABLE 6

| Antireflective film | Coating solution for low refractive index layer | Viscosity (mPa · sec) | Coating amount (ml/m²) | Applicability of coating solution | Face figure of antireflective film | Reflectivity (%) |
|---|---|---|---|---|---|---|
| 9-1 | DY-91 | 0.48 | 2.8 | Yes | A | 0.32 |
| 9-2 | DY-92 | 0.79 | 2.2 | Yes | A | 0.32 |
| 9-3 | DY-93 | 0.82 | 2.0 | Yes | A | 0.32 |

Example 10

[Preparation of Coating Solutions for Forming Individual Layers]

[Preparation of Sol Solution (a-1)]

Into a 1000 mL reactor provided with a thermometer, a nitrogen inlet tube and a dropping funnel, 187 g (0.80 mol) of 3-acryloxypropyltrimethoxysilane, 27.2 g (0.20 mol) of methyltrimethoxysilane, 320 g (10 mol) of methanol and 0.06 g (0.001 mol) of potassium fluoride (KF) were introduced. Then, 15.1 g (0.86 mol) of water was slowly dropped thereinto under stirring at room temperature. After the completion of the dropping, the mixture was stirred at room temperature for 3 hours and heated under methanol-reflux for 2 hours. Next, low-boiling components were distilled off under reduced pressure and the residue was filtered to thereby give 120 g of a sol solution (a-1).

When analyzed by GPC, the obtained product had a mass-average molecular weight of 15000 and components of from 1000 to 20000 in molecular weight amounted to 30% by mass of the oligomer components and higher. By analyzing $^1$H-NMR, it was found out that the product had a structure represented by the following formula.

$$\text{CH}_2=\text{CH}-\text{C}(=\text{O})-\text{O}-(\text{CH}_2)_3-\left[\text{Si}(\text{OCH}_3)_2-\text{O}\right]_{80}-\left[\text{Si}(\text{CH}_3)(\text{OCH}_3)-\text{O}\right]_{20}-\text{CH}_3$$

(80:20 stands for a molar ratio.)

The condensation ratio α determined by $^{29}$Si-NMR was 0.56. This analytical value indicated that the obtained silane coupling agent was mainly composed of the linear structure moieties. When analyzed by gas chromatography, it was found out that not more than 5% by mass of the starting acryloxypropyltrimethoxysilane remained therein.

[Preparation of Sol Solution (b-1)]

119 parts by mass of methyl ethyl ketone, 101 parts by mass of 3-acryloxypropyltrimethoxysilane (KBM-5103, manufactured by SHIN-ETSU CHEMICAL Co., Ltd.) and 3 parts by mass of diisopropoxyaluminum ethyl acetoacetate were introduced into a reactor provided with a stirrer and a reflux condenser and mixed. Next, 30 parts by mass of ion-exchanged water was added. After reacting at 60° C. for 4 hours, the reaction mixture was cooled to room temperature to give a sol solution (b-1).

The mass-average molecular weight of sol solution (b-1) was 1600 and components of from 1000 to 20000 in molecular weight amounted to 100% of the oligomer components and higher. When analyzed by gas chromatography, it was found out that no starting acryloxypropyltrimethoxysilane remained therein.

[Preparation of Coating Solution for Hard Coat Layer]

TABLE 7

| | | HC-1 | HC-2 | HC-3 | HC-4 | HC-5 | HC-6 | HC-7 |
|---|---|---|---|---|---|---|---|---|
| Binder | DPHA | 4.45 | 4.45 | | | | | |
| | PETA | 40.1 | 40.1 | | 50 | 50 | 50 | 50 |
| | DESOLITE Z7526 (containing silica) | | | 347 | | | | |
| Particle | MEK-ST (silica particles)(30 mass %) | | 101 | | | | | |
| | SX-350 crosslinked polystyrene particles (30 mass %) | | | | 1.7 | 1.7 | 1.7 | 1.7 |
| | Crosslinked acryl/styrene particles (30 mass %) | | | | 13.3 | 13.3 | 13.3 | 13.3 |
| Initiator | IRGACURE 184 | 1.34 | 1.34 | | 2 | 2 | 2 | 2 |
| | IRGACURE 907 | 0.24 | 0.24 | | | 0.36 | 0.36 | 0.36 |
| | Compound 1 | | | | | | | 0.5 |
| Leveling agent | FP-132 | 0.08 | 0.08 | | 0.75 | 0.75 | | |
| | R-30 | | | | | | 0.75 | 0.75 |
| Silane coupling agent | KBM-5103 | | | | 10 | | | |
| | Sol solution (a-1) | | | | | 9.3 | 9.3 | 9.3 |
| Solvent | Methyl ethyl ketone | | | 201.5 | | | | |
| | Methyl isobutyl ketone | 38 | 38 | | | | | |
| | Cyclohexanone | 16.1 | 16.1 | 201.5 | | | | |
| | Toluene | | | | 38.5 | 38.5 | 38.5 | 38.5 |

Coating solutions for hard coat layer HC-1 to HC-7 were prepared in accordance with the above table. Numerical values in the table are expressed in mass g.

PETA: A mixture of pentaerythritol triacrylate with pentaerythritol tetraacrylate, manufactured by NIPPON KAYAKU, Co., Ltd.

DPHA: A mixture of dipentaerythritol hexaacrylate with dipentaerythritol pentaacrylate, manufactured by NIPPON KAYAKU, Co., Ltd.

"DESOLITE Z7526": A marketed UV-curing hard coat solution containing silica. Solid content: 72% by mass, silica content: 38% by mass, average particle diameter: 20 nm, manufactured by JSR.

"MEK-ST": A silica sol. Average particle diameter: 15 nm, solid content: 30% by mass, manufactured by NISSAN CHEMICAL INDUSTRIES, Ltd.

"SX-350": Crosslinked polystyrene particles having average particle diameter of 3.5 μm (refractive index 1.60). A 30% by mass dispersion in toluene. Manufactured by SOKEN KAGAKU K.K. Dispersed in a polytron dispersion device at 10,000 rpm for 20 minutes before using.

Crosslinked acryl-styrene particles: Average particle diameter: 3.5 μm (refractive index 1.55). A 30% by mass dispersion in toluene. Manufactured by SOKEN KAGAKU K.K.

Individual solutions, in which the above components had been sufficiently mixed, were passed through a polypropylene filter having a pore size of 30 μm to thereby give coating solutions for hard coat layer HC-1 to HC-7.

(Formation of Hard Coat Layer)

By using a slot die coater shown in FIG. 1 in JP-A-2003-211052, a triacetylcellulose film of 80 μm in thickness (FUJI-TAC TD80UF, manufactured by FUJI PHOTOFILM Co., Ltd.) was unwound in a roll and the coating solutions for hard coat layer HC-1 to HC-7 were each applied to give a coating amount of 16 cm$^3$/m$^2$. After drying at 30° C. for 15 sec and at 90° C. for 20 sec, the coating layer was cured by irradiating under nitrogen-purge with ultraviolet light at 50 mJ/cm$^2$ by using an air-cool metal halide lamp (160 W/cm, manufactured by EYEGRAPHICS Co., Ltd.). Thus optical films respectively having hard coat layers of 2.5 to 6.0 μm in thickness were produced and wound.

[Preparation of Coating Solution for Low-Refractive Index Layer]

Coating solutions for low-refractive index layer LN-1 to LN-8 were prepared in accordance with the following table. In this table, numerical values are expressed in parts by mass.

TABLE 8

|  |  | LN-1 | LN-2 | LN-3 | LN-4 | LN-5 | LN-6 | LN-7 | LN-8 |
| --- | --- | --- | --- | --- | --- | --- | --- | --- | --- |
| Fluorinated binder | P-3 | 7.51 | 7.51 | 7.51 |  |  |  |  |  |
|  | JTA-113 |  |  |  |  |  | 55.72 | 55.72 | 55.72 |
|  | F-3035 |  |  |  | 0.11 | 0.11 |  |  |  |
| Binder | Sol (b-1) | 0.95 | 0.95 | 0.95 | 2.06 | 2.06 | 1.92 | 1.92 | 1.92 |
|  | DPHA |  |  |  | 1.86 | 1.86 |  |  |  |
| Particle | MEK-ST-L | 6.12 | 6.12 | 6.12 |  |  | 5.57 | 5.57 | 5.57 |
|  | Hollow silica dispersion (20%) |  |  |  | 21 | 21 |  |  |  |
| Initiator | Solution of compound 1 (2%) |  | 0.05 | 0.05 |  | 0.07 |  |  | 2.46 |
|  | Irg-907 solution (2%) | 0.14 | 0.09 |  | 0.14 | 0.07 | 2.46 | 2.46 |  |
|  | MP triazine solution (2%) |  |  | 0.09 |  |  |  |  |  |
| Additive | RMS-033 | 2.75 | 2.75 | 2.75 |  |  |  |  |  |
|  | X-22-164C |  |  |  | 0.11 | 0.11 |  |  |  |
| Solvent | Methyl ethyl ketone | 75.1 | 75.1 | 75.1 | 72.27 | 72.27 | 31.5 | 31.5 | 31.5 |
|  | Cyclohexanone | 7.51 | 7.51 | 7.51 | 2.45 | 2.45 | 2.83 | 2.83 | 2.83 |
|  | Total | 100 | 100 | 100 | 100 | 100 | 100 | 100 | 100 |

IRGACURE 184: A polymerization initiator [manufactured by CIBA-SPECIALTY CHEMICALS].

IRGACURE 907: A polymerization initiator [manufactured by CIBA-SPECIALTY CHEMICALS].

"FP-132": A fluorinated surface-modifying agent represented by the following structural formula:

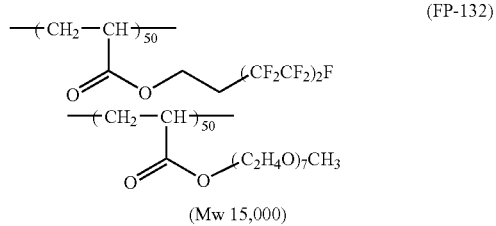

(FP-132)
(Mw 15,000)

Fluorinated leveling agent R-30 manufactured by DAINIPPON INK & CHEMICALS, Inc. (marketed).

"KBM-5103": A silane coupling agent, 3-acryloyloxyprpyltrimethoxysilane, manufactured by SHIN-ETSU CHEMICAL Co., Ltd.

Individual coating solutions as listed above were passed through a polypropylene filter having a pore size of 1 μm to give coating solutions for low-refractive index layer (LN-1 to 8).

The compounds employed in preparing these coating solutions are as follows.

"P-3": A fluoropolymer (P-3) described in JP-A-2004-45462. Mass-average molecular weight: about 50,000, solid content: 23.8% by mass, solvent: methyl ethyl ketone.

"JTA-113": A solution of a heat-crosslinkable, silicone site-containing fluoropolymer. Refractive index: 1.44, solid content: 6% by mass, solvent: methyl ethyl ketone. Solid matters comprising 78% by mass of the heat-crosslinkable, silicone site-containing fluoropolymer, 20% by mass of a melamine-based crosslinking agent and 2% by mass of p-toluenesulfonic acid salt. Manufactured by JSR.

Fluorine-containing compound "F3035" (trade name, manufactured by NOF Co.).

"MEK-ST": A silica particle dispersion. Average particle diameter: 15 nm, solid content: 30% by mass, dispersion medium: methyl ethyl ketone, manufactured by NISSAN CHEMICAL INDUSTRIES, Ltd.

"MEK-ST-L": A silica particle dispersion. Average particle diameter: 45 nm, solid content: 30% by mass, dispersion medium: methyl ethyl ketone, manufactured by NISSAN CHEMICAL INDUSTRIES, Ltd.

"Solution of compound 1": Solid content: 2% by mass, solvent: methyl ethyl ketone.

"MP-Triazine": A photopolymerization initiator, manufactured by SANWA CHEMICAL).

"RMS-033": A reactive silicone resin, manufactured by Gelest.

(Formation of Low-Refractive Index Layer-1)

After forming various hard coat layers according to the invention, the coating solutions for low-refractive index layer LN-1 to LN-5 as described above were each applied by wet-coating with the use of a die coater to give a dry membrane thickness of the low-refractive index layer of 95 nm. After drying at 120° C. for 70 seconds, the coating layer was irradiated, under nitrogen-purge so as to give an atmosphere having an oxygen concentration of 100 ppm, with ultraviolet light at 400 mJ/cm$^2$ by using an air-cool metal halide lamp (240 W/cm, manufactured by EYEGRAPHICS Co., Ltd.). Thus a low-refractive index layer was formed followed by winding.

(Formation of Low-Refractive Index Layer-2)

After forming various hard coat layers according to the invention, the coating solutions for low-refractive index layer LN-6 to LN-8 as described above were each applied by wet-coating with the use of a bar coater to give a dry membrane thickness of the low-refractive index layer of 95 nm. After drying at 120° C. for 150 seconds and then at 100° C. for 8 minutes, the coating layer was irradiated, under nitrogen-purge so as to give an atmosphere having an oxygen concentration of 100 ppm, with ultraviolet light at 110 mJ/cm$^2$ by using an air-cool metal halide lamp (240 W/cm, manufactured by EYEGRAPHICS Co., Ltd.). Thus a low-refractive index layer was formed followed by winding.

The obtained films were evaluated in the same manner as described above. Table 9 summarizes the results.

TABLE 9

| | Hard coat layer | Low refractive index layer | Average reflectivity (%) | Pencil hardness | Steel wool resistance |
|---|---|---|---|---|---|
| C. Ex. 10-1 | HC-1 | LN-1 | 0.32 | 2H | D/C |
| C. Ex. 10-2 | HC-2 | " | " | 3H | C |
| C. Ex. 10-3 | HC-3 | " | " | 3H | D |
| C. Ex. 10-4 | HC-4 | " | " | 3H | D |
| C. Ex. 10-5 | HC-5 | " | " | 3H | D/C |
| C. Ex. 10-6 | HC-6 | " | " | 3H | D/C |
| Ex. 10-1 | HC-7 | " | " | 3H | B |
| Ex. 10-2 | HC-1 | LN-2 | " | 3H | B |
| Ex. 10-3 | HC-2 | " | " | 2H | A |
| Ex. 10-4 | HC-3 | " | " | 2H | B |
| Ex. 10-5 | HC-4 | " | " | 3H | B |
| Ex. 10-6 | HC-5 | " | " | 3H | A |
| Ex. 10-7 | HC-6 | " | " | 3H | A |
| Ex. 10-8 | HC-7 | " | " | 3H | A |
| Ex. 10-9 | HC-6 | LN-3 | " | 3H | A |
| C. Ex. 10-7 | " | LN-4 | " | 3H | D/C |
| Ex. 10-10 | " | LN-5 | " | 3H | A |
| C. Ex. 10-8 | " | LN-6 | " | 3H | D/C |
| C. Ex. 10-9 | " | LN-7 | " | 3H | D/C |
| Ex. 10-11 | " | LN-8 | " | 3H | A |

Thus, it can be understood that the antireflective films with the use of the fluorinated photopolymerization initiator compounds according to the invention showed excellent scratch resistance while sustaining sufficient antireflection performance.

Example 11

Example of the Production of Optical Film

The coating solutions for hard coat layer (HCL-1) to (HCL-4) and coating solutions for overcoat layer (OCL-1) to (OCL-4) as listed in Tables 10 and 11 were prepared.

TABLE 10

| | | | Coating solution for hard coat layer | | | |
|---|---|---|---|---|---|---|
| | | | HCL-1 | HCL-2 | HCL-3 | HCL-4 |
| Polymerizable compound | MANDA | % | 96.0 | | | |
| | PETA | % | | 96.0 | 19.0 | 21.6 |
| | DPHA | % | | | 19.0 | 9.3 |
| | M-215 | % | | | 58.0 | |
| Binder | Acryl polymer | % | | | | 2.6 |
| | Styrene/acryl polymer | % | | | | 0.7 |
| Polymerization initiator | IRG-184 | % | 3.0 | 3.0 | 3.0 | 2.0 |
| | IRG-369 | % | 1.0 | 1.0 | 1.0 | 1.0 |
| | Silicone (FZ-2191) | % | | | | 0.014 |
| | Solid content | % | 35.0 | 35.0 | 35.0 | 35.0 |
| | Solvent composition (MIBK/IPA/MEK) | % | 90/10/0 | 90/10/0 | 90/10/0 | |
| | Solvent composition (toluene/cyclohexanone | % | | | | 80/20 |

TABLE 11

Coating solution for overcoat layer

| | | | OCL-1 | OCL-2 | OCL-3 | OCL-4 |
|---|---|---|---|---|---|---|
| Polymerizable compound | MANDA | % | 96.0 | 96.0 | | |
| | PETA | % | | | 48.0 | 48.0 |
| | DPHA | % | | | 48.0 | 48.0 |
| Polymerization initiator | IRG-184 | % | 1.0 | 1.0 | 1.0 | 1.0 |
| | IRG-369 | % | 3.0 | 3.0 | 3.0 | 3.0 |
| | Solution of compound 1 (2%) | % | | 1.0 | | 1.0 |
| | Solid content | % | 28.0 | 28.0 | 28.0 | 28.0 |
| | Solvent composition (MIBK/IPA/MEK) | % | 80/15/5 | 80/15/5 | 80/15/5 | 80/15/5 |

In the above table, the components are expressed in percentage by mass. Details of the compounds employed are as follows.

MANDA: (Bifunctional acrylate, KAYARD MANDA, manufactured by NIPPON KAYAKU Co., Ltd., molecular weight: 312).

PENTA: (A mixture of pentaerythritol triacrylate with pentaerythritol tetraacrylate, manufactured by NIPPON KAYAKU Co., Ltd., average molecular weight: ca. 300).

DPHA: (A mixture of dipentaerythritol pentaacrylate with dipentaerythritol hexaacrylate, manufactured by NIPPON KAYAKU Co., Ltd., average molecular weight: 540).

M-215: (Isocyanuric acid EO-modified diacrylate, manufactured by TOAGOSEI Co., Ltd., molecular weight: 369).

IRG184: (A photopolymerization initiator, IRGACURE 184, manufactured by Ciba-Geigy, JAPAN).

IRG369: (A photopolymerization initiator, IRGACURE 369, manufactured by Ciba-Geigy, JAPAN).

IFZ-2191: Polyether-denatured silicone (manufactured by TORAY-DOW CORNING.

Next, the following optical films were constructed by using the coating solutions for hard coat layer and overcoat layer obtained above.

(Construction of Optical Film (11-1))

On a triacetylcellulose film of 80 μm in thickness and 1340 mm in width (FUJITAC TD80UF, manufactured by FUJI PHOTOFILM Co., Ltd.), the coating solution for hard coat layer (HCL-1) was applied by the microgravure method at a transport speed of 30 m/min. After drying at 60° C. for 150 sec, the coating layer was cured by irradiating under nitrogen-purge (oxygen concentration: 0.05% or less) with ultraviolet light at 20 mJ/cm$^2$ by using an air-cool metal halide lamp (160 W/cm, luminance: 400 mW/cm$^2$, manufactured by EYE-GRAPHICS Co., Ltd.). Thus a hard coat layer of 5.0 μm in thickness was formed.

On the hard coat layer thus formed, the above-described coating solution for overcoat layer (OCL-1) was applied by the die coater method at a transport speed of 30 m/min while controlling so as to give a membrane thickness after curing of 3.0 μm. After drying at 60° C. for 150 sec, the coating layer was cured by irradiating under nitrogen-purge (oxygen concentration: 0.1% or less) with ultraviolet light at 240 mJ/cm$^2$ by using an air-cool metal halide lamp (160 W/cm, luminance: 400 mW/cm$^2$, manufactured by EYEGRAPHICS Co., Ltd.). Thus, a sample 11-1 was obtained.

The following Table 12 shows samples 11-2 to 11-12 having been treated under the same conditions as in Table 1.

TABLE 12

| Sample no. | Coating solution for hard coat layer | Coating solution for over coat layer | Initiator (compound 1) | Oxygen level in UV-irradiation | Remark |
|---|---|---|---|---|---|
| 11-1 | HLC-1 | OCL-1 | No | 0.1 | Comparison |
| 11-2 | " | " | " | 0.08 | Comparison |
| 11-3 | " | " | " | 1 | Comparison |
| 11-4 | " | OCL-2 | Yes | 0.1 | Invention |
| 11-5 | " | " | " | 0.08 | Invention |
| 11-6 | " | " | " | 1 | Invention |
| 11-7 | HCL-2 | " | " | 1 | Invention |
| 11-8 | HCL-3 | " | " | 1 | Invention |
| 11-9 | HCL-4 | OCL-1 | No | 1 | Comparison |
| 11-10 | " | OCL-2 | Yes | 1 | Invention |
| 11-11 | " | OCL-3 | No | 1 | Comparison |
| 11-12 | " | OCL-4 | Yes | 1 | Invention |

The samples 11-1 to 11-12 thus obtained were evaluated as in Table 2 as described above. Table 13 summarizes the results.

TABLE 13

| Sample no. | Reflectivity (%) | Pencil Hardness | Steel wool resistance | Remark |
|---|---|---|---|---|
| 11-1 | 0.32 | 2H | C | Comparison |
| 11-2 | 0.32 | 3H | B | Comparison |
| 11-3 | 0.32 | 2H | D | Comparison |
| 11-4 | 0.32 | 3H/4H | A | Invention |
| 11-5 | 0.32 | 3H/4H | A | Invention |
| 11-6 | 0.32 | 3H/4H | A | Invention |
| 11-7 | 0.32 | 3H/4H | A | Invention |
| 11-8 | 0.32 | 3H/4H | A | Invention |
| 11-9 | 0.32 | 3H/4H | D | Comparison |
| 11-10 | 0.32 | 2H/3H | A | Invention |
| 11-11 | 0.32 | 3H/4H | D | Comparison |
| 11-12 | 0.32 | 3H/4H | A | Invention |

Thus, it is understood that the optical films at the level of sing the fluorinated photopolymerization initiator compound could be efficiently cured even at a high oxygen concentration and showed excellent scratch resistance.

This application is based on Japanese Patent application JP 2005-161569, filed Jun. 1, 2005, the entire content of which is hereby incorporated by reference, the same as if set forth at length.

What is claimed is:

1. An antireflective film comprising a support and at least one layer including an antireflective layer, wherein at least one of the at least one layer is a layer formed by curing by ionizing radiation a composition which contains a fluorinated photopolymerization initiator and an ionizing radiation-curing compound, wherein the composition further contains a nonfluorinated photopolymerization initiator, wherein the fluorinated photopolymerization initiator is represented by any one of the following formulae (1) to (5):

Formula (1):

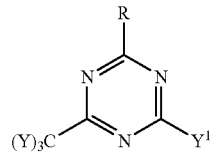

wherein Y represents a halogen atom; $Y^1$ represents $-CY_3$, $-NH_2$, $-NHR'$, $-NR_2$ or $-OR'$ in which R' represents an alkyl group, a fluoroalkyl group or an aryl group; and R represents $R_a-Y_1-$, $R_a-Y_1-(CH_2)_r-R_a-(CH_2)_r-Y_1-$, $R_a-Y_1-(CH_2)_s-O-$, $R_a-Y_1-(CH_2)_s-S-$, $R_a-Y_1-(CH_2)_s-NR_1-$, $-CY_3$, an alkyl group, a substituted alkyl group, a fluoroalkyl group, a substituted fluoroalkyl group, an aryl group, a substituted aryl group or a substituted alkenyl group, in which $R_1$ represents a hydrogen atom, a methyl group or an ethyl group; r represents an integer of from 1 to 10; s represents an integer of from 2 to 10; $Y_1$'s each independently represent a divalent group selected from the group consisting of $-O-$, $-S-$, $-O-C(=O)-$ and $-O-Si(R_2)_2-(CH_2)_r-$; $R_2$ represents an alkyl group having from 1 to 12 carbon atoms or a phenyl group; and $R_a$ represents a linear or branched terminal chain: $Z^1CF_2(-O-C_2F_4)_p-(CF_2)_q-$ in which $Z^1$ represents H or F; and one of p and q represents an integer of from 0 to 20 while the other represents an integer of from 1 to 20;

Formula (2):

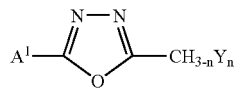

wherein $A^1$ represents a phenyl group, a naphthyl group, a substituted phenyl group or a substituted naphthyl group, $R_a-Y_1-$, $R_a-Y_1-(CH_2)_r-$, $R_a-(CH_2)_r-Y_1-$, $R_a-Y_1-(CH_2)_s-O-$, $R_a-Y_1-(CH_2)_s-S-$, $R_a-Y_1-(CH_2)_s-NR_1-$, $-CY_3$, an alkyl group, a substituted alkyl group, a fluoroalkyl group, a substituted fluoroalkyl group, an aryl group, a substituted aryl group or a substituted alkenyl group, in which $R_1$ represents a hydrogen atom, a methyl group or an ethyl group; r represents an integer of from 1 to 10; s represents an integer of from 2 to 10; $Y_1$'s each independently represent a divalent group selected from the group consisting of $-O-$, $-S-$, $-O-C(=O)-$ and $-O-Si(R_2)_2-(CH_2)_r-$; $R_2$ represents an alkyl group having from 1 to 12 carbon atoms or a phenyl group; and $R_a$ represents a linear or branched terminal chain: $Z^1CF_2(-O-C_2F_4)_p-(CF_2)_q-$ in which $Z^1$ represents H or F; and one of p and q represents an integer of from 0 to 20 while the other represents an integer of from 1 to 20, in which the substituent for the substituted phenyl group and a substituent for the substituted naphthyl group are each independently a halogen atom, an alkyl group, a fluoroalkyl group, an alkoxy group, a nitro group, a cyano group or a methylenedioxy group; Y represents a halogen atom; and n represents an integer of from 1 to 3;

Formula (3):

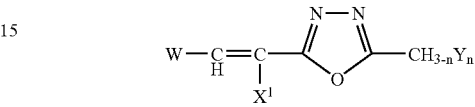

wherein W represents an unsubstituted or substituted phenyl group, an unsubstituted naphthyl group, $R_a-Y_1-$, $R_a-Y_1-(CH_2)_r-$, $R_a-(CH_2)_r-Y_1-$, $R_a-Y_1-(CH_2)_s-O-$, $R_a-Y_1-(CH_2)_s-S-$, $R_a-Y_1-(CH_2)_s-NR_1-$, $-CY_3$, an alkyl group, a substituted alkyl group, a fluoroalkyl group, a substituted fluoroalkyl group, an aryl group, a substituted aryl group or a substituted alkenyl group, in which $R_1$ represents a hydrogen atom, a methyl group or an ethyl group; r represents an integer of from 1 to 10; s represents an integer of from 2 to 10; $Y_1$'s each independently represent a divalent group selected from the group consisting of $-O-$, $-S-$, $-O-C(=O)-$ and $-O-Si(R_2)_2-(CH_2)_r-$; $R_2$ represents an alkyl group having from 1 to 12 carbon atoms or a phenyl group; and $R_a$ represents a linear or branched terminal chain; $Z^1CF_2(-O-C_2F_4)_p-(CF_2)_q-$ in which $Z^1$ represents H or F; and one of p and q represents an integer of from 0 to 20 while the other represents an integer of from 1 to 20, in which the substituent for the substituted phenyl group is a halogen atom, a nitro group, a cyano group, an alkyl group having from 1 to 3 carbon atoms or an alkoxy group having from 1 to 4 carbon atoms; in a case where a halogen atom is contained as the substituent for the substituted phenyl group, the phenyl group has one or two substituents, and in a case where a halogen atom is not contained as the substituent for the substituted phenyl group, the phenyl group has a single substituent; $X^1$ represents a hydrogen atom, a phenyl group or an alkyl group having from 1 to 3 carbon atoms; Y represents a halogen atom; and n represents an integer of from 1 to 3;

Formula (4):

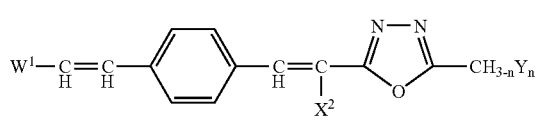

wherein $W^1$ represents an unsubstituted or substituted phenyl group, an unsubstituted naphthyl group, $R_a-Y_1-$, $R_a-Y_1-(CH_2)_r-$, $R_a-(CH_2)_r-Y_1-$, $R_a-Y_1-(CH_2)_s-O-$, $R_a-Y_1-(CH_2)_s-S-$, $R_a-Y_1-(CH_2)_s-NR_1-$, $-CY_3$, an alkyl group, a substituted alkyl group, a fluoroalkyl group, a substituted fluoroalkyl group, an aryl group, a substituted aryl group or a substituted alkenyl group, in which $R_1$ represents a hydrogen atom, a methyl group or an ethyl group; r represents an integer of from 1 to 10; s represents an integer of from 2 to 10; $Y_1$'s each independently represent a divalent group selected from the group consisting of —O—, —S—, —O—C(=O)— and —O—Si(R$_2$)$_2$—(CH$_2$)$_r$—; R$_2$ represents an alkyl group having from 1 to 12 carbon atoms or a phenyl group; and R$_a$ represents a linear or branched terminal chain: Z$^1$CF$_2$(—O—C$_2$F$_4$)$_p$—(CF$_2$)$_q$— in which Z$^1$ represents H or F; and one of p and q represents an integer of from 0 to 20 while the other represents an integer of from 1 to 20, in which the substituent for the substituted phenyl group is a halogen atom, a nitro group, a cyano group, an alkyl group having from 1 to 3 carbon atoms or an alkoxy group having from 1 to 4 carbon atoms; in a case where a halogen atom is contained as the substituent for the substituted phenyl group, the phenyl group has one or two substituents and in a case where a halogen atom is not contained as the substituent for the substituted phenyl group, the phenyl group has a single substituent; X$^2$ represents a hydrogen atom, a halogen atom, a cyano group, an alkyl group or an allyl group; Y represents a halogen atom; and n represents an integer of from 1 to 3;

Formula (5):

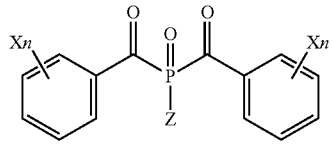

wherein Z represents an unsubstituted or substituted phenyl group, an unsubstituted naphthyl group, a fluoroalkyl group, R$_a$—Y$_1$—, R$_a$—Y$_1$—(CH$_2$)$_r$—, R$_a$—(CH$_2$)$_r$—Y$_1$—, R$_a$—Y$_1$—(CH$_2$)$_s$—O—, R$_a$—Y$_1$—(CH$_2$)$_s$—S—, R$_a$—Y$_1$—(CH$_2$)$_s$—NR$_1$—, CY$_3$, an alkyl group, a substituted alkyl group, a fluoroalkyl group, a substituted fluoroalkyl group, an aryl group, a substituted aryl group or a substituted alkenyl group, in which R$_1$ represents a hydrogen atom, a methyl group or an ethyl group; r represents an integer of from 1 to 10; s represents an integer of from 2 to 10; Y$_1$'s each independently represent a divalent group selected from the group consisting of —O—, —S—, —O—C(=O)— and —O—Si(R$_2$)$_2$—(CH$_2$)$_r$—; R$_2$ represents an alkyl group having from 1 to 12 carbon atoms or a phenyl group; and R$_a$ represents a linear or branched terminal chain: Z$^1$CF$_2$(—O—C$_2$F$_4$)$_p$—(CF$_2$)$_q$— in which Z$^1$ represents H or F; and one of p and q represents an integer of from 0 to 20 while the other represents an integer of from 1 to 20, in which the substituent for the substituted phenyl group is a halogen atom, a nitro group, a cyano group, an alkyl group having from 1 to 3 carbon atoms or an alkoxy group having from 1 to 4 carbon atoms; X's each independently represents a hydrogen atom, a halogen atom, an alkyl group, R$_a$—Y$_1$—, R$_a$—Y$_1$—(CH$_2$)$_r$—, R$_a$—(CH$_2$)$_r$—Y$_1$—, R$_a$—Y$_1$—(CH$_2$)$_s$—O—, R$_a$—Y$_1$—(CH$_2$)$_s$—S—, R$_a$—Y$_1$—(CH$_2$)$_s$—NR$_1$—, —CY$_3$, an alkyl group, a substituted alkyl group, a fluoroalkyl group, a substituted fluoroalkyl group, an aryl group, a substituted aryl group or a substituted alkenyl group, in which R$_1$ represents a hydrogen atom, a methyl group or an ethyl group; r represents an integer of from 1 to 10; s represents an integer of from 2 to 10; Y$_1$'s each independently represent a divalent group selected from the group consisting of —O—, —S—, —O—C(=O)— and —O—Si(R$_2$)$_2$—(CH$_2$)$_r$—; R$_2$ represents an alkyl group having from 1 to 12 carbon atoms or a phenyl group; and R$_a$ represents a linear or branched terminal chain: Z$^1$CF$_2$(—O—C$_2$F$_4$)$_p$—(CF$_2$)$_q$— in which Z$^1$ represents H or F; and one of p and q represents an integer of from 0 to 20 while the other represents an integer of from 1 to 20, in which n represents an integer of from 1 to 5, provided that at least one of Z and X's represent R$_a$—Y$_1$—, R$_a$—Y$_1$—(CH$_2$)$_r$—, R$_a$—(CH$_2$)$_r$—Y$_1$—, R$_a$—Y$_1$—(CH$_2$)$_s$—O—, R$_a$—Y$_1$—(CH$_2$)$_s$—S—, R$_a$—Y$_1$—(CH$_2$)$_s$—NR$_1$—, —CY$_3$, an alkyl group, a substituted alkyl group, a fluoroalkyl group, a substituted fluoroalkyl group, an aryl group, a substituted aryl group or a substituted alkenyl group.

2. The antireflective film as claimed in claim 1, wherein the ionizing radiation-curing compound is a compound having two or more ethylenically unsaturated groups.

3. The antireflective film as claimed in claim 1, wherein the antireflective layer includes a low-refractive index layer and the low-refractive index layer is formed with a coating solution containing a fluoropolymer.

4. The antireflective film as claimed in claim 3, wherein the fluoropolymer is represented by the following formula (1A):

Formula (1A):

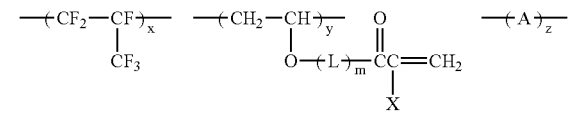

wherein L represents a linking group having from 1 to 10 carbon atoms; m represents 0 or 1; X represents a hydrogen atom or a methyl group; A represents a vinyl monomer polymerization unit which may be either a single component or made up of multiple components and which may contain a silicone moiety; x, y and z represent the mol percentages of respective constituents satisfying relationships $30 \leqq x \leqq 60$, $5y \leqq 70$ and $0 \leqq z \leqq 65$, respectively.

5. The antireflective film as claimed in claim 3, wherein the fluoropolymer is represented by the following formula (2A):

Formula (2A):

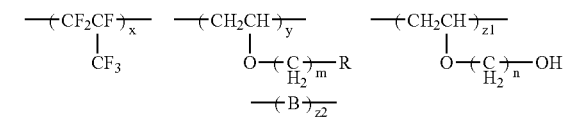

wherein R represents an alkyl group having from 1 to 10 carbon atoms or an ethylenically unsaturated group; m represents an integer of from 1 to 10; n represents an integer of from 2 to 10; B represents a repeating unit derived from a vinyl monomer which may be either a single component or made up of multiple components and which may contain a silicone moiety; and x, y, z1 and z2 represent the mol percentages of respective repeating units, provided that x+y+z1+z2=100.

6. The antireflective film as claimed in claim 3, wherein the low-refractive index layer contains hollow silica particles.

7. A polarizing plate comprising the antireflective film as claimed in claim 1 as one of a pair of protective films in the polarizing plate.

8. The antireflective film as claimed in claim 1, wherein the layer formed by curing the composition has in its surface portion a fluorine content which is higher than an average fluorine content of the layer as a whole.

9. An antireflective film comprising a support and at least one layer including an antireflective layer, wherein at least one of the at least one layer is a layer formed by curing by ionizing radiation a composition which contains a fluorinated photopolymerization initiator and an ionizing radiation-curing compound, wherein the fluorinated photopolymerization initiator is represented by any one of the following formulae (1) to (5):

Formula (1):

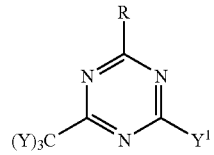

wherein Y represents a halogen atom; $Y^1$ represents —$CY_3$, —$NH_2$, —NHR', —$NR'_2$ or —OR' in which R' represents an alkyl group, a fluoroalkyl group or an aryl group; and R represents $R_a$—$Y_1$—, $R_a$—$Y_1$—$(CH_2)_r$—, $R_a$—$(CH_2)_r$—$Y_1$—, $R_a$—$Y_1$—$(CH_2)_s$—O—, $R_a$—$Y_1$—$(CH_2)_s$—S—, $R_a$—$Y_1$—$(CH_2)_s$—$NR_1$—, —$CY_3$, an alkyl group, a substituted alkyl group, a fluoroalkyl group, a substituted fluoroalkyl group, an aryl group, a substituted aryl group or a substituted alkenyl group, in which $R_1$ represents a hydrogen atom, a methyl group or an ethyl group; r represents an integer of from 1 to 10; s represents an integer of from 2 to 10; $Y_1$'s each independently represent a divalent group selected from the group consisting of —O—, —S—, —O—C(=O)— and —O—Si$(R_2)_2$—$(CH_2)_r$—; $R_2$ represents an alkyl group having from 1 to 12 carbon atoms or a phenyl group; and $R_a$ represents a linear or branched terminal chain: $Z^1CF_2$(—O—$C_2F_4)_p$—$(CF_2)_q$— in which $Z^1$ represents H or F; and one of p and q represents an integer of from 0 to 20 while the other represents an integer of from 1 to 20;

Formula (2):

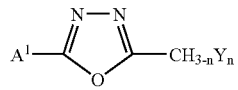

wherein $A^1$ represents a phenyl group, a naphthyl group, a substituted phenyl group or a substituted naphthyl group, $R_a$—$Y_1$—, $R_a$—$Y_1$—$(CH_2)_r$—, $R_a$—$(CH_2)_r$—$Y_1$—, $R_a$—$Y_1$—$(CH_2)_s$—O—, $R_a$—$Y_1$—$(CH_2)_s$—S—, $R_a$—$Y_1$—$(CH_2)_s$—$NR_1$—, —$CY_3$, an alkyl group, a substituted alkyl group, a fluoroalkyl group, a substituted fluoroalkyl group, an aryl group, a substituted aryl group or a substituted alkenyl group, in which $R_1$ represents a hydrogen atom, a methyl group or an ethyl group; r represents an integer of from 1 to 10; s represents an integer of from 2 to 10; $Y_1$'s each independently represent a divalent group selected from the group consisting of —O—, —S—, —O—C(=O)— and —O—Si$(R_2)_2$—$(CH_2)_r$—; $R_2$ represents an alkyl group having from 1 to 12 carbon atoms or a phenyl group; and $R_a$ represents a linear or branched terminal chain: $Z^1CF_2$(—O—$C_2F_4)_p$—$(CF_2)_q$— in which $Z^1$ represents H or F; and one of p and q represents an integer of from 0 to 20 while the other represents an integer of from 1 to 20, in which the substituent for the substituted phenyl group and a substituent for the substituted naphthyl group are each independently a halogen atom, an alkyl group, a fluoroalkyl group, an alkoxy group, a nitro group, a cyano group or a methylenedioxy group; Y represents a halogen atom; and n represents an integer of from 1 to 3;

Formula (3):

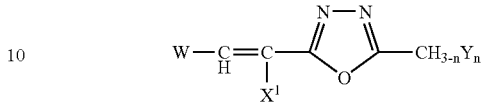

wherein W represents an unsubstituted or substituted phenyl group, an unsubstituted naphthyl group, $R_a$—$Y_1$—, $R_a$—$Y_1$—$(CH_2)_r$—, $R_a$—$(CH_2)_r$—$Y_1$—, $R_a$—$Y_1$—$(CH_2)_s$—O—, $R_a$—$Y_1$—$(CH_2)_s$—S—, $R_a$—$Y_1$—$(CH_2)_s$—$NR_1$—, —$CY_3$, an alkyl group, a substituted alkyl group, a fluoroalkyl group, a substituted fluoroalkyl group, an aryl group, a substituted aryl group or a substituted alkenyl group, in which $R_1$ represents a hydrogen atom, a methyl group or an ethyl group; r represents an integer of from 1 to 10; s represents an integer of from 2 to 10; $Y_1$'s each independently represent a divalent group selected from the group consisting of —O—, —S—, —O—C(=O)— and —O—Si$(R_2)_2$—$(CH_2)_r$—; $R_2$ represents an alkyl group having from 1 to 12 carbon atoms or a phenyl group; and $R_a$ represents a linear or branched terminal chain: $Z^1CF_2$(—O—$C_2F_4)_p$—$(CF_2)_q$— in which $Z^1$ represents H or F; and one of p and q represents an integer of from 0 to 20 while the other represents an integer of from 1 to 20, in which the substituent for the substituted phenyl group is a halogen atom, a nitro group, a cyano group, an alkyl group having from 1 to 3 carbon atoms or an alkoxy group having from 1 to 4 carbon atoms; in a case where a halogen atom is contained as the substituent for the substituted phenyl group, the phenyl group has one or two substituents, and in a case where a halogen atom is not contained as the substituent for the substituted phenyl group, the phenyl group has a single substituent; $X^1$ represents a hydrogen atom, a phenyl group or an alkyl group having from 1 to 3 carbon atoms; Y represents a halogen atom; and n represents an integer of from 1 to 3;

Formula (4):

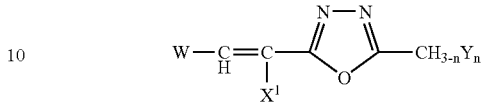

wherein $W^1$ represents an unsubstituted or substituted phenyl group, an unsubstituted naphthyl group, $R_a$—$Y_1$—, $R_a$—$Y_1$—$(CH_2)_r$—, $R_a$—$(CH_2)_r$—$Y_1$—, $R_a$—$Y_1$—$(CH_2)_s$—O—, $R_a$—$Y_1$—$(CH_2)_s$—S—, $R_a$—$Y_1$—$(CH_2)_s$—$NR_1$—, —$CY_3$, an alkyl group, a substituted alkyl group, a fluoroalkyl group, a substituted fluoroalkyl group, an aryl group, a substituted aryl group or a substituted alkenyl group, in which $R_1$ represents a hydrogen atom, a methyl group or an ethyl group; r represents an integer of from 1 to 10; s represents an integer of from 2 to 10; $Y_1$'s each independently represent a divalent group selected from the group consisting of —O—, —S—, —O—C(=O)— and —O—Si$(R_2)_2$—$(CH_2)_r$—; $R_2$ represents an alkyl group having from 1 to 12 carbon atoms or a phenyl group; and $R_a$ represents a linear or branched terminal chain: $Z^1CF_2$(—O—$C_2F_4)_p$—$(CF_2)_q$— in which $Z^1$ represents H or F; and one of p and q represents an integer of from 0 to 20 while the other represents an integer of from 1 to 20, in which the substituent for the substituted phenyl group is a halogen atom, a nitro group, a cyano group, an alkyl group having from 1 to 3 carbon atoms or an alkoxy group having from 1 to 4 carbon atoms; in a case where a halogen atom is contained as the substituent for the substituted phenyl group, the phenyl group has one or two substituents and in a case where a halogen atom is not contained as the substituent for the substituted phenyl group, the phenyl group has a single substituent; $X^2$ represents a hydrogen atom, a halogen atom, a cyano group, an alkyl group or an allyl group; Y represents a halogen atom; and n represents an integer of from 1 to 3;

Formula (5):

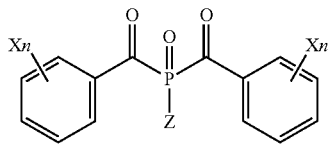

wherein Z represents an unsubstituted or substituted phenyl group, an unsubstituted naphthyl group, a fluoroalkyl group, $R_a$—$Y_1$—, $R_a$—$Y_1$—$(CH_2)_r$—, $R_a$—$(CH_2)_r$—$Y_1$—, $R_a$—$Y_1$—$(CH_2)_s$—O—, $R_a$—$Y_1$—$(CH_2)_s$—S—, $R_a$—$Y_1$—$(CH_2)_s$—$NR_1$—, —$CY_3$, an alkyl group, a substituted alkyl group, a fluoroalkyl group, a substituted fluoroalkyl group, an aryl group, a substituted aryl group or a substituted alkenyl group, in which $R_1$ represents a hydrogen atom, a methyl group or an ethyl group; r represents an integer of from 1 to 10; s represents an integer of from 2 to 10; $Y_1$'s each independently represent a divalent group selected from the group consisting of —O—, —S—, —O—C(=O)— and —O—Si$(R_2)_2$—$(CH_2)_r$—; $R_2$ represents an alkyl group having from 1 to 12 carbon atoms or a phenyl group; and $R_a$ represents a linear or branched terminal chain: $Z^1CF_2$(—O—$C_2F_4)_p$—$(CF_2)_q$— in which $Z^1$ represents H or F; and one of p and q represents an integer of from 0 to 20 while the other represents an integer of from 1 to 20, in which the substituent for the substituted phenyl group is a halogen atom, a nitro group, a cyano group, an alkyl group having from 1 to 3 carbon atoms or an alkoxy group having from 1 to 4 carbon atoms; X's each independently represents a hydrogen atom, a halogen atom, an alkyl group, $R_a$—$Y_1$—, $R_a$—$Y_1$—$(CH_2)_r$—, $R_a$—$(CH_2)_r$—$Y_1$—, $R_a$—$Y_1$—$(CH_2)_s$—O—, $R_a$—$Y_1$—$(CH_2)_s$—S—, $R_a$—$Y_1$—$(CH_2)_s$—$NR_1$—, —$CY_3$, an alkyl group, a substituted alkyl group, a fluoroalkyl group, a substituted fluoroalkyl group, an aryl group, a substituted aryl group or a substituted alkenyl group, in which $R_1$ represents a hydrogen atom, a methyl group or an ethyl group; r represents an integer of from 1 to 10; s represents an integer of from 2 to 10; $Y_1$'s each independently represent a divalent group selected from the group consisting of —O—, —S—, —O—C(=O)— and —O—Si$(R_2)_2$—$(CH_2)_r$—; $R_2$ represents an alkyl group having from 1 to 12 carbon atoms or a phenyl group; and $R_a$ represents a linear or branched terminal chain: $Z^1CF_2$(—O—$C_2F_4)_p$—$(CF_2)_q$— in which $Z^1$ represents H or F; and one of p and q represents an integer of from 0 to 20 while the other represents an integer of from 1 to 20, in which n represents an integer of from 1 to 5, provided that at least one of Z and X's represent $R_a$—$Y_1$—, $R_a$—$Y_1$—$(CH_2)_r$, $R_a$—$(CH_2)_r$—$Y_1$, $R_a$—$Y_1$—$(CH_2)_s$—O—, $R_a$—$Y_1$—$(CH_2)_s$—S—, $R_a$—$Y_1$—$(CH_2)_s$—$NR_1$—, —$CY_3$, an alkyl group, a substituted alkyl group, a fluoroalkyl group, a substituted fluoroalkyl group, an aryl group, a substituted aryl group or a substituted alkenyl group.

10. The antireflective film as claimed in claim 9, wherein the fluorinated photopolymerization initiator is represented by the formula (1).

* * * * *